(12) United States Patent
Funaya et al.

(10) Patent No.: US 6,744,704 B1
(45) Date of Patent: Jun. 1, 2004

(54) DISK PLAYBACK APPARATUS

(75) Inventors: Seiichi Funaya, Tokyo (JP); Shigeo Kinoshita, Tokyo (JP); Yoshio Suzuki, Tokyo (JP); Masakazu Kawabata, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/470,251

(22) Filed: Dec. 22, 1999

(30) Foreign Application Priority Data

Dec. 28, 1998 (JP) ............................................ 10-372932

(51) Int. Cl.$^7$ ............................................... G11B 21/08
(52) U.S. Cl. ................................................... 369/30.85
(58) Field of Search .......................... 369/77.1, 36, 75.2, 369/291, 270, 34, 247, 178, 192, 191, 187, 30.85

(56) References Cited

U.S. PATENT DOCUMENTS

| | | | | |
|---|---|---|---|---|
| 5,046,059 A | * | 9/1991 | Yoshida et al. ............... 369/36 |
| 5,150,349 A | * | 9/1992 | Takai et al. ................ 369/75.2 |
| 5,515,357 A | * | 5/1996 | Arata et al. ................. 369/191 |
| 5,956,300 A | * | 9/1999 | Chigasaki .................... 369/34 |
| 5,970,042 A | * | 10/1999 | Fujimoto et al. ........... 369/247 |
| 5,982,720 A | * | 11/1999 | Takemasa et al. ............ 369/36 |
| 6,052,356 A | * | 4/2000 | Fujimoto et al. ........... 369/192 |
| 6,215,761 B1 | * | 4/2001 | Goto et al. ................. 369/291 |

* cited by examiner

Primary Examiner—David Davis

(57) ABSTRACT

A disk playback apparatus has a lower chassis unit carrying a stack of disk holders. A stage unit carries major components of the disk playback apparatus including side select plates for selectively lifting or lowering the disk holders, a drive base unit for playing back a disk, a horizontal driving gear mechanism for moving the drive base unit into a space which is formed as a result of the selective upward or downward movement of the disk holders, and a loading roller for loading and ejecting a disk. The stage unit is moved up and down in accordance with the position of a selected disk holder, by the power of a first motor, through the actions of a gear mechanism, mode pate and slide plates.

18 Claims, 36 Drawing Sheets

FIG. 54A  FIG. 54B
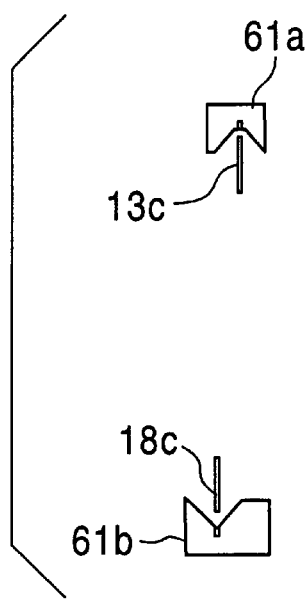
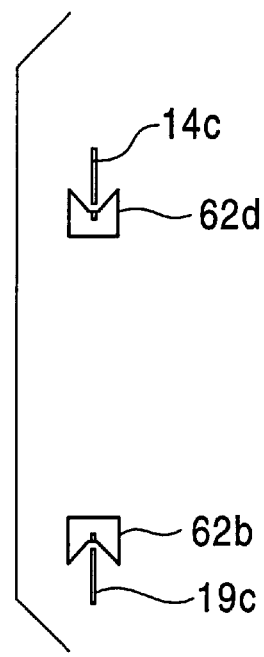
FIG. 55
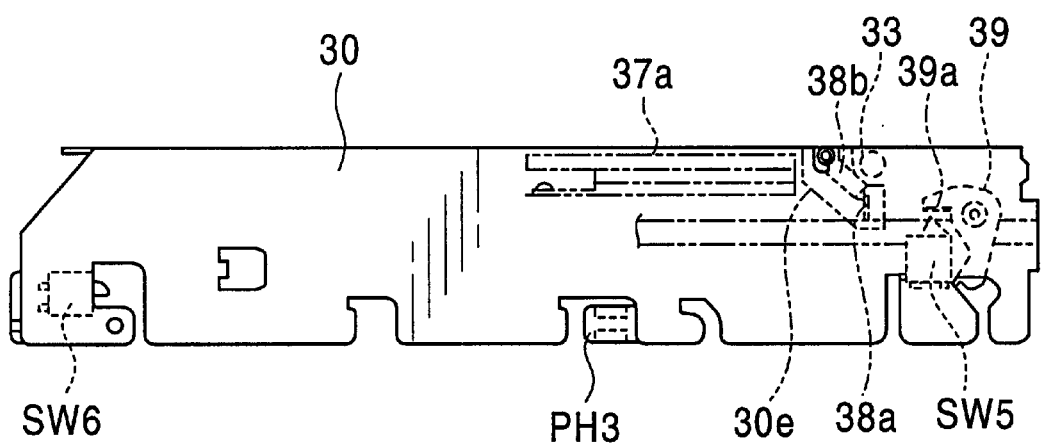

DISK PLAYBACK APPARATUS

BACKGROUND OF THE INVENTION

1. Field of the Invention

The present invention relates to a disk playback apparatus of the type in which a disk pulled out from one of a plurality of disk holders stacked one on another is chucked on a drive base unit so as to be subjected to playback operation. More particularly, the present invention pertains to a disk playback apparatus in which the driver base unit is moved into a space that is formed by vertically moving at least one of the stacked disk holders, rather than by horizontally moving the entirety of the stack of disk holders.

2. Description of the Related Art

Hitherto, widely used are disk playback apparatuses of the type in which a disk is selected from a group of disks accommodated in a magazine and is automatically conveyed and subjected to playback operation. This type of disk playback apparatus has an auto-changer mechanism which automatically selects the disk to be conveyed and played back, in accordance with a predetermined program and based on instructions given by a user through operation buttons or through a remote controller.

In general, each of the disks accommodated in the magazine is individually held by an exclusive disk holder designed differently in accordance with the diameter of the disk. The disk selected by the auto-changer mechanism is horizontally conveyed to a position on the drive base unit while being located by the exclusive disk holder, thereby being played back by the drive base unit. The driver base unit is movable up and down, and is set to a level corresponding to the selected disk, before the selected disk is drawn out.

This type of disk playback apparatus has excellent operability because a desired one of a plurality of disks accommodated in the magazine can automatically be brought into playback operation simply by being selected, without requiring independent manual operations for inserting and ejecting the disk. The described disk playback apparatus, however, has a problem in that a laborious work is required for demounting and mounting the magazine for setting a new disk in the magazine, when the user wishes to playback such a new disk that has not been accommodated in the magazine. This laborious work is necessary even when only one of the disks in the magazine is to be replaced with the new disk, while other disks remain in the magazine so as to be played back subsequent to the playback of the newly set disk.

The disk playback apparatus employing a detachable magazine tends to have greater dimensions particularly when a large number of disks are to be set in the magazine. Consequently, the number of disks that can be set in the magazine is undesirably limited particularly when the space for accommodating the playback apparatus is restricted as in the case of automotive disk playback apparatuses. This problem is more fully discussed below.

A magazine, which is detachable from the main part of the disk playback apparatus, is required to have strength large enough to protect disks accommodated therein. Consequently, wall thickness, as well as overall dimensions, of the magazine is rendered large. In order to guide horizontal movement of each disk holder in the magazine, guide rails are formed on the opposing inner surfaces of the magazine, thus further increasing the magazine wall thickness. The guide rails also serve to increase the pitch or heightwise distance between adjacent disk holders, resulting in an increase in the overall height of the magazine. When a disk is drawn out from the magazine for playback operation, it is necessary that an ample space is available on at least one side of the disk. Provision of such a space inevitably increases the height of the magazine, corresponding to the number of the disks employed or, in case of an automotive disk apparatus which has to be installed in a limited space, the number of the disks that can be set in the magazine is undesirably reduced.

Under these circumstances, efforts have been made to develop a disk playback apparatus of the type devoid of any detachable magazine. More specifically, in this type of disk playback apparatus, a plurality of disk holders are stacked in the apparatus without the intermediary of a magazine, and disks inserted through the disk insertion slot are automatically set on the disk holders and are also automatically ejected.

This type of disk playback apparatus enables the user to easily replace the disks, by virtue of automatic setting and ejection of the disks. More specifically, the user is required only to operate a button or a key for ejecting the disk to let the disk be ejected, followed by manual insertion of the disk into the disk insertion slot. Further, the overall dimensions of the disk playback apparatus are reduced as compared with the apparatuses that employ magazines.

Thus, the disk playback apparatus which is being developed enables automatic setting and ejection of disks into and out of the stack of disk holders, offering advantages such as ease of operation and reduction in the dimensions. The effect to reduce the dimensions, however, is still insufficient, insofar as the apparatus relies on horizontal reciprocal arrangement in which the disk holders are constructed and arranged to reciprocate in horizontal directions.

More specifically, when such a horizontal reciprocal arrangement is used, it is necessary that a distance which is at the smallest equal to the disk radius be preserved between the point where the disk center is located when the disk is in the accommodated position and the point where the disk center is located when the disk has been moved to the position on the drive base unit. This poses a limit to the reduction in the horizontal dimension of the apparatus. Further, reduction in the dimension is limited also in the heightwise direction, because of the necessity of the guide grooves and rails for enabling the reciprocal motions of the disk holders.

In contrast to the above-described horizontal reciprocal arrangement, an arrangement referred to as "stack/separation arrangement" has recently been proposed, in which a drive base unit is introduced into a space that is formed by moving upward or downward a disk holder or disk holders above or below a separation position which is assumed on one side of the selected disk holder. This stack/separation arrangement can effectively reduce the horizontal dimensions of the whole apparatus without increasing the heightwise dimensions as compared to the horizontal reciprocal arrangement, insofar as the movements of the disk holders are concerned. A brief description will be given below in this respect.

In accordance with the stack/separation arrangement, the disk holders are initially arranged in a packed manner, such that adjacent disk holders contact each other or positioned in the close proximity of each other. For the purpose of playing back the selected disk, the disk holders that are on the upper side of the selected disk are moved upward as a unit, or the disk holders that are on the lower side of the selected disk are moved downward as a unit, whereby a space for receiving the drive base unit is formed on the upper side or lower side of the selected disk. Likewise, if the selected disk is the topmost or lowermost one of the stacked disk holders, all the disk holders are moved downward or upward as a unit, whereby the space for receiving the drive base unit is formed. The height of this space is greater than the distance between two adjacent disk holders in the horizontal reciprocal arrangement, but is almost equal to the sum of the distances of the consecutive adjacent disk holders.

The stack/separation arrangement requires horizontal reciprocal movement of the drive base unit, instead of the horizontal reciprocation of the disk holders. The horizontal position of the drive base unit where it can playback the disk may be determined arbitrarily such that it overlaps the disk holder. It suffices only to retract the drive base unit to a position where it does not interfere with the vertical movement of the disk holders. Therefore, the horizontal dimensions of the apparatus can be minimized by reducing as possible the dimensions of the drive base unit.

The stack/separation arrangement, however, requires not only a mere vertical movement of the disk holders but n operation for selecting the separation position where the space for accommodating the drive base unit is to be installed. In addition, a variety of patterns of vertical movements of the disk holders are to be implemented, depending on the separation position. Consequently, a complicated control is required to achieve many different patterns of movements of the disk holders, which in turn necessitates a complicated actuating system. A complicated control and hence a complicated actuating mechanism are also necessary for moving the drive base unit not only vertically but also horizontally. Further, a difficulty is encountered by properly controlling the timings of operations of the whole mechanism for implementing the complicated actions of the disk holders and the drive base unit.

SUMMARY OF THE INVENTION

Accordingly, a first object of the present invention is to provide a disk playback apparatus which excels both in reliability and operability and which relies on the stack/separation arrangement of the disk holders implemented by a compact and simple structure, while performing, at proper timings, a series of operations including selection of the separation position and execution of the separating operations based on the position of the disk to be played back, control of the level of the drive base unit, insertion of the drive base unit into the space formed as a result of the separation, chucking of the disk, and so forth.

A second object of the present invention is to provide a disk playback apparatus which is so small and simple as to be suitably accommodated in a desired space on a vehicle, thus suiting to use on a vehicle.

To these ends, according to one aspect of the present invention, there is provided a disk playback apparatus, comprising: a disk insertion section through which disks are inserted and ejected; a plurality of disk holders each holding one of the disks; a drive base unit for playing back a desired disk; disk holder lifting means for selecting the disk holder holding the desired disk and for lifting or lowering all or part of the disk holders so as to form a space for accommodating the drive base unit; drive conveyance means for moving the drive base unit between the space formed as a result of the lifting or lowering of the disk holders and a space adjacent to the disk insertion section; disk loading/ejection means for pulling inward the disk that has been inserted through the disk insertion section to enable the disk to be held by the disk holder, and for receiving the disk from the disk holder and ejecting the received disk to the disk insertion section; a stage unit for supporting the disk holder lifting means and the drive base unit; and stage lifting means for lifting and lowering the stage unit in accordance with the position of the selected disk holder.

Thus, the disk playback apparatus of the present invention is characterized by the use of the stage unit for supporting the disk holder lifting means and the drive base unit, and the stage lifting means for lifting and lowering the stage unit in accordance with the position of the selected disk holder.

In accordance with this arrangement, since the disk holder lifting means are supported together with the drive base unit on the stage unit, it is possible to simultaneously achieve both the selection of the disk holders to be lifted or lowered and the positioning of the drive base unit that is to be inserted, by a single lifting or lowering motion of the stage lifting means. Thus, components of the mechanisms are accurately aligned with one another, and the timings of operations of the components are adequately determined, despite the simplified construction of the apparatus.

Preferably, the disk loading/ejection means are provided on a portion of the drive base unit adjacent the disk insertion section.

To enable loading or ejection of the disk, it is necessary to lift or lower the disk holders so as to select a disk holder to which a disk is to be loaded or from which a disk is to be ejected, and to bring the selected disk holder into alignment with the disk loading/ejection means. Since both the disk holder lifting means and the disk loading/ejection means are carried by the stage unit, it is possible to accurately bring the selected disk holder into alignment with the disk loading/ejection means, subsequent to the selection of the disk holder.

The arrangement may be such that the disk holder lifting means includes a cam member having an inclined cam surface, the cam member being carried by the drive base unit for movement in the directions for loading and ejecting the disk, each disk holder having a cam follower contacting with the cam surface of the cam member and urged in at least one of upward and downward directions in accordance with the movement of the cam member.

In accordance with this arrangement, the disk holders are lifted or lowered as a result of the movement of the inclined cam surface in the direction of loading and ejection of the disk. It is therefore possible to effect up or downward movement of the disk holders with a small stroke of movement of the cam member. Consequently, the dimension of the mechanism is reduced in the disk loading/ejection directions, thus realizing a compact construction of the payback apparatus.

The disk payback apparatus may be arranged such that the cam surface of the cam member is stepped to provide stages corresponding to the positions of the disk holders which are lifted and lowered.

In accordance with this arrangement, each stage of the stepped cam surface can securely hold each disk at a predetermined position, thus offering high positioning accuracy for the disk holders.

The cam member may include a guide cam continuing from the cam surface, the guide cam serving to guide the cam follower of the disk holder until the disk held by the disk holder is brought to a position where the disk is played back by the drive base unit.

With this arrangement, the lifting and lowering operations of the disk holders caused by the movement of the cam member in the direction of loading or ejection of the disk not only causes separation of the disk holders and positioning of a selected disk holder at the disk loading/ejection position but also enables positioning of a disk to be played back onto a predetermined position on the drive base unit. Consequently, a single cam member provides a plurality of functions, thus contributing to the reduction in the number of parts, while realizing a compact and simple construction.

The cam member may have an auxiliary cam surface which is parallel to the cam surface and which opposes the cam surface across the cam follower of the disk holder. In accordance with this arrangement, the cam followers of the disk holders follow the cam surface and the auxiliary cam surface, so as to be guided by the cam surface and the auxiliary cam surface both from the upper and lower sides of the disk holders, whereby the reliability of operation is improved.

The playback apparatus may further comprise a stock arm rotatably disposed on a position on the stage unit adjacent to the disk loading/ejection means, the stock arm having a pressing portion which when the stock arm is rotated forces the disk inserted through the disk insertion section deeper into the disk holder, the stage unit having urging means for rotationally urging the stock arm in the disk force-in direction, the urging means being movable in the disk insertion/ejection directions and having a resilient member for adjusting the urging force.

With this arrangement, a buffer member provided on the urging means regulates the urging force, so that the load applied to the disk by the stock arm can be maintained constant regardless of any fluctuation in the disk diameter or dimensional errors of the mechanical parts, thus ensuring stable operation for forcing the disk into the disk holder.

The disk holder may have a locating member. In such a case, a locating support portion is provided in the vicinity of the disk holder for supporting the locating member of the disk holder when the disk holder has been selected for disk loading or ejection.

With this feature, any rattle or play or other unstable behavior of the disk holder is avoided during loading or ejection of the disk, by virtue of the locating support portion that supports the locating member on the disk holder, whereby the loading or ejection of the disk can be performed stably.

The disk playback apparatus may further comprise a pair of disk detectors disposed at the side of the disk loading/ejection means adjacent to the disk insertion section, the disk detectors being spaced a distance greater than the diameter of the 8-cm disk but smaller than the diameter of a 12-cm disk.

When a wrong member such as an 8-cm disk has been inserted through the disk insertion section, at least one of the disk detectors fails to detect such a member, thus detecting the insertion of the wrong member. When insertion of such a wrong member has been detected, the disk loading/ejection means is prevented from operating, thereby avoiding malfunction or other trouble which otherwise may be caused, whereby the reliability of operation is further improved.

The disk loading/ejection means may include a loading roller and an idle roller which cooperate in nipping the disk therebetween from the upper and lower sides of the disk. In such a case, the disk playback apparatus may further comprise an upper disk guide and a lower disk guide which are disposed near the loading roller at the side thereof adjacent to the disk insertion section. The idle roller is movable into and out of contact with the loading roller and urged by resilient members into contact with the loading roller. The upper disk guide or the lower disk guide has one end engaged and supported by the shaft portions of the idle roller.

In this arrangement, the upper disk guide or the lower disk guide is supported at its one end by shaft portions of the idle roller, so that the disk when inserted can stably be guided into the nip between the loading roller and the idler roller, by the effects of the upper disk guide and the lower disk guide.

The disk playback apparatus may further comprise a side disk guide arranged at the side of the disk loading/ejection means and operative to guide the moving disk from the left and right sides of the disk.

In this arrangement, when the disk is being loaded, the side disk guide ensures that the disk is introduced to a predetermined position in the disk holder, whereas, when the disk is being ejected, ensures that the disk is fed back into the gap between the loading roller and the idle roller.

The disk payback apparatus may also be constructed such that the drive base unit includes: a turntable unit for carrying the disk to be played back; a spindle motor for rotationally driving the turntable unit; chucking means for chucking the disk to fix the disk on the turntable unit; a pickup unit movable in the radial direction of the disk to detect signals recorded in the disk; chuck-releasing means for dismissing the chucking of the disk by the chucking means in accordance with the movement of the pickup unit towards the turntable unit; and position detecting means for detecting that the pickup unit is set at an initial position or at the chuck-releasing position.

This arrangement offers the following advantage. In case of an accidental control failure of the apparatus, the safe operation may be failed if the operation is restarted after recovery of the control function without accurately knowing whether the pickup unit is held at the initial position or the chuck-releasing position at the time of recovery of the control function. In accordance with the above-described features, it is possible to accurately determine whether the pickup unit is held at the initial position or the chuck-releasing position, so that the operation can safely be performed after the recovery of the control function, thus offering further improvement in the reliability.

The disk playback apparatus also may be constructed such that the drive base has a rack, and the drive conveyance means includes at least two drive gears for selectively engaging with the rack to cause the movement of the drive base unit, the gears being spaced from each other by a distance smaller than the length of the rack.

With this arrangement, the driving of the rack can be performed in a shared manner by means of a plurality of drive gears. This permits the rack to have a length smaller than the stroke of movement of the drive base unit, thus contributing to the reduction in the size of the apparatus.

The disk playback apparatus also may be constructed such that the disk holder has a partition plate that covers part of the upper surface of the disk, the partition plate having an arcuate inner edge which is notched to clear protrusions formed on an adapter for setting an 8-cm disk.

With this arrangement, the partition plate of the disk holder can clear the protrusion of an 8-cm disk adapter, by virtue of the notches. This permits the disk holder to have a reduced thickness, thus further contributing to the reduction in the size of the apparatus.

These and other objects, features and advantages of the present invention will become clear from the following

BRIEF DESCRIPTION OF THE DRAWINGS

FIG. 54A is a side view of the damper plate of FIG. 50 in the floating unlocking state, as viewed from the left side thereof;

FIG. 54B is a side view of the damper plate of FIG. 50 in the floating unlocking state, as viewed from the left side thereof;

FIG. 55 is a side view of the stage unit shown in FIG. 1, as viewed from the left side thereof;

DESCRIPTION OF THE PREFERRED EMBODIMENTS

The present invention will be described with reference to the accompanying drawings, in the context of an automotive disk playback apparatus as an embodiment of the present invention. In the following description, the terms "front" and "rear" are used to indicate the side which faces a user and the side which is opposite to the user. Likewise, "left" and "right" are used to indicate the left side and the right side as viewed from the "front" side of the apparatus.

A. Overall Structure

Figure 1:
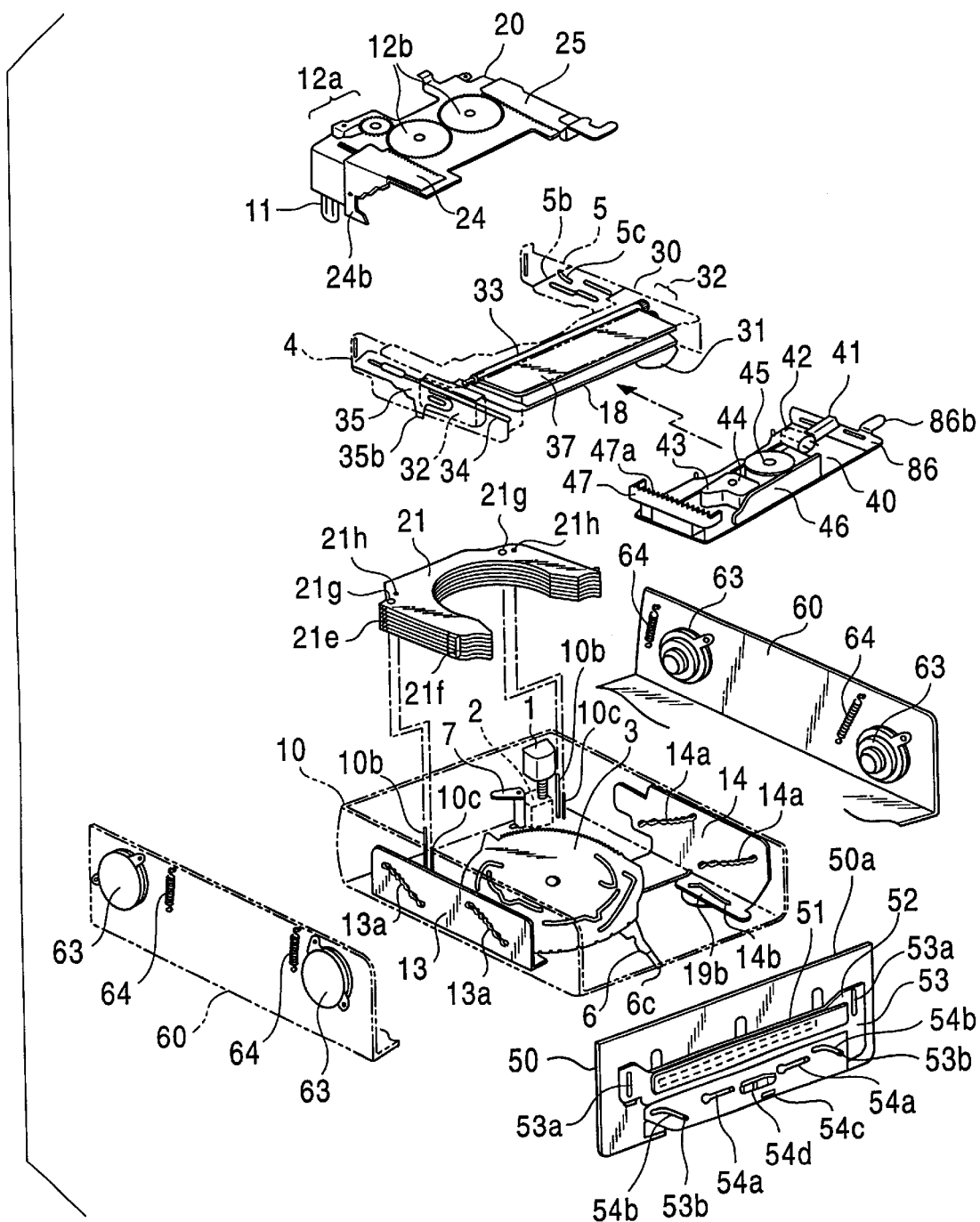
FIG. 1 is a schematic exploded perspective view showing the entirety of an embodiment of the disk playback apparatus in accordance with the present invention.

FIG. 1 is a schematic exploded perspective view showing the overall structure of the disk playback apparatus. As will be seen from this Figure, the disk playback apparatus has a lower chassis unit 10, an upper chassis unit 20, a stage unit 30, a drive base unit 40, a shutter unit 50 and a damper unit 60.

The disk playback apparatus has six disk holders #1 to #6 that are stacked for movement up and down between the upper chassis unit 20 and the stage unit 30. The stage unit 30 is supported by the lower chassis unit so as to be movable up and down. The drive base unit 40 is supported on the lower face of the stage unit 30, for movement in horizontal directions.

The shutter unit 50 and the damper unit 60 are stationarily fixed to the vehicle chassis. A mechanism composed of the lower chassis unit 10, upper chassis unit 20, stage unit 30 and the drive base unit 40 is secured to the damper unit 60 in a floating manner.

B. Outlines of Unit Structures

The construction of each unit will be described briefly with reference to FIG. 1.

[Lower Chassis Unit]

The lower chassis unit 10 is designed and constructed to perform the following operations by means of power derived from a first motor 1: lifting/lowering of the stage unit 30 (for selection of disk holder separation position), open/close operation of the shutter unit 50, loading/ejection of a disk into each disk holder 21, switching of driving power transmission to the drive base unit 40, locking and unlocking of the vibration isolation mechanism, and so on. These operations are effected by rotation of a mode plate 3 which is driven by the first motor 1 through a gear mechanism 2. To this end, the mode plate 3 is provided with a plurality of cams and pressing portions which actuate various members to effect the above-mentioned operations.

A pair of slide plates 13 and 14 for causing the stage unit 30 to move up and down are provided on the inner surfaces of the left and right walls of the lower chassis unit 10, such that these slide plates move back and forth in opposite directions to each other in accordance with rotation of the mode plate 3. Further, mounted rotatably on the lower chassis unit 10 are a door open link 6 that selectively closes a shutter 52 of a disk insertion slot 51 and an eject arm (eject member) 7 that effects ejection of the disk. These members are actuated in accordance with the rotational position of the mode plate 3 so as to be switched between different operative positions.

[2. Upper Chassis Unit]

An upper chassis unit 20 has a disk holder lifting mechanism 22 which is operative to lift and lower the disk holders #1 to #6 collectively denoted by 21. The disk holder lifting mechanism 22 is actuated by a second motor 11, and causes side select plates 4, 5 provided on the stage unit 30 to slide forward and backward, via a plurality of gears and upper select plates 24, 25, thereby effecting selective lifting and lowering of the disk holders 21, as well as division of the disk holders into groups and selection of the disk holders.

[3. Stage Unit]

A loading roller 33 serving as disk loading/ejection means is provided on a front portion of the stage unit 30, so as to extend in the left and right directions. A guide shaft 34 is provided on the stage unit 30 so as to extend in the back and forth directions along the inner surface of the left side wall of the stage unit 30. The loading roller 33 and the drive base unit, which will be described later in detail, are driven by a third motor 31, via a horizontal drive gear mechanism 32.

[4. Drive Base Unit]

The drive base unit 40 is arranged so as to be able to slide back and forth along the guide shaft 34 provided on the stage unit 30. A rack plate 47 is provided on the left end portion of the drive base unit 40. The arrangement is such that the rack plate 47 is driven by the horizontal driving gear mechanism 32, thereby causing the movement of the drive base unit 40 back and forth.

The drive base unit 40 is provided with a pickup unit 44 that is supported by a lead screw 43 extending in the left and right directions. Power of a fourth motor 41 is transmitted to the lead screw 43 via a pickup driving gear 42, so that the pickup unit 44 is driven by the lead screw 43. The drive base unit 40 further has a rotatable turntable 45 which is driven to rotate by means of a spindle motor 46.

[5. Shutter Unit]

The shutter unit 50 has a front panel 50a which is provided with a shutter 52 that opens and closes a disk insertion slot 51 which is formed in the front panel 50a. The shutter is attached to a door plate 53 so as to move integrally therewith, so as to open and close the disk insertion slot 51 in accordance with operation of the door plate 53. The door plate 53 is controlled by the aforesaid mode plate 3 via a door open link 6, so as to be switchable between a lower closing position and an upper open position, in accordance with rotational position of the mode plate 3.

[6. Damper Unit]

The damper unit 60 has a left damper plate 61 and a right damper plate 62 that are provided on a stationary part of a vehicle. Each of the damper plates 61 and 62 is provided with a pair of dampers 63, 63 and a pair of damper springs 64, 64. Thus, the mechanism composed of the lower chassis unit 10, upper chassis unit 20, stage unit 30 and the drive base unit 40 is suspended in a floating manner on the vehicle chassis, via four dampers 63 and four damper springs 64 which serve to damp externally given vibration during playing back of the disk.

C. Details of Structures and Functions of the Units

A detailed description will now be given of the structures and functions of the respective units, with reference to FIGS. 1 to 60.

[1. Lower Chassis Unit]

(1) Mode Change-over Mechanism

Figure 2:
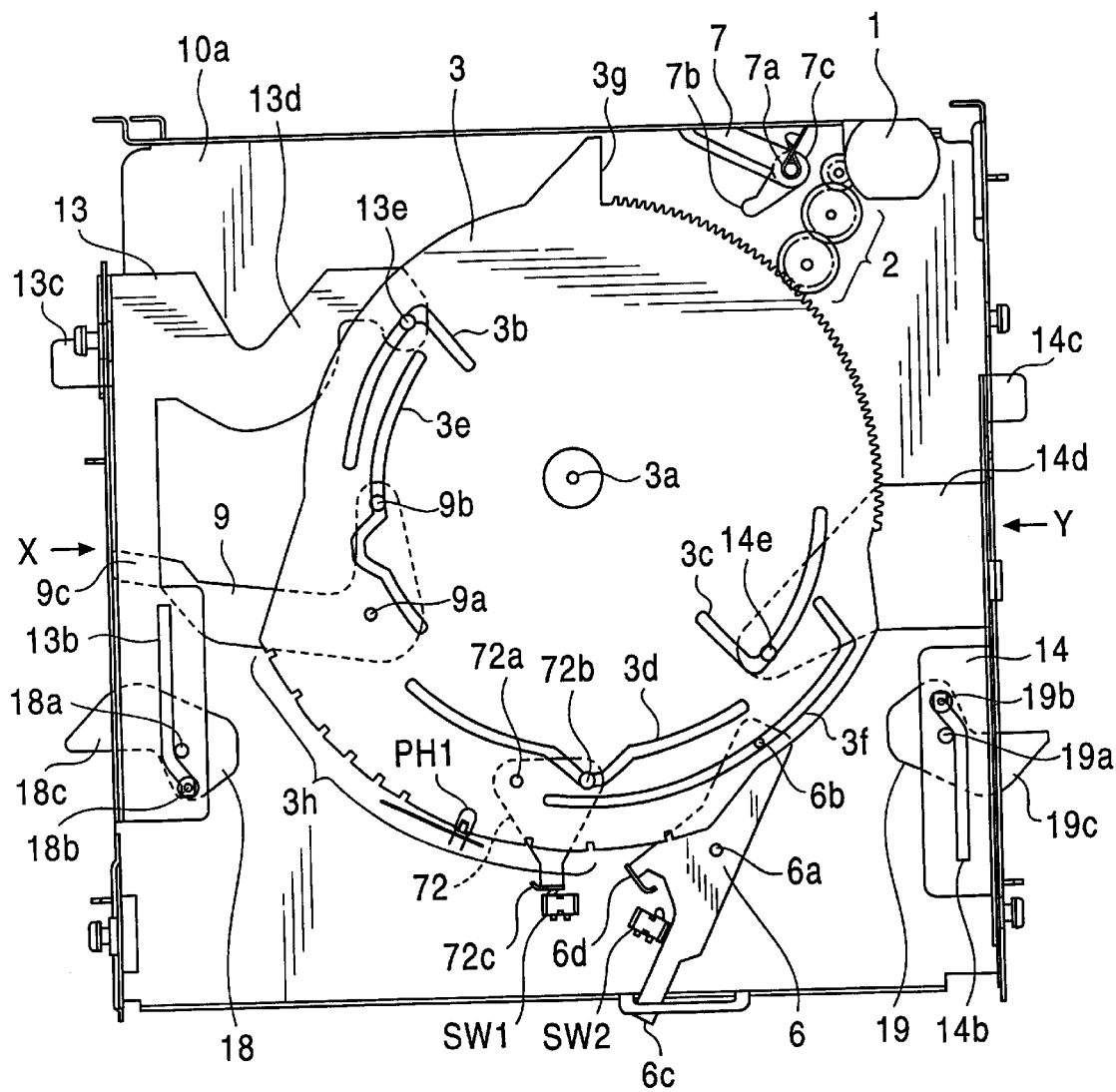
FIG. 2 is a plan view of part of the apparatus shown in FIG. 1, in a state in which a mode plate of a lower chassis unit shown in FIG. 1 is in an initial position.
Figure 3:
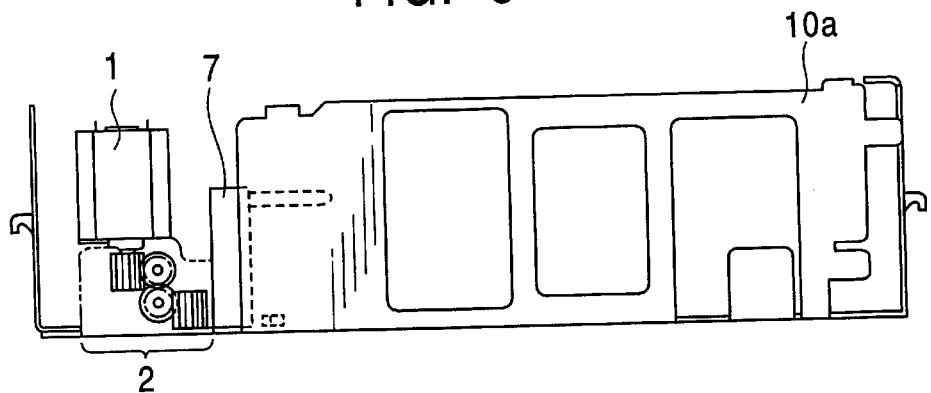
FIG. 3 is a rear view of the lower chassis unit shown in FIG. 1.
Figure 4:
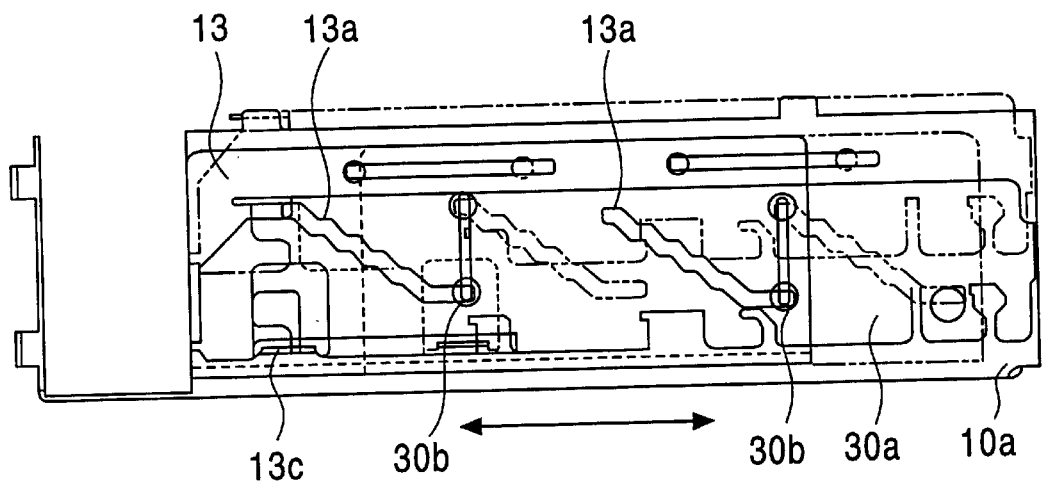
FIG. 4 is a transparent view of the lower chassis unit shown in FIG. 1 as viewed from the left side thereof.
Figure 5:
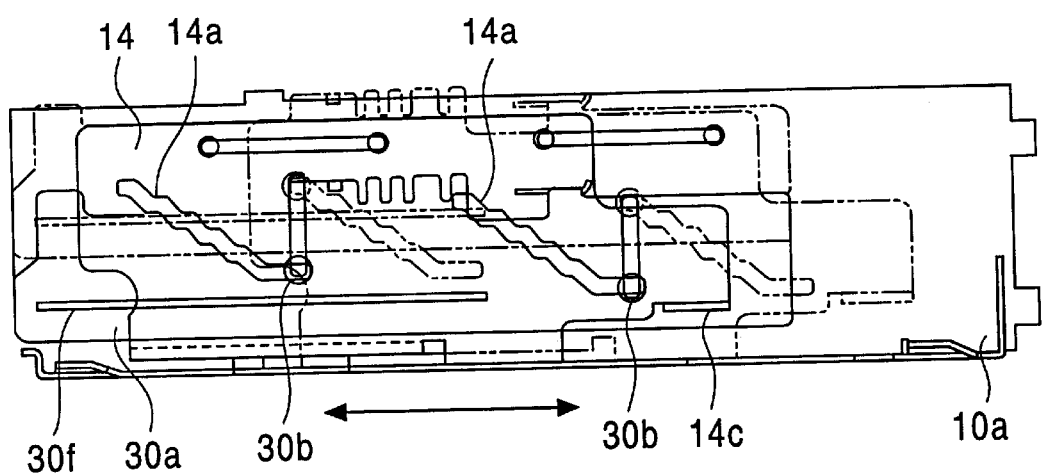
FIG. 5 is a transparent view of the lower chassis unit shown in FIG. 1 as viewed from the right side thereof.

FIG. 2 shows the lower chassis unit 10 in an initial state, while FIG. 3 is a rear elevational view of the same. FIGS. 4 and 5 are side views illustrative of the operations of the slide plates 13 and 14. Referring first to FIG. 2, the lower chassis unit 10 has a chassis body 10a on the center of which disposed is the mode plate 3 for rotation about an axis of a shaft 3a. As will be seen from FIGS. 2 and 3, the first motor 1 and the gear mechanism 2 are provided on the right rear corner of the chassis body 10a. The mode plate 3 is provided at its right rear edge with a rack which engages with the gear mechanism 2, whereby the mode plate 1 is rotationally driven by the power of the first motor 1.

The mode plate 3 is rotatable to and from three positions: namely, an initial position P0, a disk loading/ejection position Pa and disk selection/playback position Pb, so as to control a plurality of elements by the effects of groove cams 3b to 3f and a pressing portion 3g, in accordance with the rotational position thereof. More specifically, the cams 3b to 3f of the mode plate 3 controls, besides the aforesaid pair of slide plates 13 and 14, the door open link 6, stage power link 9 and a switch plate 72, while the pressing portion 3g controls the aforementioned eject arm 7.

The structures and functions of these elements under the control of the mode plate 3 are as follows. As will be seen from FIGS. 4 and 5, the slide plates 13 and 14, which are provided on the inner sides of the left and right walls of the lower chassis unit 10, are respectively provided with pairs of stepped cams 13a, 13a and 14a, 14a. The stepped cams 13a, 13a on the slide plate 13 have a slope or gradient opposite to that of the stepped cams 14a, 14a on the slide plate 14. As will be seen from FIG. 2, the lower ends of the slide plates 13 and 14 are bent to provide horizontal web portions which extend inward to form link portions 13d, 14d engageable with the cams 3b and 3c of the mode plate 3. More specifically, the links 13d and 14d are provided with pins 13e and 14e that are received in groove cams 3b and 3c of the mode plate 3.

The stage power link 9 is mounted on the lower chassis unit 10, for rotation about a pin 9a. The stage power link 9 carries at its one end a pin 9b received in a cam 3e of the mode plate 3. At the other end of the power link 9, there is provided an urging portion 9c which forwardly urges a lower engaging portion 35b of the drive plate 35 shown in FIG. 1. According to this arrangement, the stage power link 9 is rotated in accordance with the rotational position of the mode plate 3, thereby moving the drive plate 35 forward.

The door open link 6 is rotatable about a pin 6a. The door open link 6 carries at its one end a pin 6b which is received in the cam 3f of the mode plate 3. The other end of the door open link 6 provides an engaging portion 6c which activates a door plate 53 shown in FIG. 1. Thus, the door open link 6 is rotatable between a shutter close position and a shutter open position, in accordance with the rotational position of the mode plate 3, thereby opening and closing the shutter 52 shown in FIG. 1. The door open link 6 is provided with a pressing portion 6d which mechanically turns on and off a switch SW2 that is an element of a mechanism control circuit.

The aforesaid switch plate 72 is mounted on the chassis body 10a at a position adjacent to the door open link 6, for rotation about a pin 72a. The switch plate 72 carries at its one end with a pin 72b received in a cam 3d of the mode plate 3. The other end of the switch mode plate 72 provides a pressing portion 72c which mechanically turns on and off a switch SW1 which also is an element of the control circuit.

As will be seen from FIGS. 1 and 2, the eject arm 7 mounted for rotation about a pin 7a. The eject arm 7 has an engaging portion 7b engageable with associated pressing portion 3g of the mode plate 3. The eject arm 7 also is provided with a spring 7c which urges the eject arm 7 in a releasing direction. Thus, the eject arm 7 is rotatable between a disk release position and the rotational position of the mode plate 3. In the course of rotation to the disk eject position, the eject arm 7 forces a disk out of the disk holder to a position where the disk is pressed against the loading roller 33. The mode plate 3 is further provided in the front edge thereof with a plurality of slits 3h corresponding to the operational positions of the mode plate 3.

The mode plate 3 is rotatable clockwise as viewed in FIG. 2 to the disk loading/ejection position Pa, and counterclockwise as viewed in the FIG. 2 to the disk selection/playback position Pb. More specifically, the mode plate 3 takes a disk force-in position Pa1 and then a shutter open position Pa2 as it rotates clockwise from the initial position P0 and, as it rotates counterclockwise, to a floating lock dismissal position Pb1 and then to a stage lifting/lowering position Pb2.

Table 1 shown below indicates the relationships between the operational positions of the mode plate 3 and operational positions of a plurality of elements. The following description proceeds with reference to FIGS. 6, 27, 49, 50 and 58, illustrating different operational positions of the mode plate 3. More specifically, states of control of various elements are shown when the mode plate 3 is at the stage unit lifting/lowering position Pb2 (see FIG. 6), disk force-in position Pa1 (see FIG. 27), shutter opening position (disk eject position) Pa2 (see FIGS. 49 and 58) and the floating lock dismissal position Pb1 (see FIG. 50).

TABLE 1

| Operational position of mode plate 3 | Disk loading/ejection position Pa | | Initial position P0 | Disk select/playback position Pb | |
| --- | --- | --- | --- | --- | --- |
| | Shutter open position Pa2 | Disk force-in position Pa1 | | Floating lock dismissal position Pb1 | Stage unit lifting/lowering position Pb2 |
| | (FIG. 49,58) | (FIG. 27) | (FIG. 2) | (FIG. 50) | (FIG. 6) |
| Operational positions of slide plates 13, 14 | | Floating lock | | | Floating lock dismiss |
| Operational position of door open link 6 | Shutter open | | | Shutter close | |
| Operational position of eject arm 7 | Disk eject | | | Disk release | |
| Operational position of power link 9 | Stand-by | Rotation | | | Stand-by |
| Operational position of switch plate 72 | Switch released | | Switch pressed | Switch released | |

(2) Stage Unit Lifting/lowering Mechanism

Figure 6:
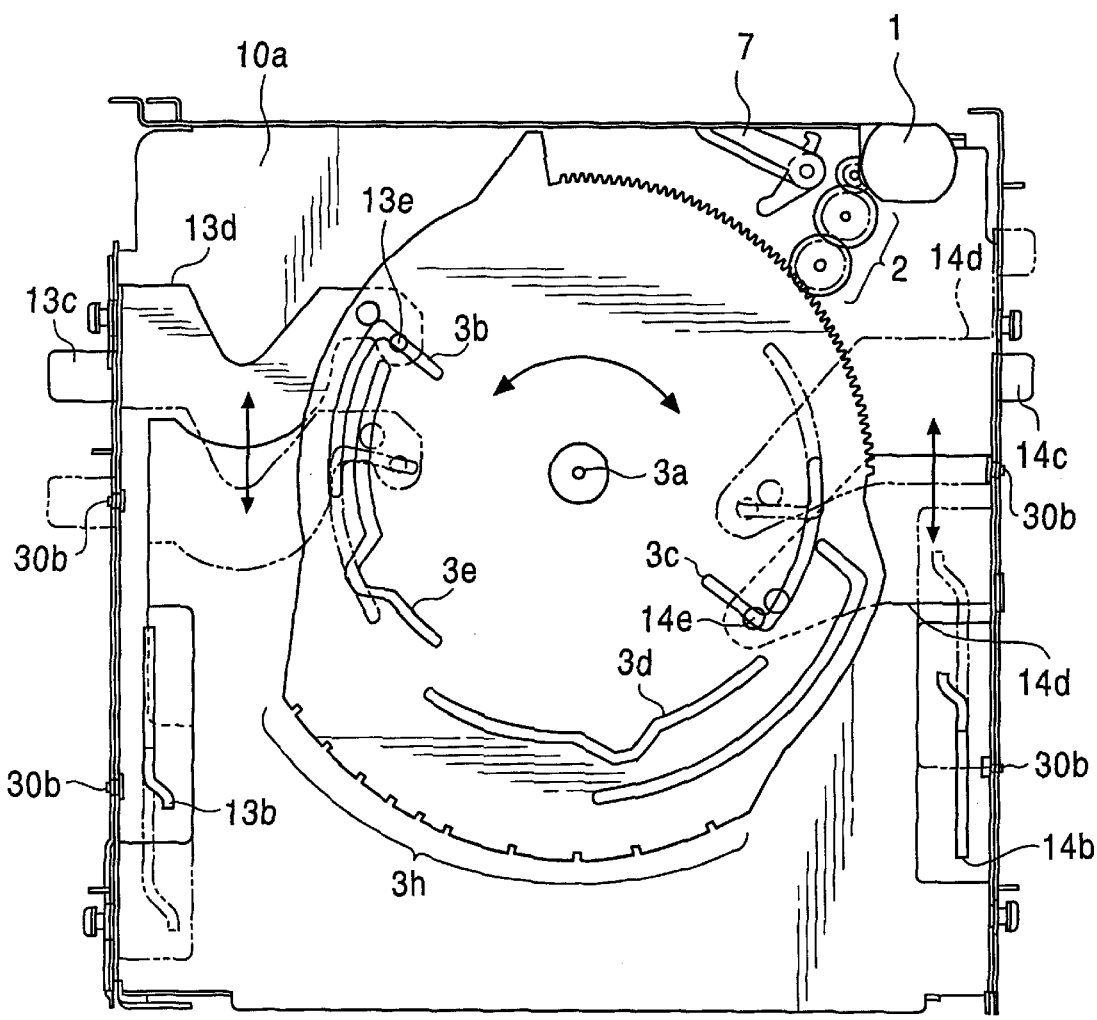
FIG. 6 is a plan view of part of the apparatus shown in FIG. 1, in a state in which the mode plate of the lower chassis unit shown in FIG. 1 is in a stage-unit lifting position.
Figure 7:
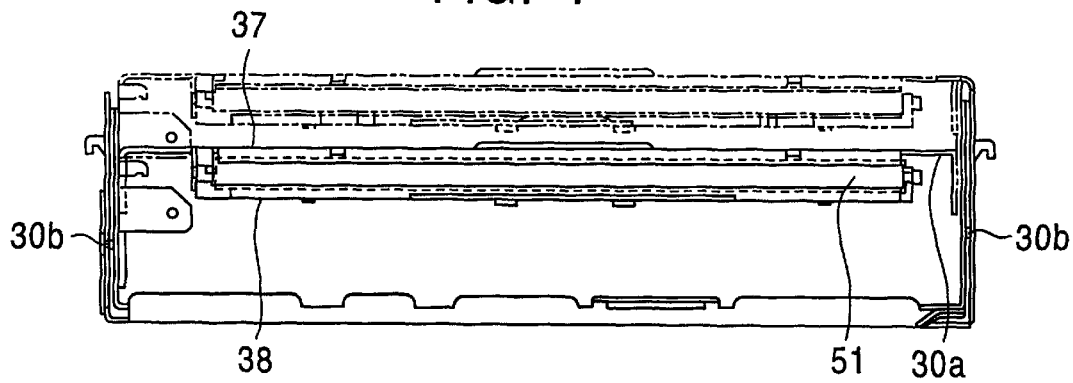
FIG. 7 is a front elevational view of the part shown in FIG. 6.

FIGS. 4 to 7 are illustrations of an arrangement or mechanism for lifting and lowering the stage unit 30 by means of a pair of slide plates 13 and 14. FIGS. 6 and 7 are respectively a plan view and a front elevational view of the mechanism. As will be seen from FIGS. 4 and 5, the stage unit 30 has a stage 30a each lateral side of which is provided with a pair of pins 30b, 30b. The pins 30b, 30b; 30b, 30b on both lateral sides of the stage 30a are received in respective stepped cams 13a, 13a; 14a, 14a of the respective slide plates 13 and 14. The arrangement is such that the stage unit 30 is lifted or lowered to a level that is determined by the steps of the stepped cams 13a, 14a each of which has six steps.

More specifically, as shown by solid line in FIGS. 4 to 7, when the pins 13e, 14e on the slide plates 13, 14 are positioned on initial straight horizontal portions of the stepped cams 13a, 14a, the stage unit 30 is disposed at the lowermost position. When the pins 13e, 14e of the slide plates 13, 14 are positioned in the uppermost horizontal straight portions of the stepped cam 13a, 14a, the stage unit 30 is held at the uppermost position.

(3) Disk Holder

Figure 8:
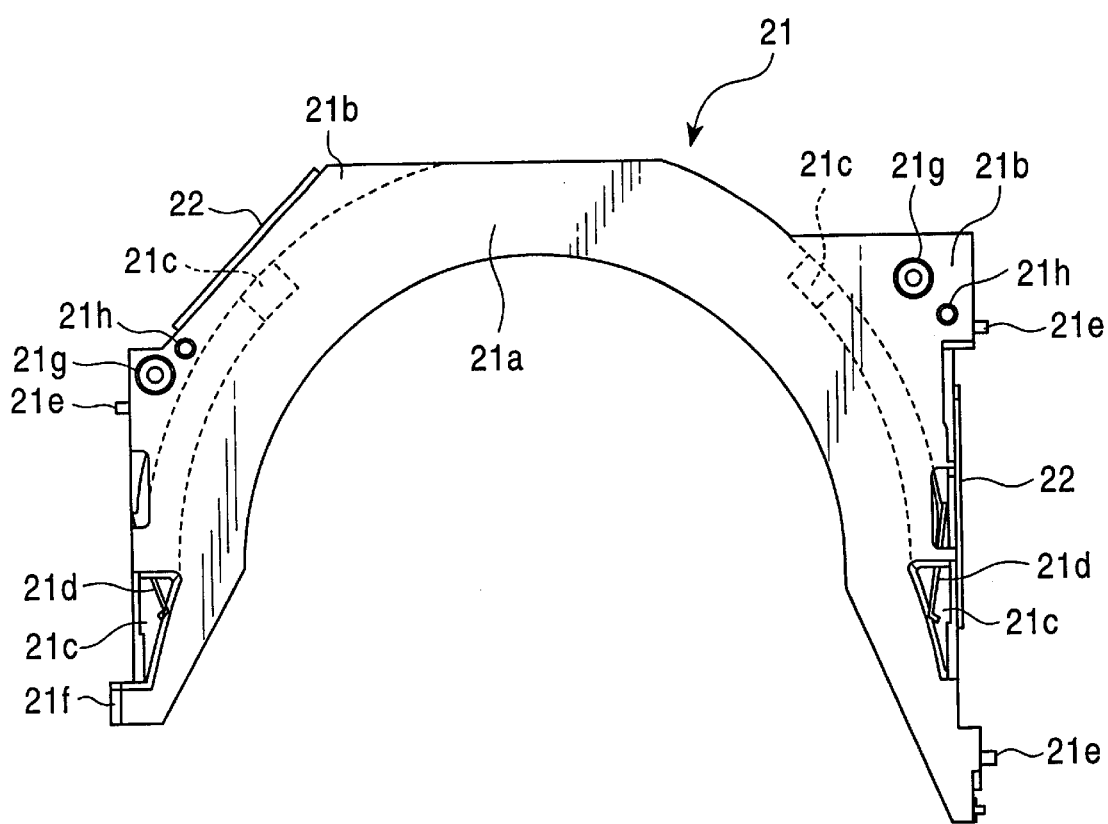
FIG. 8 is a plan view of the disk holder showing the structure thereof.
Figure 9:
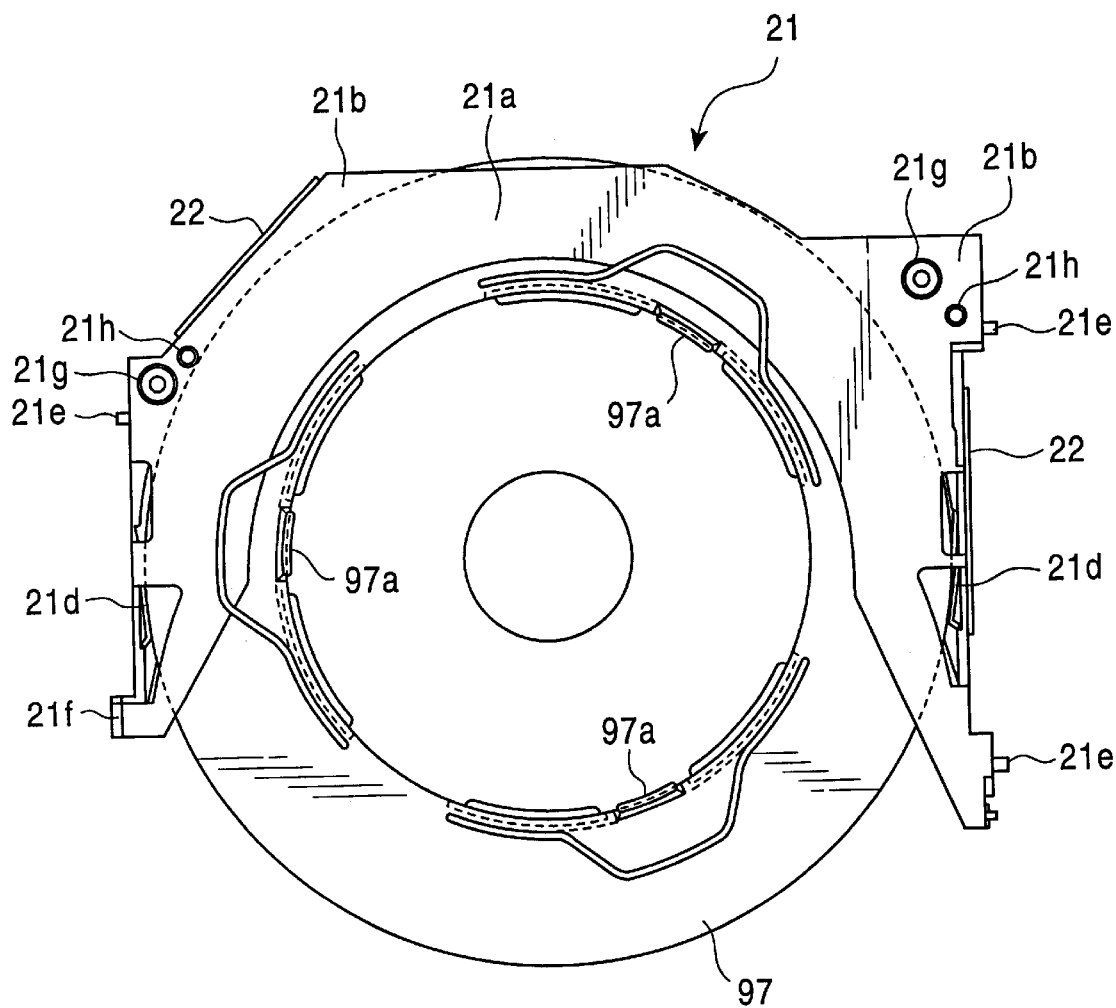
FIG. 9 is a plan view of the disk holder shown in FIG. 8, receiving an 8-cm disk held by an adapter.
Figure 10:
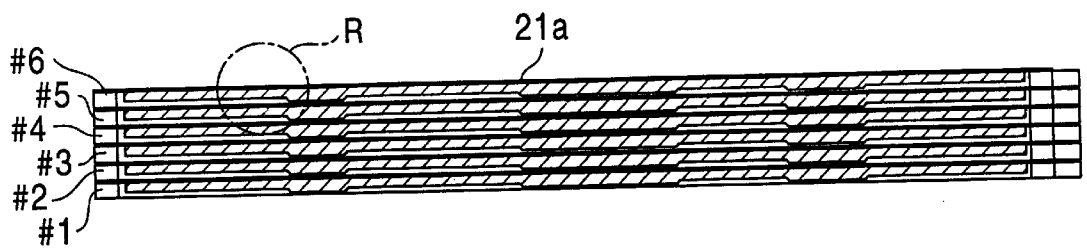
FIG. 10 is a longitudinal sectional side view of a stack of disk holders of the type shown in FIG. 8.
Figure 11:
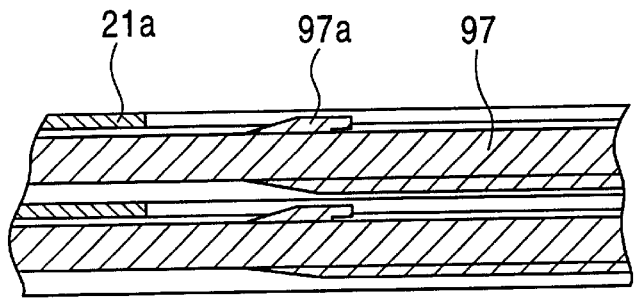
FIG. 11 is an enlarged view of a portion encircled by a circle R in FIG. 10.

FIGS. 8 and 9 are plan views of the disk holders stacked on the lower chassis unit 10. As will be seen from FIG. 8, each disk holder 21 is constituted by a C-shaped partition plate 21a and a disk holding member 21b which is formed on both left and right sides of the partition plate 21a. As will be seen from FIG. 9, the partition plate 21a has an arc of a diameter greater than the inside diameter of an 8-cm disk adapter 97, so that the partition plate 21a does not overlap radial protrusions 97a on the adapter 97, as will be seen from FIGS. 10 and 11. Referring again to FIG. 8, the disk holding member 21b is provided with holding portions 21c that are spaced a predetermined distance from the partition plate 21a and that serve to hold a received disk from the lower side thereof.

Figure 12A:
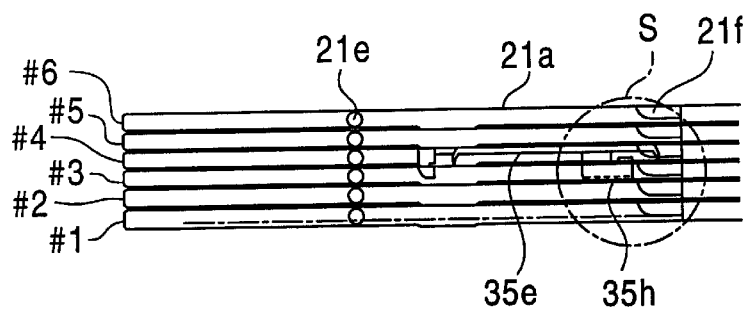
FIG. 12A is a transparent side view of part of the apparatus showing the disk holder shown in FIG. 8 in a state before the start of disk loading/ejection operation.
Figure 12B:
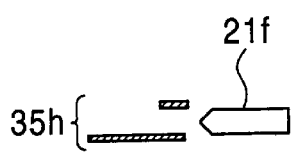
FIG. 12B is an enlarged view of a portion encircled by a circle S in FIG. 12A.
Figure 13A:
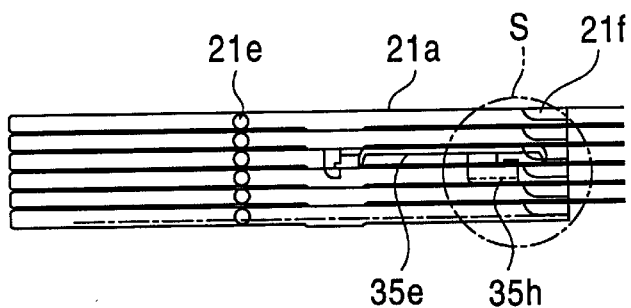
FIG. 13A is a transparent side view of part of the apparatus showing the disk holder shown in FIG. 8 in a state in which the disk loading/ejection operation is started.
Figure 13B:
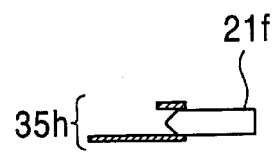
FIG. 13B is an enlarged view of a portion encircled by a circle S in FIG. 13A.
Figure 14A:
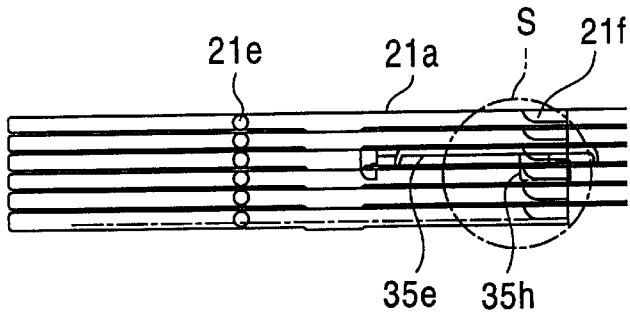
FIG. 14A is a transparent side view of part of the apparatus showing the disk holder shown in FIG. 8 in a state in which the loading/ejection operation is being executed.
Figure 14B:
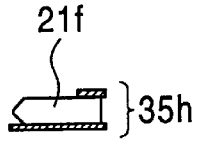
FIG. 14B is an enlarged view of a portion encircled by a circle S in FIG. 14A.

A pair of disk hold springs 21d for holding a disk are disposed on the left and right sides of an entrance (downward opening as viewed on FIG. 8) of each disk holder 21, in order to hold the disk. As shown in FIG. 9, when the disk is held at a predetermined position within the disk holder 21, each disk holding spring 21d serves to press at its one end the disk inwardly of the disk holder (upper side as viewed in the Figure) 21b. A projection 21e is formed on a left rear end of the outer face of the disk holding member 21b, while a pair of projections 21e are formed on the right front end and right rear end of the outer surface of the disk holding member 21b. These projections 21e are adapted to engage with cam grooves formed in the side select plates 4, 5. Further, as shown in FIGS. 12 to 14, a substantially rectangular parallelepiped locating projection 21f is formed so as to project horizontally from the left front end of the disk holder 21.

There are six disk holders each having the described structures. Disk holder numbers from #1 to #6 are allocated to these disk holders, with #1 assigned to the lowermost disk holder and #6 to the topmost disk holder of the stack. The projections 21e and the locating projection 21f of the six disk holders #1 to #6 are vertically aligned. As will be seen from FIGS. 8, 9 and 15 through 19, the disk holders 21 are penetrated by vertical tubular guide sleeves 21g at their left and right portions. Guide holes 21h, 21h are formed in the vicinity of the respective guide sleeves 21g.

Figure 15:
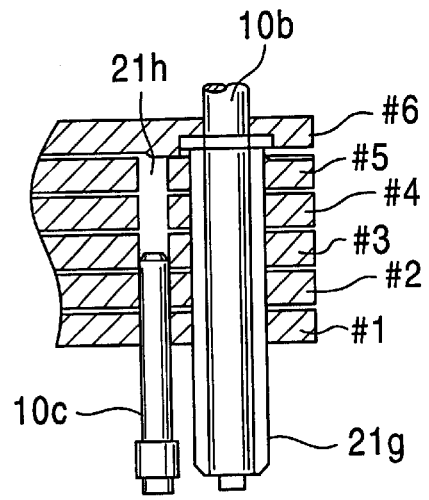
FIG. 15 is an enlarged longitudinal sectional view of a supporting portion of the disk holder shown in FIG. 8.
Figure 16:
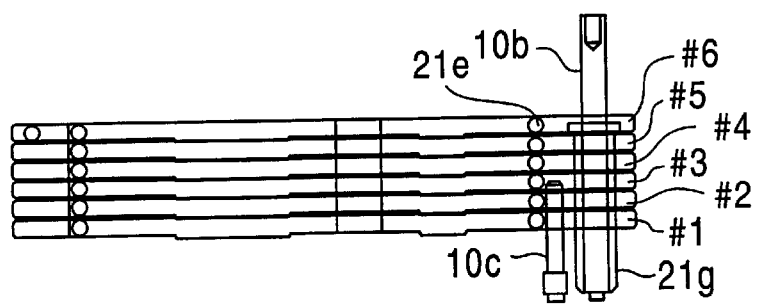
FIG. 16 is a transparent side view of part of the apparatus showing the disk holder shown in FIG. 8 in an initial state.
Figure 17:
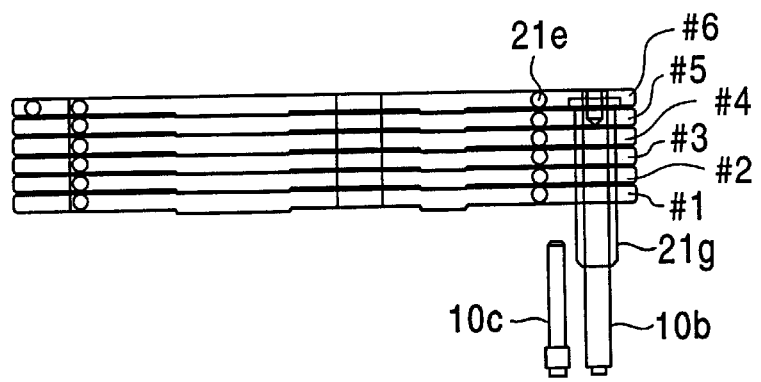
FIG. 17 is a transparent side view of part of the apparatus in a state in which all the disk holders of the type shown in FIG. 8 have been elevated as a unit.
Figure 18:
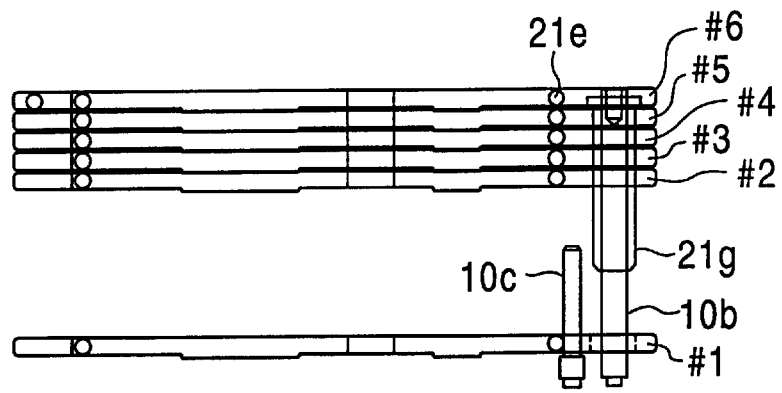
FIG. 18 is a transparent side view of part of the apparatus in a state in which upper four disk holders of the type shown in FIG. 8 have been elevated.
Figure 19:
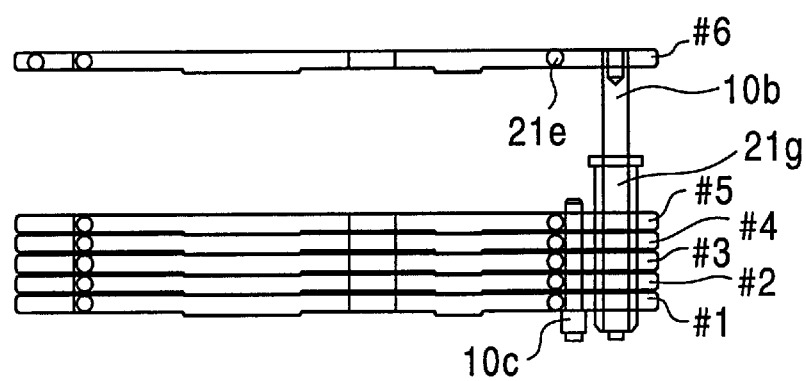
FIG. 19 is a transparent side view of part of the apparatus in a state in which only the uppermost disk holder of the type shown in FIG. 8 has been elevated.

As will be seen from FIG. 1 and FIG. 15, first guide pins 10b and second guide pins 10c are fixed to the chassis body 10a so as to extend vertically. The disk holders #1 to #6 are held on the chassis body 10a, with their guide sleeves 21g receiving the first guide pins 10b, while the guide holes 21h receive the second guide pins 10c. The arrangement is such that the disk holders #1 to #6 are movable up and down while being guided by the guise sleeves 21f and the guide pins 10c. As will be seen from FIGS. 16 to 19, the first guide pin 10b has a length large enough to guide all the disk holders #1 to #6 regardless of their vertical positions or levels, while the second guide pin 10c has such a length that it comes off the guide holes 21h of the disk holders that have been moved upward.

Figure 20:
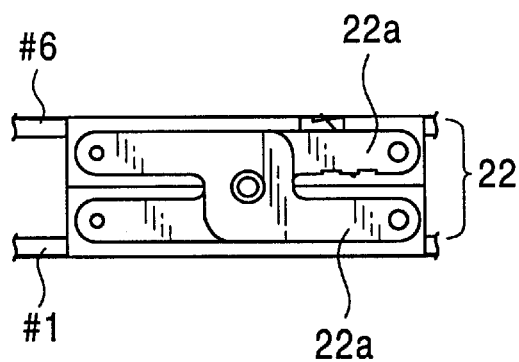
FIG. 20 is a side elevational view of the disk holder shown in FIG. 8 in a state in which a pantograph of the disk holder has been closed.
Figure 21:
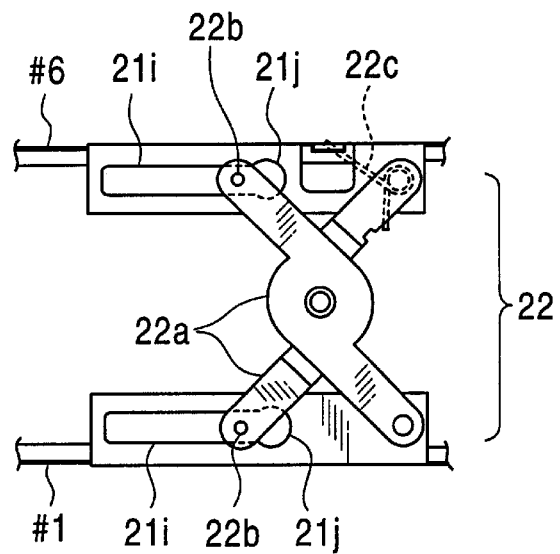
FIG. 21 is a side elevational view of the disk holder shown in FIG. 8 in a state in which the pantograph of the disk holder has been opened.

The topmost disk holder #6 and the lowermost disk holder #1 are interconnected by pantographs 22 that are provided on the left rear side and the right side of these disk holders. As shown in FIG. 20, each pantograph 22 is composed of a pair of plates which are cross each other and pivotally connected to each other at the crossing point. As shown in FIG. 21, the plates 22a constituting the pantograph are pivotally connected at their one ends to the outer faces of the disk holder #6 and the disk holder #1, respectively.

The other ends of the plates 22a carry slide pins 22b that are slidably received in slide grooves 21i formed in the outer side walls of the disk holders #6 and #1. An enlarged end portion 21j of the slide groove 21i is adapted to be engaged slide pins 22b. These plates 22a are urged in the closing direction, i.e., into flat laid-down position, by means of a torsion spring 22c, whereby the stack of the disk holders 21 is pressed inward both from the upper and lower sides of the stack.

[2. Upper Chassis Unit]

Figure 22:
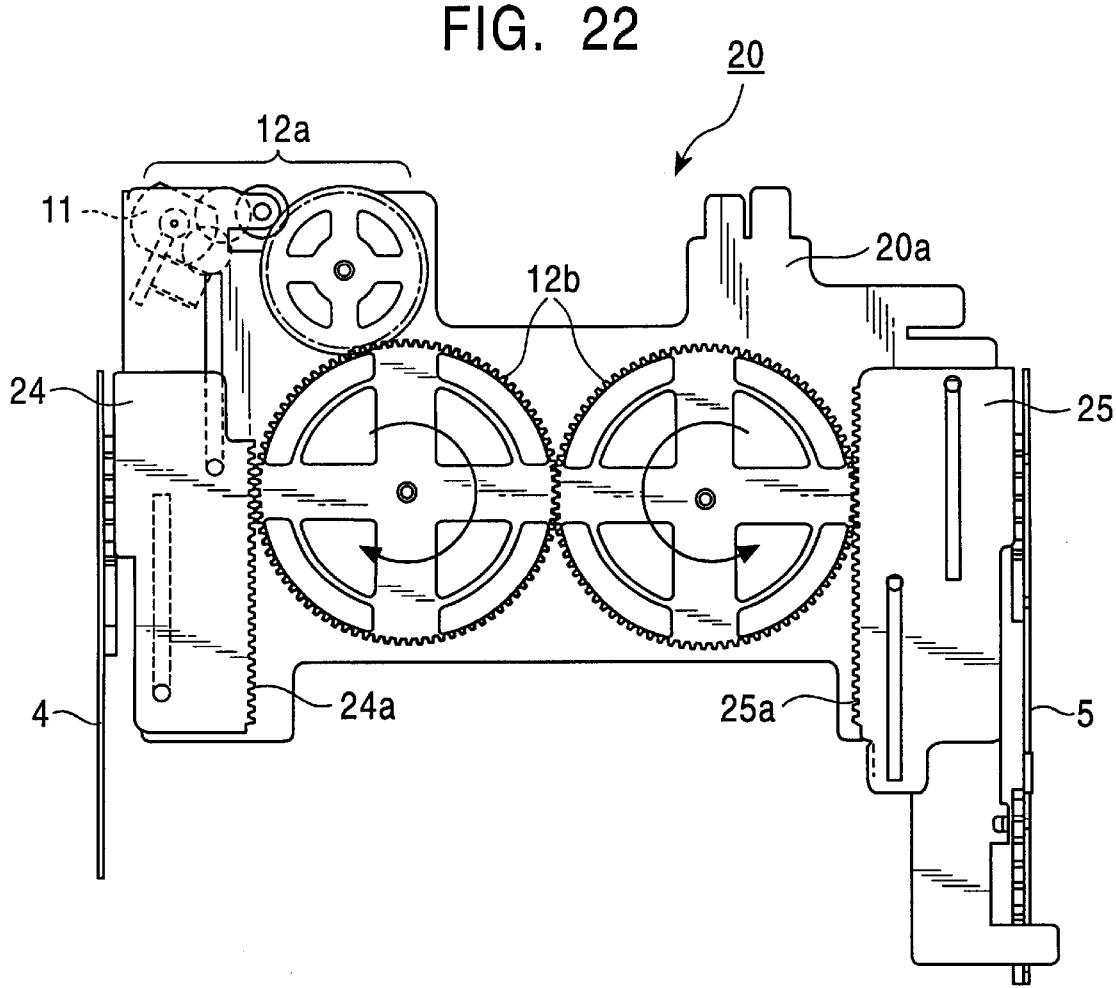
FIG. 22 is a plan view of an upper chassis unit shown in FIG. 1.
Figure 23:
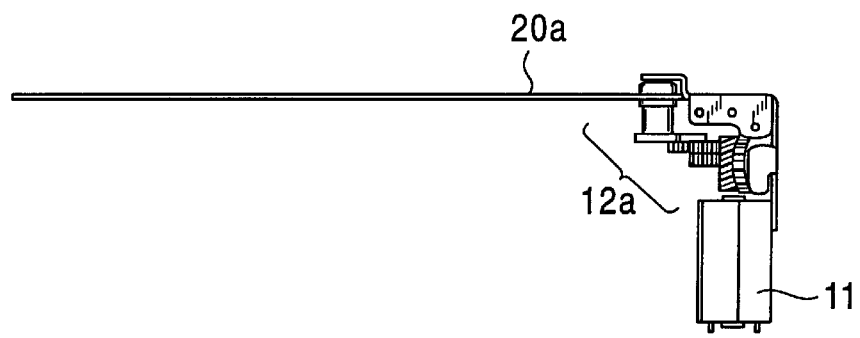
FIG. 23 is a rear view of the upper chassis unit shown in FIG. 1.
Figure 24:
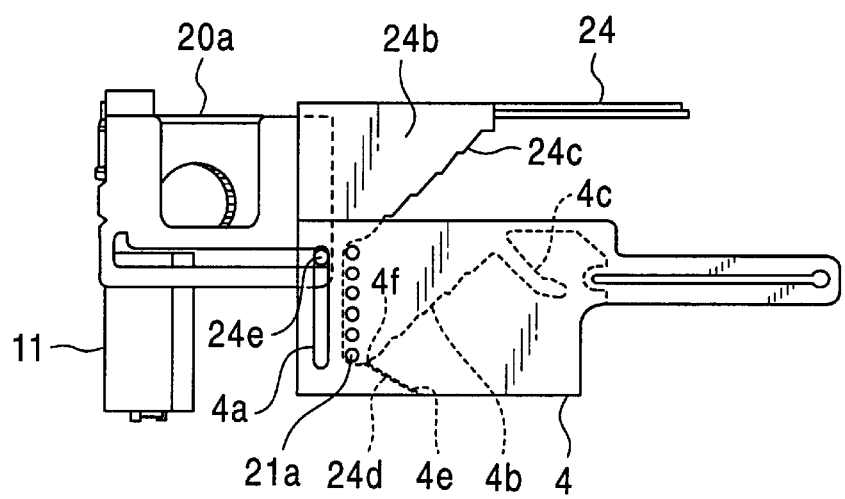
FIG. 24 is a side view of the upper chassis unit of FIG. 1 as viewed from the left side thereof.

A description will now be given of the structure of an upper chassis unit 20 having the mechanism for moving the disk holders 21 up and down, with reference to FIGS. 22, 23, 24 and 25 which are a plan view, a rear elevational view, a side view as viewed from the right side and a side view as viewed from the left side, respectively. Referring first to FIG. 22, a plurality of co-planar gears are arranged on the upper surface of a chassis body 20a of the upper chassis 22. These gears include a driving gear train 12a drivingly connected to the second motor 11 and a pair of large gears 12b that transmit the output rotation of the driving gear train 12a to the racks 24a, 25a of the upper select plates 24, 25.

The upper select plates 24, 25 are mounted on left and right end portions of the chassis body 20a, for sliding motion in the back and forth directions. The upper select plates 24 and 25 are respectively bent vertically at their outer sides so as to provide side walls 24b and 25b. Stepped upper cams grooves 24c, 25c, that rise towards the front end, are formed in upper portions of the side walls 24b, 25b, while lower slant portions 24d, 24d that descend towards the front end are formed in lower portions of the side walls 24b, 25b.

To the upper select plates 24 and 25, connected respectively are the side select plates 4 and 5, in a manner described below. The side select plates 4 and 5 are disposed to extend along the inner surfaces of the left and right side walls of the stage unit 30 so as to slide back and forth relative to the stage unit 30 and so as to be moved up and down together with the stage unit 30. Pins 24e and 25e are provided on the upper select plates 24 and 25 at positions near the lower ends of the upper cam grooves 24c and 25c, respectively. These pins 24e and 25e are slidably received in straight vertical guide grooves 4a and 5a that are formed in the side select plates 4 and 5, respectively.

Due to the engagements between the pins 24e, 25e and the guide grooves 4a, 5a, the side select plates 4, 5 are moved back and forth together with the upper select plates 24, 25 as the upper select plates 24, 25 move back and forth. The arrangement, however, although the upper select plates 24, 25 move up and down following the movement of the stage unit 30 up and down, the side select plates 4, 5 do not follow the vertical motion of the stage unit 30, because the vertical movements of the pins 24e, 25e are accommodated by the vertical guide grooves 4a, 5a.

The side select plates 4, 5 are provided with stepped dividing cam groove 4b, 5b that oppose to and extend in parallel with the upper cam grooves 24c, 25c formed in the upper select plates 24, 25. The side select plates 4, 5 are also provided with upper slant portions 4e, 5e which oppose to and extend in parallel with the lower slant portions 24d, 25d of the upper select plates 24, 25. The side select plates 4, 5 are further provided with chucking cam grooves 4c, 5c which are cutouts extending obliquely downward from portions of the diving cam grooves 4b, 5b near the upper ends of the latter. More specifically, the chucking cam grooves 4c, 5c extend downward to a level near the middle of the height of the side plates 4, 5, and have horizontal lower end portions.

The transition regions between the chucking cam grooves 4c, 5c and the associated dividing cam grooves 4b, 5b provide horizontal sections 4d, 5d for retraction. The points where the dividing cm grooves 4c, 5c and the upper slant portions 4e, 5e merge form acute portions 4f, 5f. A plurality of slits 5g corresponding to operational positions of the side select plate 5 are formed in the upper edge of the left side select plate 5 of the stage unit 30.

As will be described later, the projections 21a on the disk holders #1 to #6 are adapted to be urged up and down, by means of the dividing cam grooves 4b, 5b. Chucking cam grooves 4c, 5c, horizontal portions 4d, 5d for retraction, upper slant portions 4e, 5e and the acute portions 4f, 5f. The side select plates 4, 5 are moved up and down in accordance with the vertical movement of the stage unit 30, so as to select a separation position where the disk holders are to be divided into groups.

[3. Stage Unit]

(1) Horizontal Gear Mechanism

Figure 26:
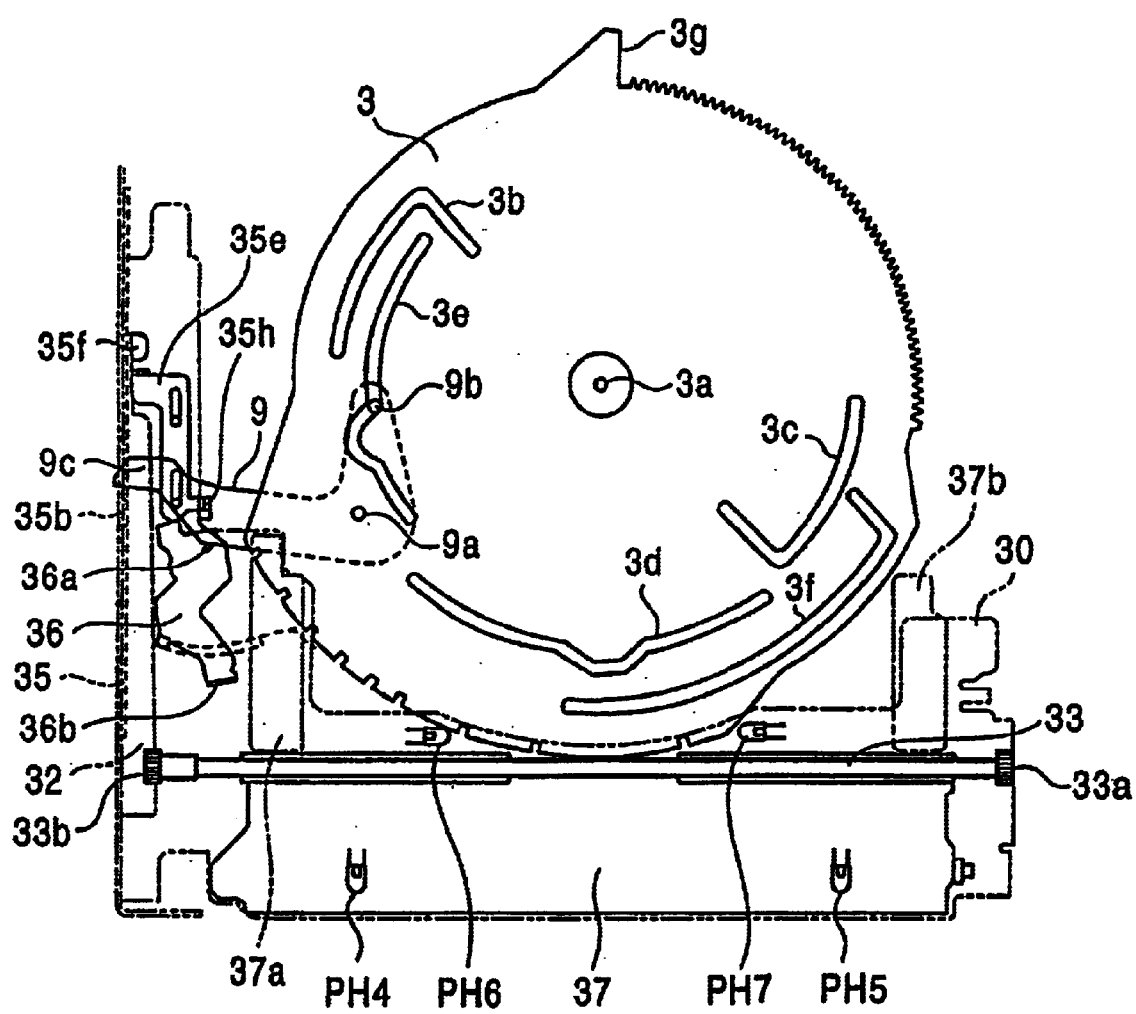
FIG. 26 is a plan view of the lower chassis unit shown in FIG. 1 in a state in which a stage power link of the lower chassis unit has been set in a stand-by position.
Figure 27:
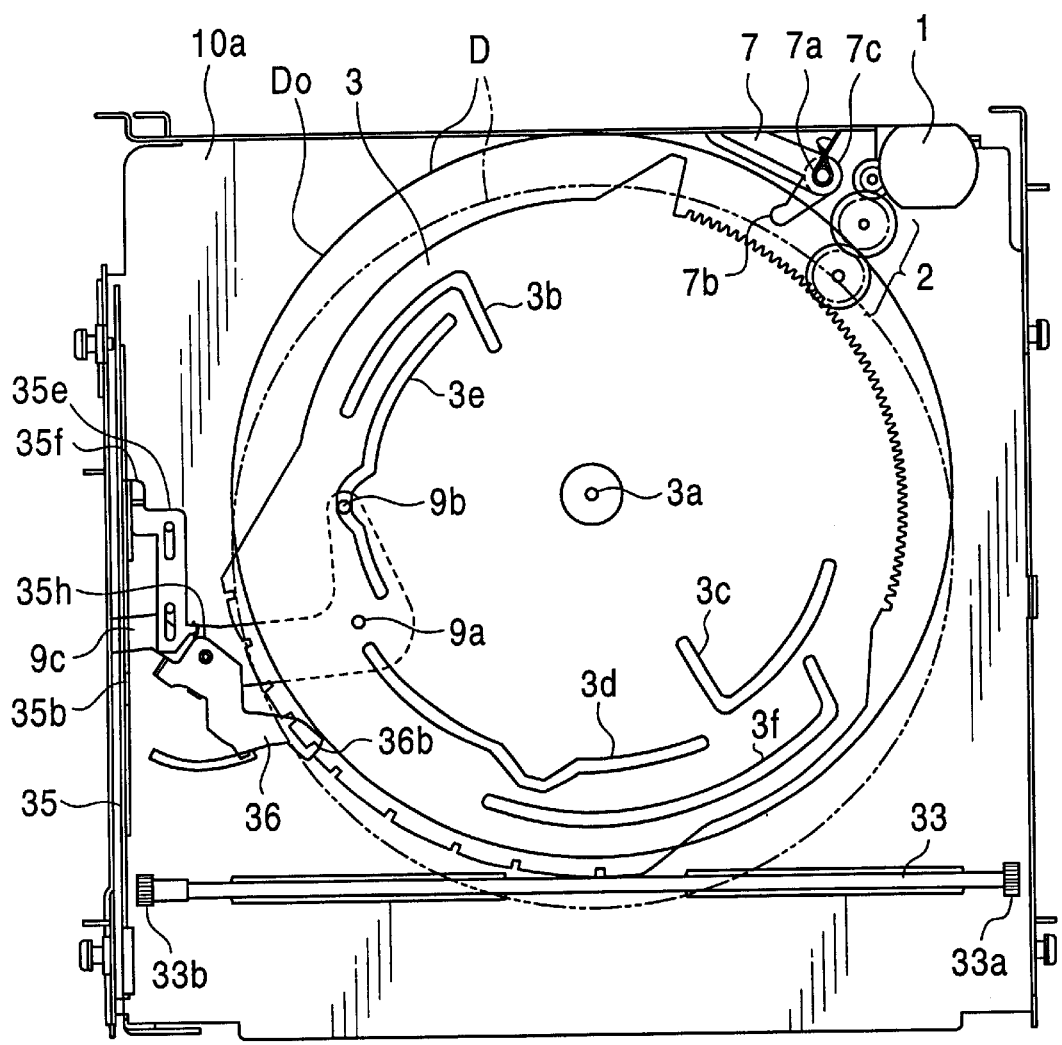
FIG. 27 is a plan view of the lower chassis unit shown in FIG. 1 in a state in which the stage power link of the lower chassis unit has been set in a rotated position.
Figure 28:
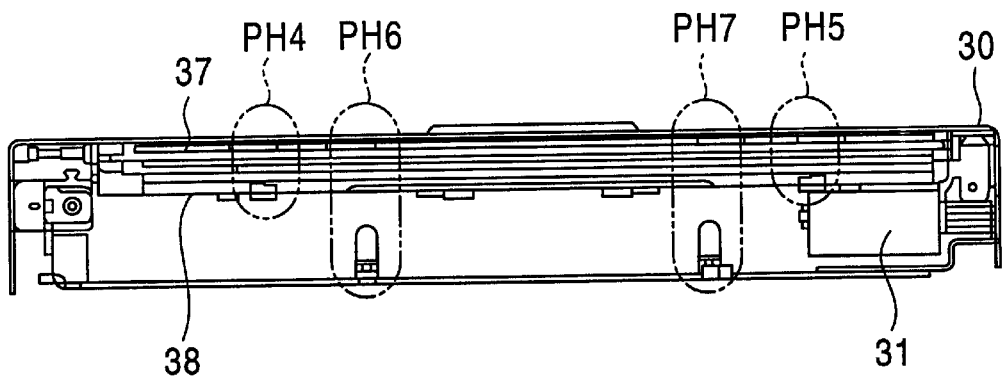
FIG. 28 is a front elevational view of a sensor which is provided on a disk guide shown in FIG. 1.
Figure 29:
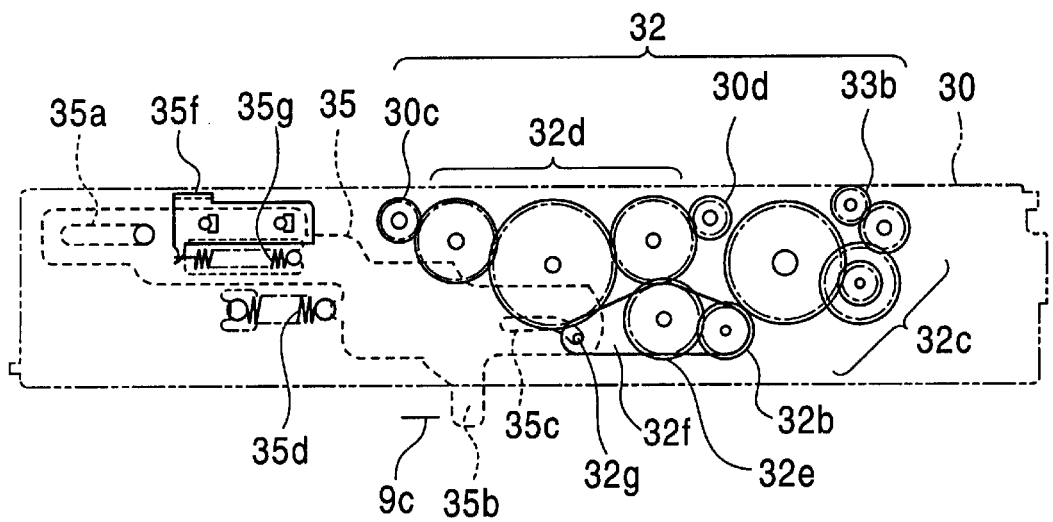
FIG. 29 is a transparent side view of part of the apparatus, illustrating a stage unit shown in FIG. 1 in a state in which an idler gear of a horizontal driving gear mechanism of the stage nit is in an engaged state, as viewed from the left side.
Figure 30:
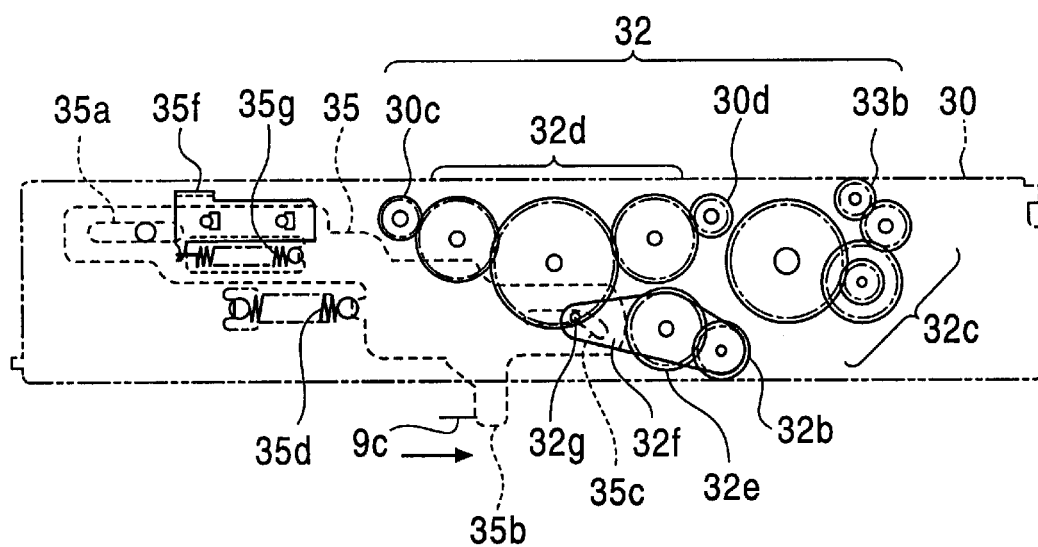
FIG. 30 is a perspective side view of part of the apparatus, illustrating the stage unit shown in FIG. 1 in a state in which the idler gear of the horizontal driving gear mechanism of the stage nit is in a disengaged state, as viewed from the left side.
Figure 31:
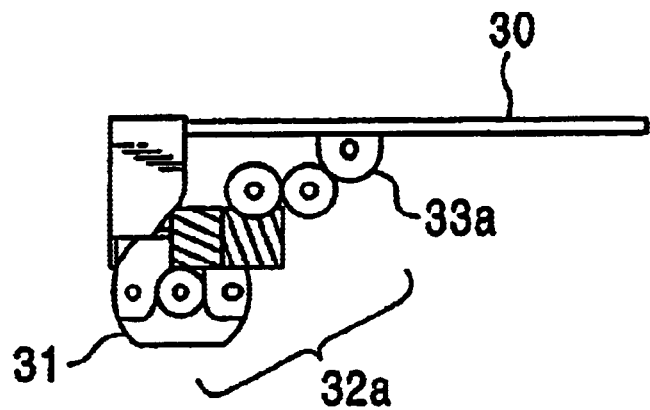
FIG. 31 is a transparent view of part of the apparatus showing a gear train on a motor of the horizontal driving mechanism of the stage unit shown in FIG. 1, as viewed from the left side.
Figure 32:
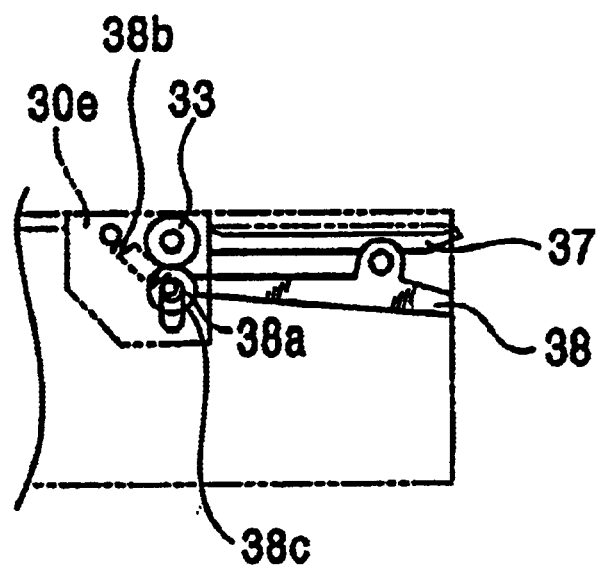
FIG. 32 is a transparent view of part of the apparatus showing a lower roller support portion in the stage unit shown in FIG. 1, as viewed from the left side.

FIGS. 26 to 32 show arrangements of a portion of the stage unit 30 through which the disk is moved. More specifically, FIGS. 26 and 27 are plan views, FIG. 28 is a front view, FIGS. 30 and 32 are transparent side views as viewed from the left side, and FIG. 31 is a transparent view as viewed from the right side. The loading roller 33 and the drive base unit 40 are driven through the aforementioned horizontal drive gear mechanism 32 which ha the following construction. More specifically, as shown in FIGS. 1, 29 and 30, the drive plate 35 mentioned before is disposed along the inner face of the left side wall of the stage unit 30. The drive plate 35 is provided with a straight guide groove 35a that extends in the back and forth directions. The guide groove 35a receives a pin provided on the stage unit 30, so that the drive plate 35 is slidable back and forth relative to the stage unit 30.

As described before, the drive plate 35 is connected to the mode plate 3 via the stage power link 9. More specifically, the drive plate 35 is provided at its lower end with an engaging portion 35b which is engaged and urged by the pressing portion 9c of the stage power link 9, whereby the movement of the drive plate 35 back and forth is controlled in accordance with the rotational position of the mode plate 3. Further, the drive plate 35 is urged backward by means of the spring 35d.

As will be seen from FIGS. 29 and 30, a pair of stage gears 30c, 30d are provided on the left side face of the stage unit 30. These stage gears are drivingly connected via an intermediate gear train 32d, so as to rotate in the same direction. The spacing between the stage gears 30c and 30d is determined to be somewhat smaller than the length of the rack 47a of the rack plate 47 shown in FIG. 1.

Rotational motion of the loading gear 33 is transmitted to the stage gears 30c, 30d, through a gear train 32c on the guide shaft. That is to say, a left pinion 33b provided on the left end of the loading roller 33 engages with one end of the gear train 32c on the guide shaft, while the other end of the gear train 32c is disengageably engages with an idler gear 32b. The idler gear 32b is provided on the front end of the idler plate 32f, and is always connected via a relay gear 32e to the gear train 32d interconnecting the stage gears 30c, 30d.

At the same time, the idler plate 32f is rotatably mounted on the left side face of the stage unit 30, coaxially with the relay gear 32e. A pin 32g provided on the rear end of the idler plate 32f is received in the groove cam 35c formed in a front end portion of the drive plate 35. The groove cam 35c is stepped so as to descend towards the front end. The arrangement is such that, when the pin 32g is located at the front end of the groove cam 35c, the idler gear 32b engages with the gear train 32c on the guide shaft, as shown in FIG. 29, whereas, when the pin 32g is located at the rear end of the groove cam 35c, the idler gear 32b is disengaged from the gear train 32c on the guide shaft.

As shown in FIGS. 26 and 27, a stock arm (stock member) 36 is mounted for rotation about a pin 36a, at a position near the loading roller 33. The stock arm 36 has a pressing portion 36b which, when the stock arm 36 is rotated, presses a disk that has been spaced apart from the loading roller 33 into a predetermined holding position in the disk holder 21. The stock arm 36 is normally urged in a direction for releasing the disk, by a torsion spring which is not shown.

The rotation of the stock arm 36 is effected by a mechanism that has the following construction. Referring to FIGS. 26 and 27, a pressing plate 35e is disposed behind the stock arm 36, for sliding motion in the back and forth directions. The pressing plate 35e is movable to bring its front end into and out of contact with the rear end of the stock arm 36. As shown in FIGS. 29 and 30, a buffer plate 35f is disposed so as to overlap a rear portion of the drive plate 35. The buffer plate 35f is slightly movable back and forth relative to the drive plate 35, and is forwardly biased by a spring 35g which is stretched between the drive plate 35 and the buffer plate 35f.

As shown in FIGS. 27 and 28, part of the buffer plate 35f is brought into and out of contact with the rear end of the pressing plate 35e, in accordance with the movement of the drive plate 35. Consequently, the rotational motion of the stock arm 36 is controlled by the rotation of the mode plate 3 and by the positions of the drive plate 35 and the pressing plate 35e which are moved by the mode plate 3. As shown in FIGS. 12 to 14, as well as in FIGS. 26 and 27, a locating support portion 35h is provided on the inner edge of the pressing plate 35e. The locating support portion 35h includes a pair of parallel small plates which are vertically spaced from each other. The arrangement is such that, as the locating support portion 35h moves back and forth, the locating projection 21f of the disk holder 21 is received in the space between the small plates, thereby supporting the disk holder 21.

(2) Disk Loading/ejection Mechanism

A description will now be given of the disk loading/ejection mechanism of the stage unit 30. As will be seen from FIG. 28, the stage unit 30 is provided on its front end portion with an upper disk guide 37 and a lower disk guide 38 which guides a disk D being loaded or ejected, by engaging with the upper and lower sides of the disk D. As shown in FIG. 31, a third motor 31 is provided on the right end of the lower face of the lower disk guide 38 of the lower disk guide 38. The third motor 31 is connected to the gear train 32a of the horizontal drive gear mechanism 32 which is provided on the inner face of the right side wall of the stage unit 30. The arrangement is such that the power of the third motor 31 is always transmitted to the loading roller 33, via the motor gear train 32a which engages with a right pinion 33 provided on the right end of the loading roller 33.

As shown in FIG. 32, the upper disk guide 37 is fixed to the lower face of a flat plate of the stage 30a. The loading roller 33 is disposed behind the upper disk guide 37. The loading roller 33 is positioned such that, before a disk that has been drawn into the player so as to be loaded reaches a predetermined position within the disk holder 21, the disk leaves the loading roller 33. The lower disk guide 38 is disposed beneath the upper disk guide 37 and the loading roller 33, across a gap which constitutes a disk passage.

A pivot shaft 38a is disposed behind the lower disk guide 38, so as to extend in parallel with the loading roller 33 in vertical alignment therewith, and the lower disk guide 38 is pivotally supported by the pivot shaft 38. Around the pivot shaft 38a, formed is a lower roller 38c which is driven by the loading roller 33 to cooperate with the latter in clamping the disk therebetween.

The pivot shaft 38a is supported at its both ends for vertical movement by a pair of support plates 30e that are provided on the stage 30a. Both ends of the pivot shaft 38a are urged upward by a pair of springs 38b upward, i.e., in the direction for pressing the lower roller 33c against the loading roller 33. Further, as shown in FIG. 26, side disk guides 37a, 37b are formed at positions adjacent to the disk holder 21, near both ends of the loading roller 33 and the lower roller 33c, for engagement with left and right side edges of the disk, thereby guiding the movement of the disk.

Figure 39:
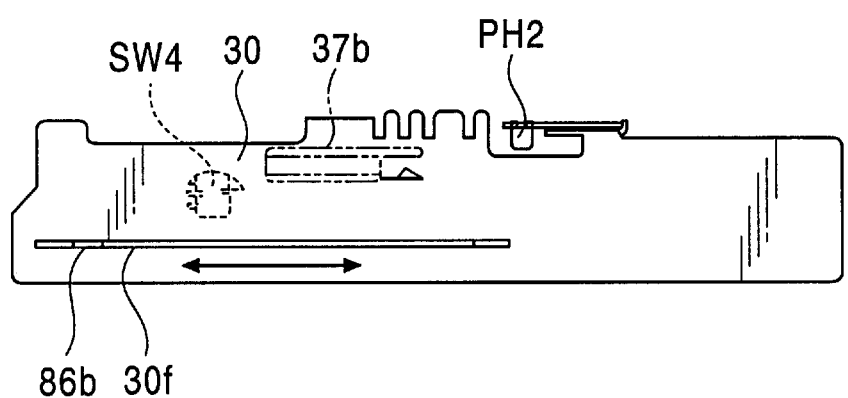
FIG. 39 is a side view of the stage unit shown in FIG. 1, as viewed from the right side thereof.

Side views of the side disk guides 37a, 37b are shown in FIGS. 39 and 55 to which reference will be made as the description proceeds. The portions of the side disk guides 37a, 37b adjacent to the disk holder 21 are tapered so as to permit easy passage of an edge of the disk when the disk is being ejected.

In operation, the power of the third motor 31 is transmitted to the loading roller 33 via the horizontal drive gear mechanism 32, whereby the disk is nipped between the loading roller 33 and the lower roller 38c so as to be fed horizontally. When no disk has been received, the lower roller 38c is held in pressure contact with the loading roller 33 by the urging force of the springs 38b. When a disk D is inserted, the force applied to the disk acts on the lower roller 38c so as to move the lower roller 38c downward against the biasing forces of the springs 38b. At the same time, the rear end portion of the load disk guide 38 also is lowered, so that a space for allowing introduction of the disk D is formed between the upper disk guide 37 and the lower disk guide 38, thereby assisting the loading roller 33 to feed the disk D inward, thus ensuring smooth loading operation.

(3) Setting of Disk in Disk Holder

Setting of the disk D into the disk holder 21 is conducted by forcing the disk D into the disk holding position D0, by causing the stock arm 36 to rotate via the drive plate 35, in accordance with the rotational position of the stage power link 9. More specifically, when the stage power link 9 is at the stand-by position as shown in FIGS. 2, 6, 49, 50 and 58, the drive plate 35 also is held at the rearwardly retracted position by the urging force of the spring 35d, so that the stock arm 36 is held in the initial position. In this state, the disk is not at all affected by the stock arm 36. However, when the stage power link 9 is moved to the position as shown in FIG. 27, the drive plate 35 is moved forward against the biasing force of the spring 35d, with the result that the stock arm 36 rotates to force the disk D into the disk holding position D0. During this operation for forcibly setting the disk D into the disk holding position D0, the buffer plate 35f acting between the drive plate 35 and the pressing plate 35e is caused to slide so as to stretch the spring 35g, thus absorbing and moderating the load applied by the stock arm 36.

When the mode plate 3 is at the disk force-in position Pa1, the stage power link 9 rotates so as to cause the drive plate 35 and the pressing plate 35e forward, as described before. Therefore, the locating projection 21f of the disk holder 21 is received in the gap defined in the locating support portion 35f, in accordance with the movement of the pressing plate 35, as shown in FIGS. 12 to 14. Thus, when the disk is being loaded or ejected, the disk holder 21 is supported at four portions: namely, at positions of the projections 21e and the position of the locating projection 21f.

(4) Horizontal Movement of Drive Base Unit

Figure 33:
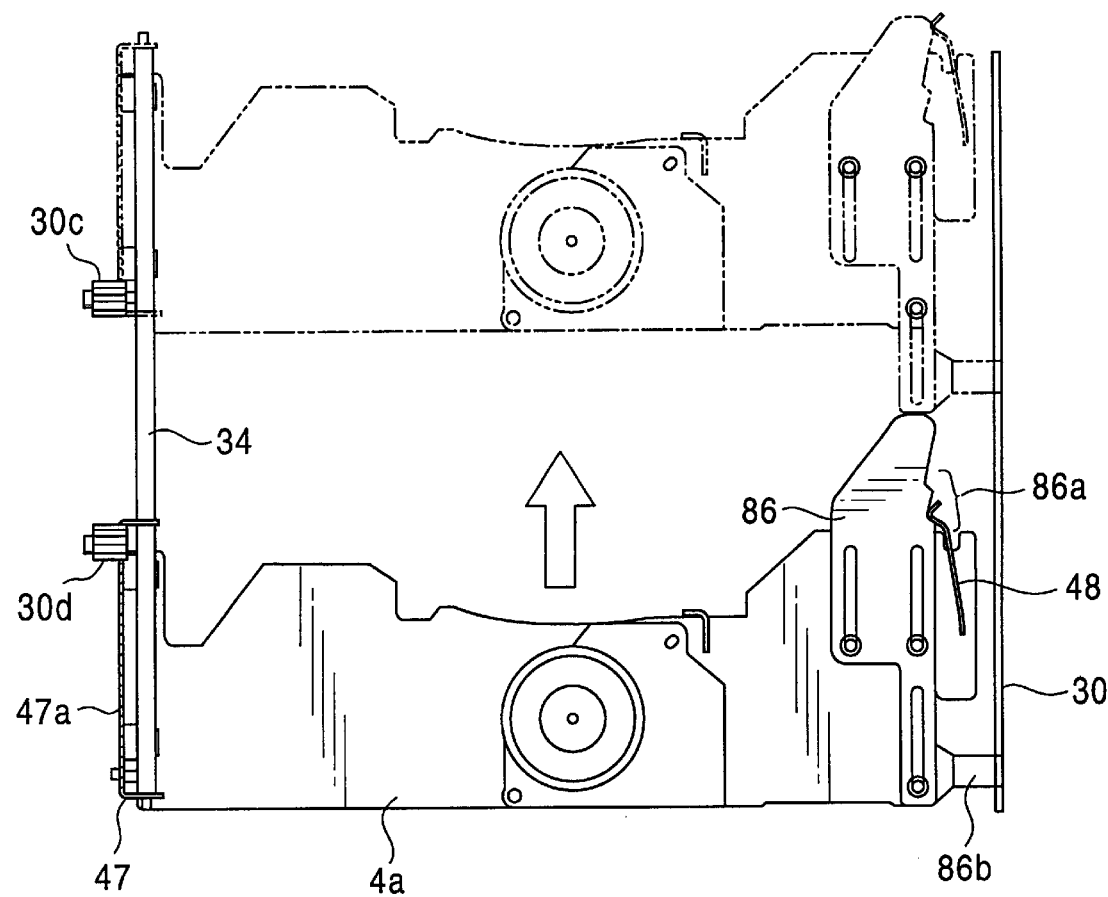
FIG. 33 is a plan view of part of the apparatus in which a drive base of the stage unit shown in FIG. 1 is in an initial position and in a chucking position.
Figure 34:
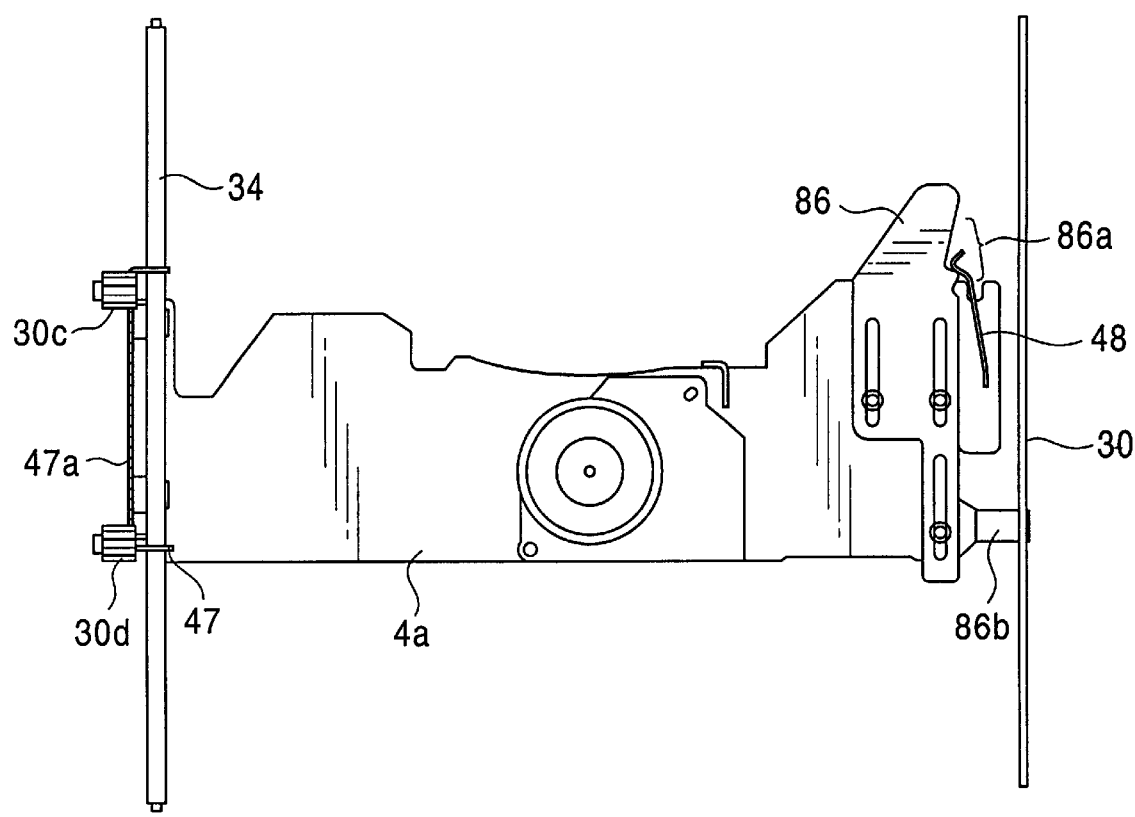
FIG. 34 is a plan view if the drive base in a playback position.
Figure 35:
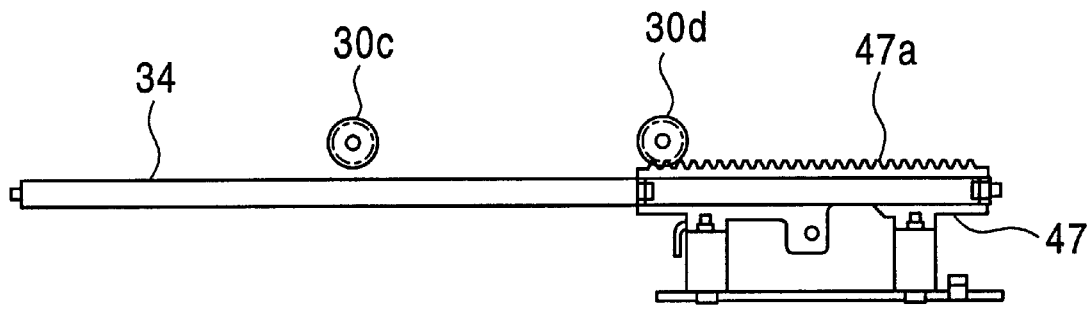
FIG. 35 is a side elevational view of the drive base of FIG. 33 in an initial position, as viewed from the left side thereof.
Figure 36:
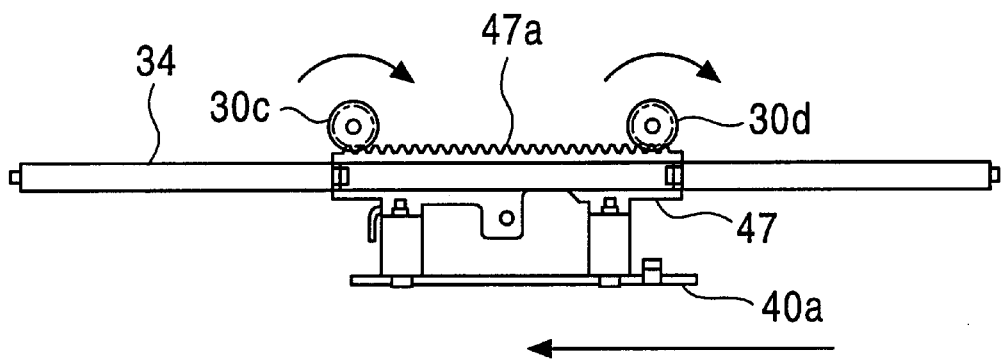
FIG. 36 is a side elevational view of the drive base of FIG. 33 in a playback position, as viewed from the left side thereof.
Figure 37:
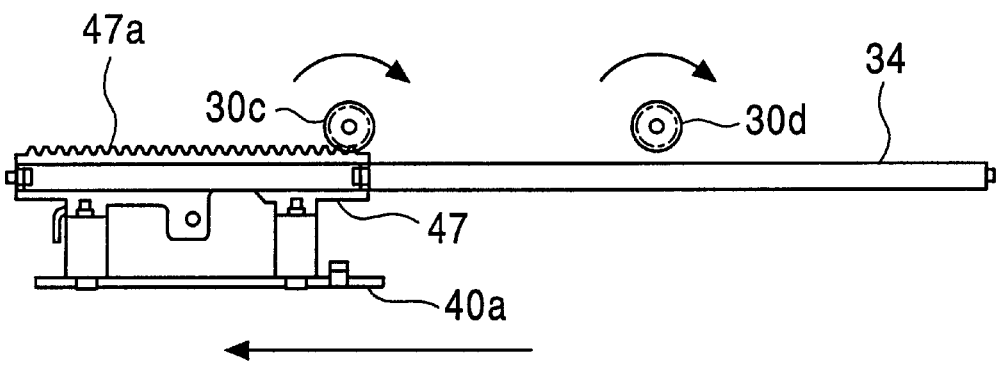
FIG. 37 is a side elevational view of the drive base of FIG. 33 in a chucking position, as viewed from the left side thereof.
Figure 38:
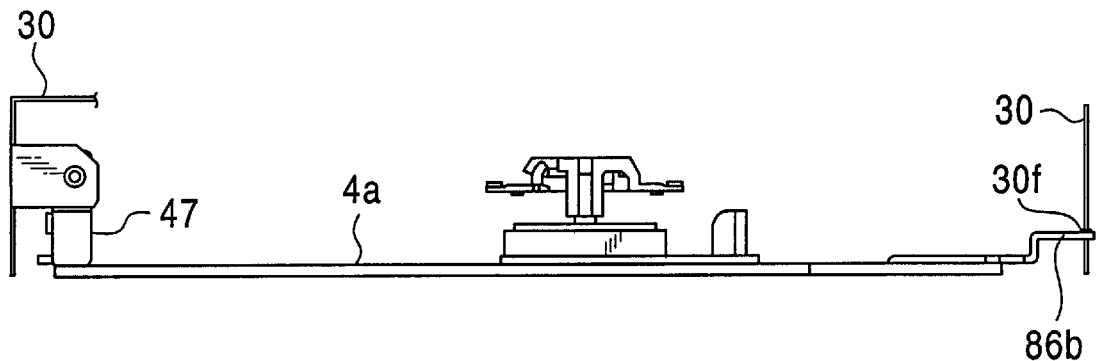
FIG. 38 is a front elevational view of the drive base shown in FIG. 33.

FIGS. 33 to 39 illustrate the structure for realizing horizontal motion of the drive base unit 40 on the stage unit 30. FIGS. 33 and 34 are plan views, FIGS. 35 to 37 are side views as viewed from the left side, FIG. 38 is a front view, and FIG. 29 is a side view as viewed from the right side.

More specifically, as shown in FIGS. 35 to 37, the guide shaft 34 provided on the stage unit 30 slidably carries a rack plate 47 which is provided on the upper edge thereof with the rack 47a. The rack 47a is engageable with the stage gears 30c, 30d which are provided on the inner face of the left side wall of the stage unit 30, as will be understood from FIGS. 29 and 39. As stated before, the spacing between the stage gears 30c and 30d is slightly smaller than the length of the rack 47b. The drive base 40a is therefore movable to and from either one of three positions: namely, a position at which the rack 47a engages only with the stage gear 30d as shown in FIG. 35, a position at which the rack 47a engages with both the stage gears 30c and 30d as shown in FIG. 36, and a position at which the rack 47a engages only with the stage gear 30c. The left end of the drive base 40a is secured to the lower end of the rack plate 47.

On the right end of the drive base 40a, disposed is a position plate 86 for sliding motion in back and forth directions. A plurality of notches 86a are formed in an edge of the position plate 86. The arrangement is such that an end of a position spring 48 engages with one of the notches 86a, thereby locating the drive base 40a. A regulating claw 86b projects to the right from a front end portion of the position plate 86. As will be seen from FIGS. 38 and 39, the regulating claw 86b is slidably received in a linear slit 30f which is formed in the right side wall of the stage unit 30 so as to extend in the forward and backward directions. The slit 30 has a length smaller than the stroke of the stage unit 30, but full stroking of the stage unit 30 is allowed by virtue of the movement of the sliding motion of the position plate 86.

[4. Drive Base Unit]

(1) Pickup Unit Feeding Mechanism

Figure 40:
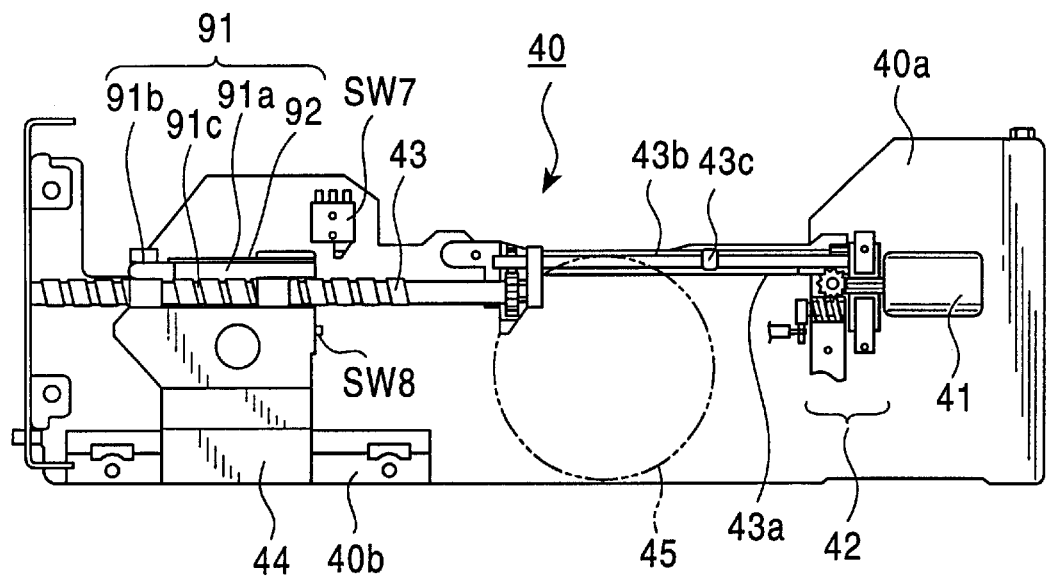
FIG. 40 is a plan view of a pickup driving gear mechanism on the stage unit shown in FIG. 33.
Figure 41:
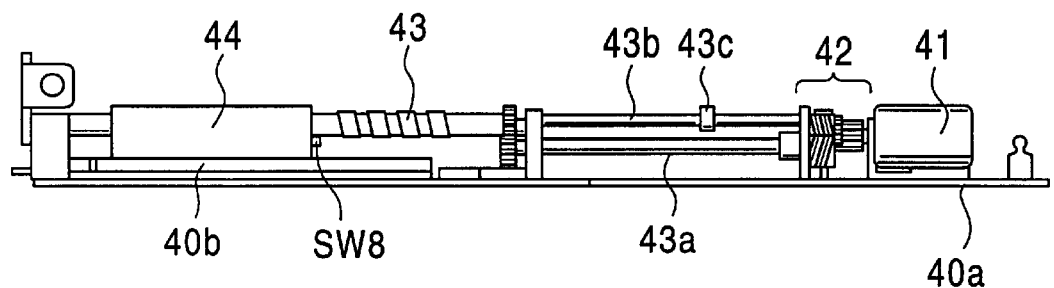
FIG. 41 is a front elevational view of the pickup driving gear mechanism shown in FIG. 40.
Figure 42:
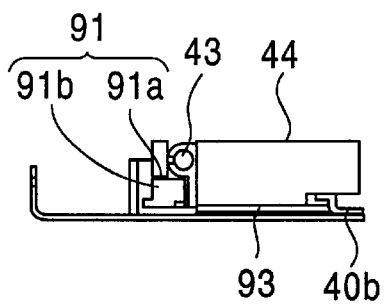
FIG. 42 is a sectional side elevational view of the pickup driving gear mechanism shown in FIG. 40, as viewed from the left side thereof.

FIGS. 40 to 42 illustrate a mechanism for feeding the pickup unit 44 on the drive base unit 40. FIG. 40 is a plan view, FIG. 41 is a front elevational view, and FIG. 42 is a side elevational view. In these Figures, elements which have no direct connection with the feeding mechanism are omitted, for the purpose of simplification of the drawings illustrative of the feeding mechanism.

As shown in FIGS. 40 and 41, the drive base 40a carries a lead screw 43 which extends in the longitudinal direction of the drive base 40. The end of the lead screw 43 adjacent to the turntable 45 is coupled through a gear to one end of the lead shaft 43a the other end of which is connected to the fourth motor 41 through a pickup driving gear mechanism 42. Thus, the arrangement is such that the driving power of the fourth motor 41 is transmitted to the lead screw 43 via the pickup drive gear mechanism 42 and the lead shaft 43a.

The pickup unit 44 is supported at its one end by the lead screw 43 and at its other end by the drive base 40a. More specifically, provided on one end of the pickup unit 44 is a screw holder 91 which has an L-shaped section presented by a vertical plate 91a and a horizontal plate 91b, as shown in FIG. 42. The horizontal plate 91b has one end which is fixed to he pickup unit 44. The vertical plate 91a of the screw holder 91 is so arranged that the lead screw 43 is clamped between the vertical plate 91a and a side wall of the pickup unit 44. A plurality of engaging projections 91c for engagement with the thread portion of the lead screw 43 are provided on the surface of the vertical plate 91a facing the lead screw 43. Part of the engaging projections 91c is resiliently held by a tabular screw holder spring 92 so as to be urged into engagement with the lead screw 43, thus eliminating any rattle and play.

As shown in FIG. 42, a leaf spring 93 is provided on the lower face of the pickup unit 44. The leaf spring 93 resiliently supports the pickup unit 44 for sliding movement relative to the guide rail 40b, whereby rotation and rattle of the pickup unit 44 are avoided. According to this arrangement, the pickup unit 44 moves on and along the lead screw 43, as the lead screw 43 is rotated by the power of the fourth motor 41.

(2) Turntable Unit

Figure 43:
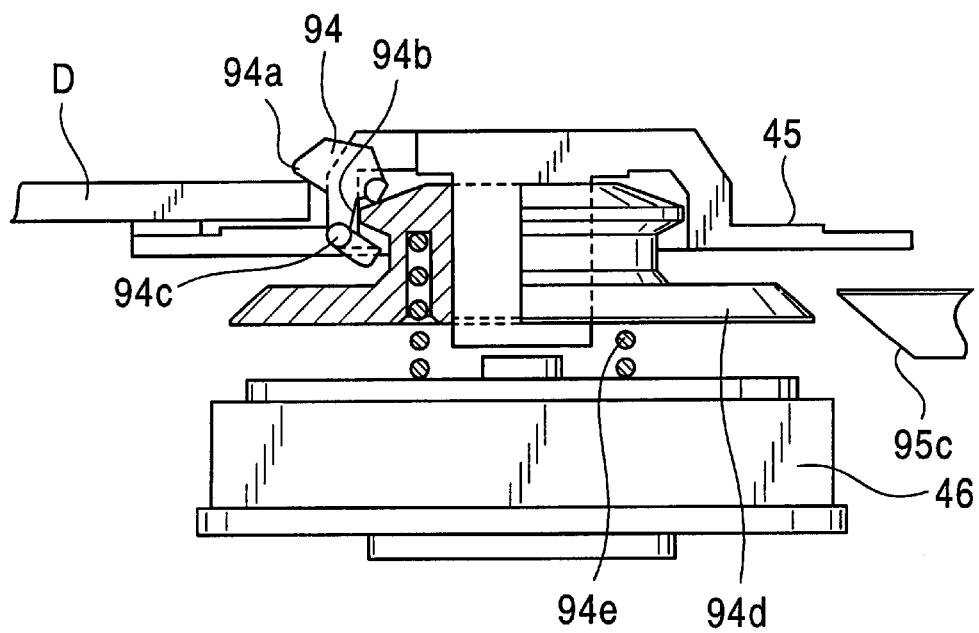
FIG. 43 is a longitudinal sectional view of a critical portion of the apparatus, showing a turntable unit on the stage unit shown in FIG. 33, illustrative of the state of chucking the disk by the turntable unit.
Figure 44:
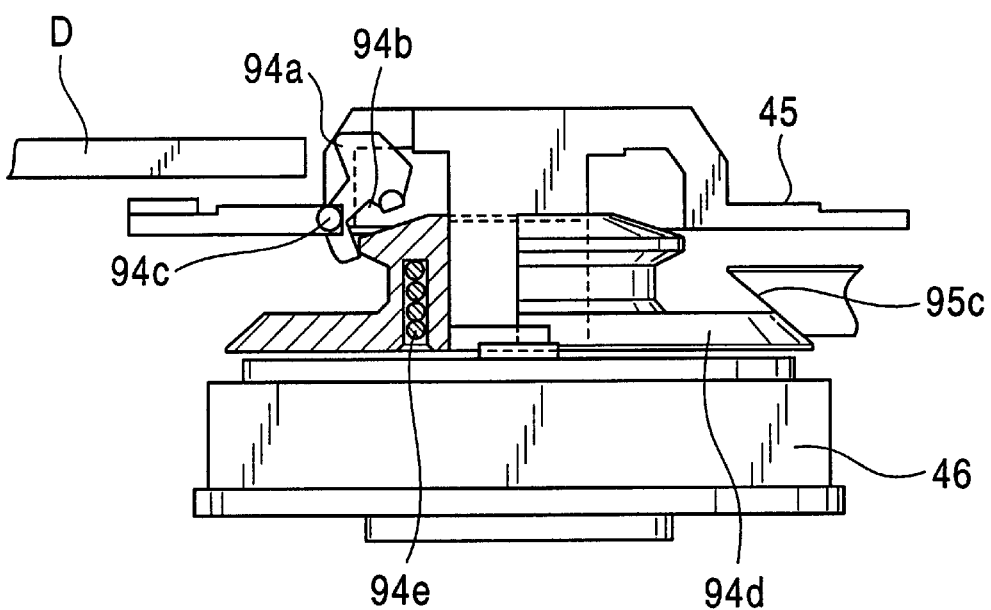
FIG. 44 is a longitudinal sectional view of the critical portion of the apparatus, showing the turntable unit on the stage unit shown in FIG. 33, illustrative of the state in which the disk has been released from the turntable unit has.
Figure 45:
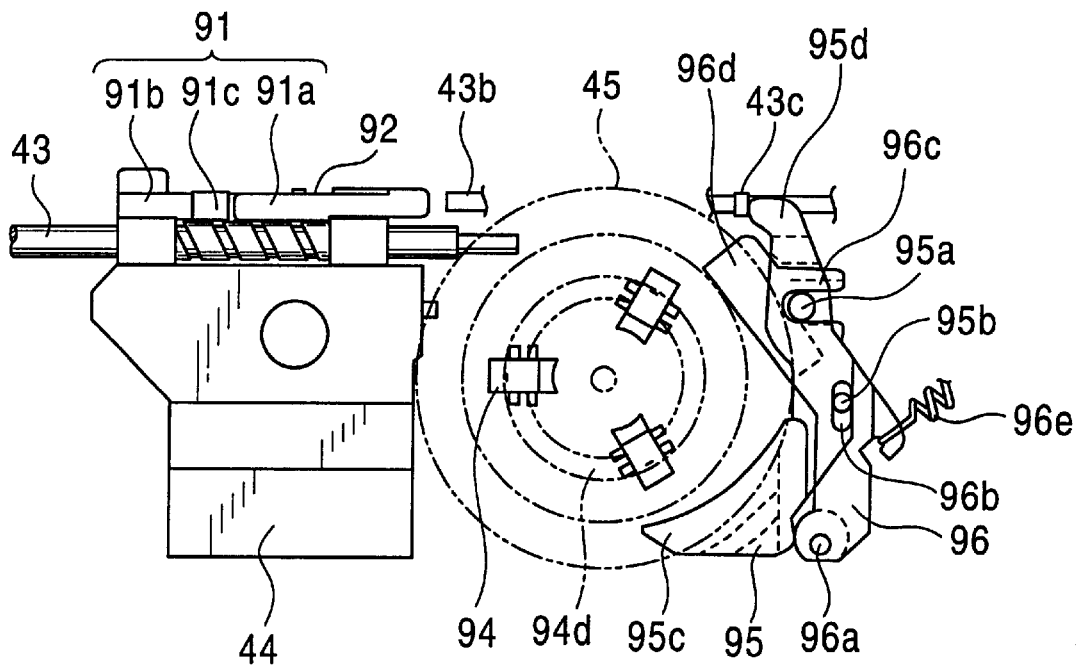
FIG. 45 is a plan view showing the turntable on the stage unit shown in FIG. 33, in an initial state or in the disk chucking state.
Figure 46:
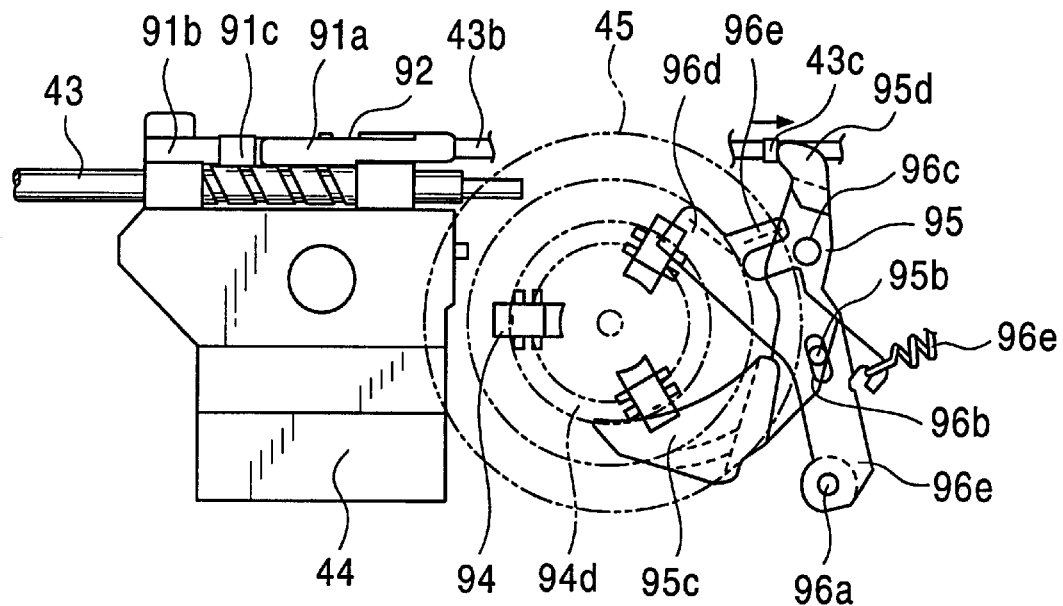
FIG. 46 is a plan view showing the turntable on the stage unit shown in FIG. 33, in a state in which the disk has been released from the turntable unit.

FIGS. 43 to 46 show arrangements around the turntable unit 45 on the drive base unit 40, wherein FIGS. 43 and 44 are front elevational views in which critical portions are shown in sectional views, while FIGS. 45 and 46 are plan views. For the purpose of clarification of the drawings illustrative of the arrangements around the turntable unit 45, some of the elements are omitted from these Figures.

As shown in FIG. 43, the turntable 45 is driven directly by a spindle motor 46 which is disposed beneath the turntable 45. A disk D is held on the turntable 45 by means of a chucking mechanism which will now be described. The turntable 45 is provided on the top thereof with three equi-spaced disk hooks 94 for engagement with the edge of a bore of the disk D. Each disk hook 94 is provided on its radially outer end with a claw 94a which is engageable with the edge of the bore of the disk D. The disk hook 94 is also provided on its radially inner end with a catching recess 94b having a substantially U-shaped cross-section. The disk hook 94 is pivotable about an axis 94c, between a disk chucking position where the claw 94a engages with the edge of the bore of the disk and a releasing position where the claw 94a is out of engagement with the edge of the disk bore. The central portion of the turntable 45 provides a substantially cylindrical tapered protrusion which engages with the inner bore edge of the disk thereby guiding the disk. The disk hooks 94 when pivoted to the releasing positions are completely accommodated within the tapered side surface of the guiding protrusion. This arrangement eliminates any additional load which otherwise may be imposed during chucking and chuck-releasing of the disk D, while preserving guiding function of the guiding protrusion for guiding the disk upon engagement with the edge of the inner bore of the disk D.

Between the turntable 45 and the spindle motor 46, coaxially disposed is a substantially bobbin-shaped chucking sleeve 94d which is movable up and down. The upper part of the chucking sleeve 94d provides a small-diameter disk portion the outer peripheral edge of which is located within the catching recesses 94b of the disk hooks 94. The chucking sleeve 94d is urged upward by a spring 94e, so that the upper ends of the catching recesses 94b are pushed upward by the upper portion of the catching sleeve 94d, whereby the disk hooks 94 are urged towards the disk holding positions. The lower end of the chucking sleeve 94d is progressively enlarged to provide a downwardly diverging disk-like portion having a tapered conical peripheral surface.

(3) Mechanism for Unloading Disk Hooks

As will be seen from FIGS. 45 and 46, a first chucking arm 95 and a second chucking arm 96 are disposed in the vicinity of the chucking sleeve 94. The first chucking arm 95 is mounted on the drive base 40a for pivotal motion thereon about an axis provided by a shaft 95a. The shaft 95a is provided with a projection. The first chucking arm 95 is provided at its intermediate portion with a lug serving as an engaging portion 95b. The end of the first chucking arm 95 opposite to the pivot shaft 95b presents a slant surface portion 95c which is brought into and out of contact with the tapered peripheral surface of the chucking sleeve 94d in accordance with the pivotal motion of the first chucking arm 95.

The second chucking arm 96 is pivotally mounted at its one end on the drive base 40a, for pivotal movement about the axis of a shaft 96a. The second chucking arm is provided at its intermediate portion with an engaging hole 96b which receives the above-mentioned engaging portion 95b. The first chucking arm 95 and the second chucking arm are arranged to cross each other at the point where the engaging portion 95b is located. The engaging hole 96b has a size slightly greater than the engaging portion 95b, so that the engaging portion 95b is movable by a limited amount within the engaging hole 96b. The end of the second chucking arm 96 opposite to the pivot shaft 96a presents a slant surface portion 96d which is brought into and out of contact with the tapered peripheral surface of the chucking sleeve 94d in accordance with the pivotal motion of the second chucking arm 96. The second chucking arm 96 is provided at its portion near the slant surface portion 96d with a notch which serves as an engaging portion for engagement with the aforementioned projection on the shaft 95a.

The second chucking arm 96 is rotationally biased by a spring 96e connected to a portion thereof near the engaging hole 96b, such that the slant surface portion 96d moves away from the chucking sleeve 94c. Consequently, the first chucking arm 96 also is urged such that its slant surface portion 95c moves away from the chucking sleeve 94c, by virtue of the engagement between the engaging hole 96b of the second chucking arm 96 and the engaging portion 95b of the first chucking arm 95.

As shown in FIGS. 40 and 41, a connecting shaft 43b is disposed for sliding motion to the left and right, in parallel with an extension of the axis of the lead shaft 43a, at a position near the turntable unit 45. The connecting shaft 43b has one end which is adapted to be brought into and out of contact with the rear end of the pickup unit 44, as will be seen from FIGS. 45 and 46. An intermediate portion of the connecting shaft 43b has an enlarged diameter to provide a pressing portion 43c. The first chucking arm 95 is provided at its end adjacent to the shaft 95a with a groove 95d which slidably receives the connecting shaft 43b. The pressing portion 43c of the connecting shaft 43b abuts the portion of the above-mentioned end of the first chucking arm 95 defining the groove.

In accordance with this arrangement, when the pickup unit 44 contacts with the end of the connecting shaft 43b as shown in FIG. 46, the pressing portion 42b is moved to the right together with the lead shaft 42a, thereby pressing the above-mentioned end of the first chucking arm 95. As a result, the first chucking arm 95 is caused to pivot so as to move its slant surface portion 95c towards the tapered peripheral surface of the chucking sleeve 94c. At the same time, the urging force transmitted through the engaging portion 95b and the edge of the engaging hole 96b causes the second chucking arm 96 to pivot against the force of the spring 94e, in the direction for bringing its slant surface portion 95c into contact with the tapered peripheral surface of the chucking sleeve 94c. Consequently, the chucking sleeve 94c is moved downward against the force of the spring 94d as shown in FIG. 44, so as to press the lower end portions of the catching recesses 94b, whereby the disk hooks 94 pivot to move their claws 94a away from the edge of the inner bore of the disk.

[5. Shutter unit]

Figure 47:
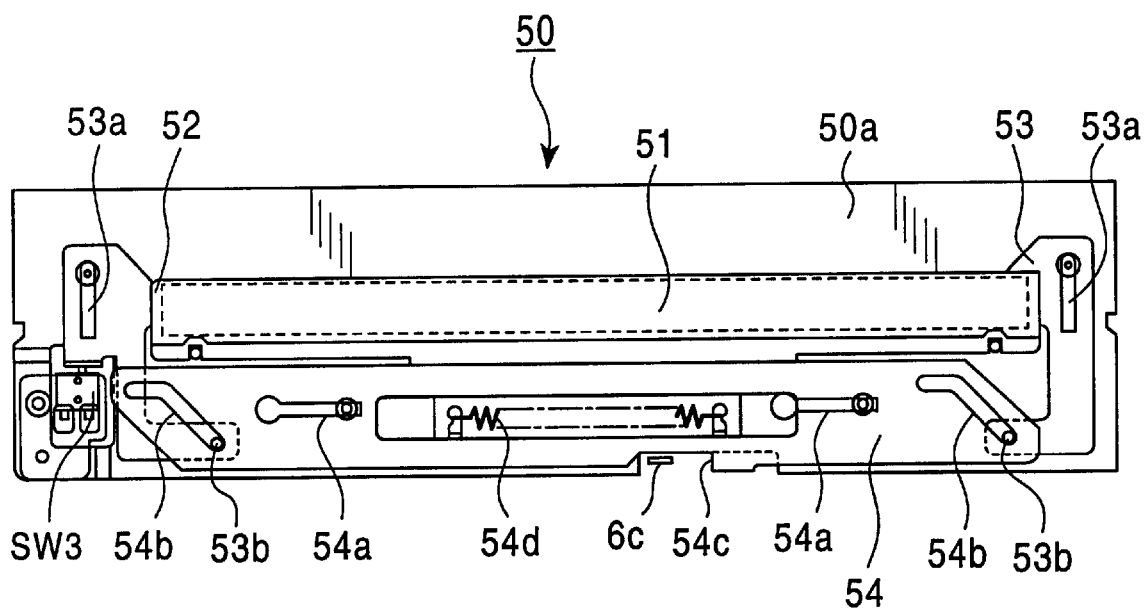
FIG. 47 is a front elevational view of a shutter unit shown in FIG. 1, with a disk insertion slot closed.
Figure 48:
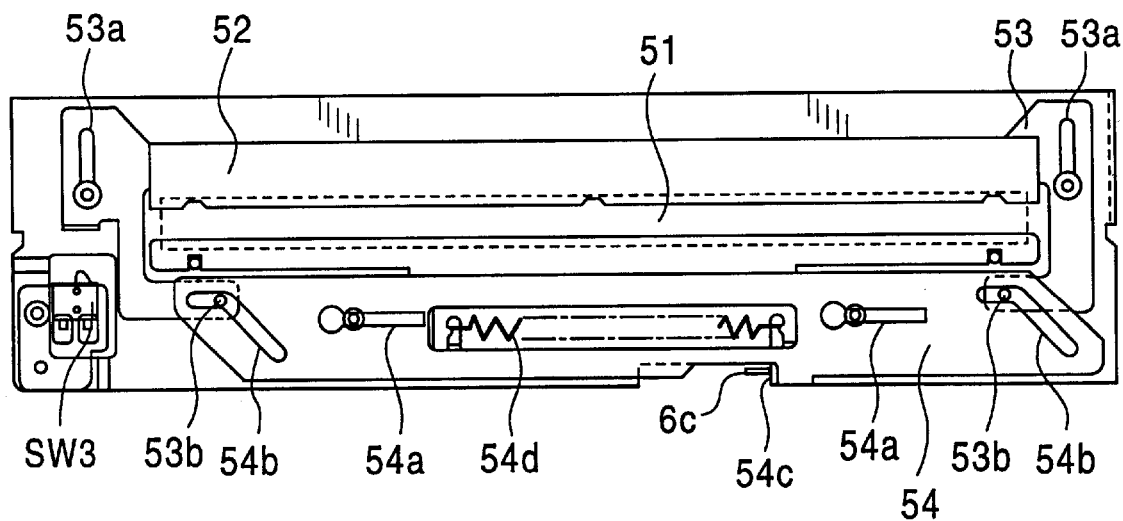
FIG. 48 is a front elevational view of the shutter unit shown in FIG. 1, with the disk insertion slot opened.

FIGS. 47 and 48 are front elevational views showing the shutter unit 50 in a state in which the door open link 6 is in the shutter close position and in a state in which the same is in the shutter open position.

Referring first to FIG. 47, the door plate 53 is slidable up and down relative to the front panel 50a of the shutter unit 50, while being guided at its guide grooves 53a. A door link 54, which interconnects the door open link 6 and the door plate 53, is disposed at a lower portion of the disk insertion slot 51 so as to overlap a portion of the door plate 53. The door link 54 is slidable to the left and right along a guide groove 54a. Oblique lifter grooves 54b, 54b, which ascend obliquely to the left, are formed in left and right end portions of the door link 54. These lifter grooves 54b, 54b receive pins 53b, 53b which are provided on left and right portions of the door plate 53. The door link 54 is further provided with an engaging portion 54c engageable with a pressing portion 6c of the door open link 6, and is urged to the left by means of a spring 54d.

Figure 49:
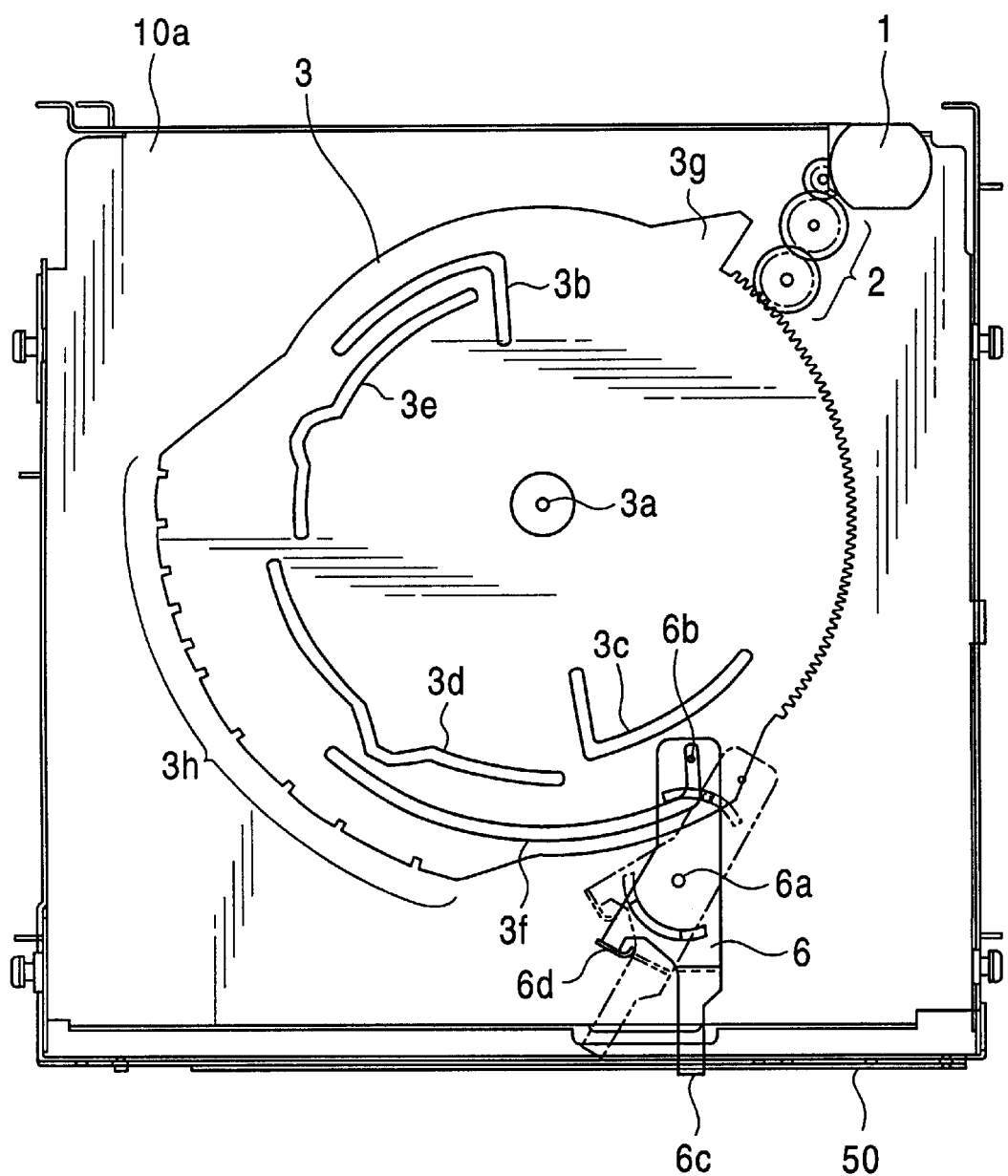
FIG. 49 is a plan view of the lower chassis unit shown in FIG. 1, illustrative of a state in which the mode plate is in a shutter-open position.

In accordance with the described arrangement, the door plate 53 is moved up and down so as to open and close the shutter 52, as a result of rotation of the door open link 6. More specifically, when the door open link 6 is in the shutter close position as shown in FIG. 2, the pressing portion 6c is spaced apart from the engaging portion 54c of the door link 54, so that the door link 54 has been moved to the left by the force of the spring 53a. Therefore, the door plate 53 is held at the lowered position, so that the shutter 52 keeps the disk insertion slot 51 closed. In contrast, when the door open link 5 is held at the shutter open position as shown in FIG. 49, the engaging portion 54c of the door link 54 is pressed to the right by the pressing portion 6c of the door open link 6, so that the door link 54 is moved to the left by the force of the spring 54d, whereby the door plate 53 is held at the raised shutter open position to allow the shutter 52 to open the disk insertion slot 51.

[6. Damper Unit]

(1) Vibration Damping Structure for Mechanism

As described before, the mechanism composed of the lower chassis unit 10, upper chassis unit 20, stage unit 30 and the drive base unit 40 is suspended in a floating manner on the vehicle chassis, by means of four dampers 63 and four damper springs 64 which constitute the damper unit 60 that serves to damp vibration given externally during the playback operation.

(2) Locking/unlocking of Vibration Damping Mechanism

During loading of the disk or ejection of the same, the vibration damping mechanism is locked so as to fix the mechanism to the damper unit 60, thereby keeping the disk insertion slot 51 of the shutter unit 50 in alignment with the disk passage on the stage unit 30 of the mechanism. During playing back subsequent to the disk loading, the vibration damping mechanism is unlocked so that the mechanism is suspended in the floating manner. This vibration damping mechanism locking and unlocking operations will be described with reference to FIGS. 50 to 54.

Figure 50:
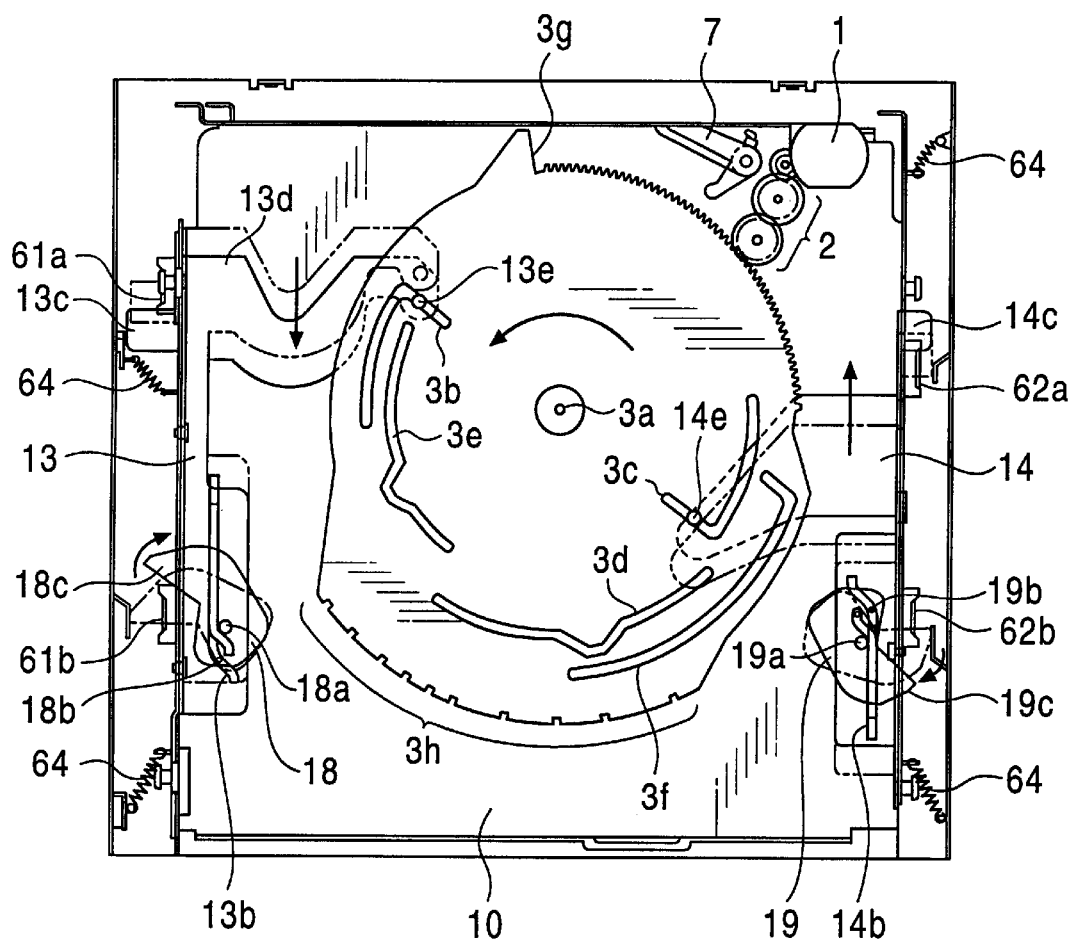
FIG. 50 is a plan view of the lower chassis unit shown in FIG. 1, illustrative of a state in which the mode plate is in a floating unlocking position.

FIG. 50 is a plan view of the apparatus illustrative of a transitional state between a state in which the vibration damping mechanism is locked and a state in which the vibration damping mechanism is unlocked. FIGS. 51 to 54 are front elevational views and side elevational views illustrative of the locked and unlocked states of the vibration damping mechanism. As will be seen from FIG. 50, lock links 18, 19 for locking and unlocking the vibration damping mechanism are connected to the pair of slide plates 13, 14 shown in FIGS. 4 and 5. These lock links 18, 19 are arranged to unlock the vibration damping mechanism when the slide plates 13, 14 move from their initial positions. The pair of slide plates 13, 14 are bent inward at their lower ends along the lower end corners of the lower chassis unit 10 so as to provide horizontal web portions in which are formed groove cams 13b, 14b, respectively. In the meantime, the lock links 18, 19 are secured to the lower chassis unit 10 by means of pivot shafts 18a, 19a so as to pivot about the axes of these shafts. The lock inks 18, 19 carry pins 18b, 19b which are received in the groove cams 13b, 14b of the slide plates 13, 14.

Figure 53A:
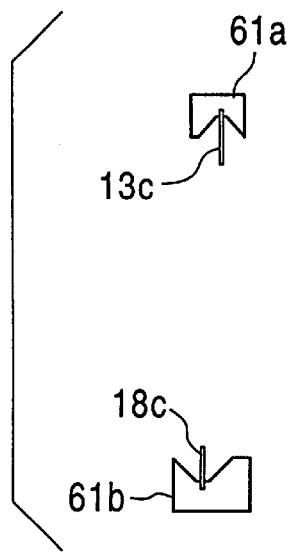
FIG. 53A is a side view of a damper plate of FIG. 50 in the floating locking state, as viewed from the left side thereof.
Figure 53B:
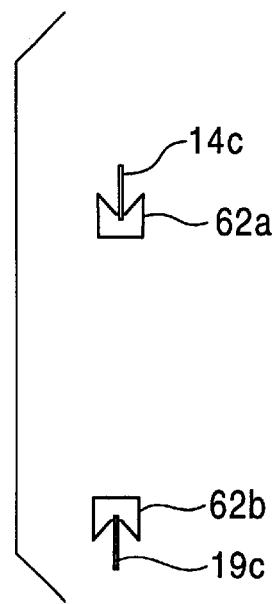
FIG. 53B is a side view of the damper plate of FIG. 50 in the floating locking state, as viewed from the left side thereof.

The slide plates 13, 14 and the lock links 18, 19 are respectively provided with engaging portions 13c, 14c and 18c, 19c which engage with the damper unit 60. As will be seen from FIG. 50 and FIG. 53A, one 61 of the damper plates is provided with locking portions 61a, 61b that engage with and fix engaging portions 13c and 18c of the associated slide plate 13 and the lock link 18. Likewise, the other 62 of the damper plates is provided with locking portions 62a, 62b that engage with and fix engaging portions 14c and 19c of the associated slide plate 14 and the lock link 19, as shown in FIG. 50 and FIG. 53B.

As stated before, the lock links 18, 19 are rotatable in accordance with the movements of the slide plates 13, 14, due to the engagements between the pins 18b, 19b of the lock links and the groove cams 13b, 14b of the slide plates 13, 14. To explain in more detail, the lowermost steps of the stepped cams 13a, 14a of the slide plates 13, 14 have horizontal length greater than that of other steps, and the operations of the lock links 18, 19 caused by the groove cams 13b, 14b are allowed within the range of the lowermost step. The arrangement is such that the lock links 18, 19 reach unlocking positions at the moment when the pins 30b of the stage unit 30 reach the ends of the lowermost step of the stepped cams 13a, 14a, as the slide plates 13, 14 move from the initial positions shown in FIG. 2.

Figure 51:
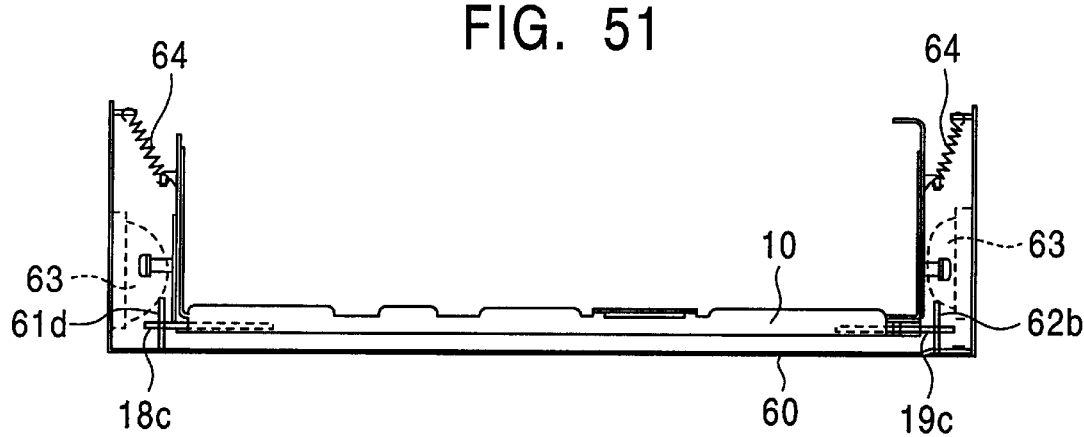
FIG. 51 is a front elevational view of the lower chassis unit of FIG. 50 in the floating locking position.

According to these structural features, when the pair of slide plates 13, 14 are in their initial positions to allow the lock links 18, 19 to be set in their locking positions, the engaging portion 13c of the slide plate 13 and the engaging portion 18c of the lock link 18 engage with the associated locking portions 61a, 61b of the damper plate 61, so as to widespread these locking portions, while the engaging portion 14c of the slide plate 14 and the engaging portion 18c of the lock link 19c engage with the associated locking portions 62a, 62b of the damper plate 62 so as to clamp and embrace these locking portions, as shown in FIGS. 50, 51 and 53.

The vibration damping mechanism is thus locked. In this state, as shown in FIG. 7, the mechanism is fixed at a predetermined position relative to the shutter unit 50 and the damper unit 60, i.e., such that the disk insertion slot 51 of the shutter unit 50 is aligned with the disk passage in the stage unit 30 of the mechanism.

In contrast, when the slide plates 13, 14 have been moved to the unlocking positions to bring the lock links 18, 19 to the unlocking positions, the engaging portions 13c, 14c of the slide plates 13, 14, as well as the engaging portions 18c, 19c of the lock links 18, 19, leave the damper unit 60, thereby unlocking the vibration damping mechanism to set it free to operate. After the unlocking of the vibration damping mechanism, the mechanism is supported on the vehicle chassis in a floating manner via the dampers 63 and the damper springs 64.

[7. Structure of Sensing Mechanism]

The operations of the described components or parts of the playback apparatus are performed under the control of a control circuit which is not shown and which controls the first motor 1, second motor 11, third motor 31 and the fourth motor 41. The control operations are performed based on the states sensed and detected by switches and sensors disposed in various portions of the apparatus. The arrangements and structures of these sensing means will be described below.

(1) Mode Plate Position Sensing Mechanism

Referring to FIG. 2, the chassis 10a is provided with a photosensor PH1 which optically detects the position of the mode plate 3 by means of a plurality of slits 3h formed in the mode plate 3. The switch plate 72 has a pin 72b engaging with the cam 3d of the mode plate 3, so that the operating position of the switch plate 72 is switched depending on whether the mode plate 3 is in the initial position or in other positions. The chassis 10a is provided with a first switch SW1 which is pressed by a pressing portion 72c on an end of the switch plate 72 when the switch plate 72 is in the initial position.

(2) Shutter Sensing Mechanism

A pressing portion 6d is provided on an end of the door open link 6 near the switch plate 72, whereas the chassis 10a is provided with the aforesaid switch SW2 which is pressed by the pressing portion 6d when the door open link 6 is at the shutter open position. As shown in FIGS. 47 and 48, a switch SW3 is provided on the front panel 50a of the shutter unit 50, so as to be pressed by an end of the door plate 53 when the disk insertion slot 51 is closed by the shutter 52.

(3) Disk Holder Sensing Mechanism

Figure 25:
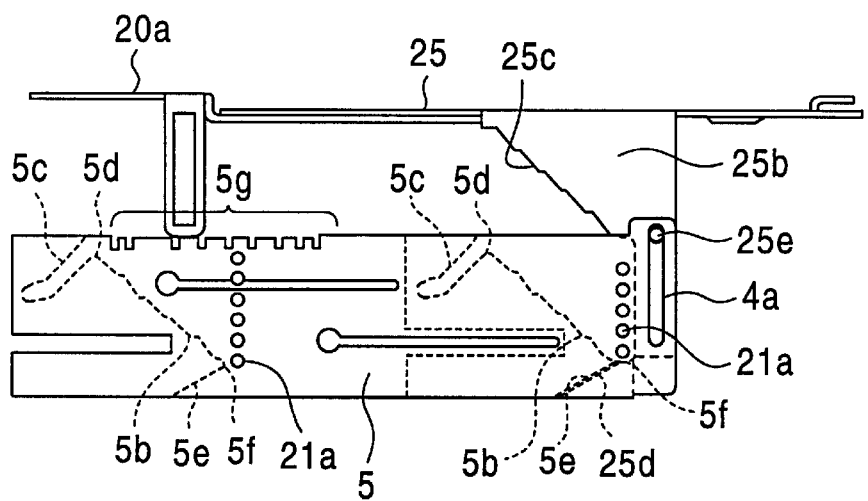
FIG. 25 is a side view of the upper chassis unit of FIG. 1 as viewed from the right side thereof.

As will be seen from FIG. 39, a photosensor PH2 is provided on the right side upper edge of the stage unit 30. The photosensor PH2 optically senses the position of the disk holder 21 by using a plurality of slits 5g which are formed in the side select plate 5 as shown in FIG. 25. A switch SW4 is provided on the inner surface of the right side wall of the stage unit 30. The switch SW4 is adapted to be pressed by the front end of the side select plate 5, so as to detect that the side select plate 5 is set at the forward initial position.

(4) Drive Base Sensing Mechanism

As shown in FIG. 55, a switch plate 39 adapted to be pressed by the front end of the drive base 40a is rotatably mounted on a front portion of the inner surface of the left side wall of the stage unit 30. A switch SW5 for detecting that the drive base 40a is set at the forward initial position is disposed in the vicinity of the switch plate 39. The switch plate 39 is provided on one end thereof with a pressing portion 39a which presses the switch SW5 when the switch plate 39 is rotated. The switch plate 39 is rotationally biased by a spring (not shown) so as to keep the pressing portion 39a away from the switch SW5.

At the center of the upper edge of the left side wall of the stage unit 30, there is provided a photosensor PH3 for optically detecting that the drive base 40a is set at the playback position. On a rear portion of the inner surface of the left side wall of the stage unit 30 is disposed a switch SW6 which is adapted to be pressed by the rear end of the drive base 40a so as to detect that the drive base 40a is set at the disk chucking position.

(5) Disk Sensing Mechanism

As will be seen from FIG. 26, four photosensors PH4 to PH7 are disposed along the disk passage to be defined in the stage unit 30: more specifically, two photosensors are arranged at the outer side of the loading roller 33, i.e., on the disk-inlet side as viewed in the disk loading direction, and the remainder two photosensors are disposed at the inner side of the loading roller 33, i.e., at the disk-outlet side as viewed in the loading direction. These photosensors are connected to the control circuit for controlling the operation of the mechanism. As will be seen from FIG. 28, each of the photosensors PH4 to PH7 is composed of a light emitting portion and a light receiving portion which are disposed above and below the upper and lower disk guides 37, 38.

Two photosensors PH4 and PH5, arranged at the outer or disk-inlet side of the loading roller 33, are intended to sense starting of the disk loading operation, and are located away from the loading roller 33 at positions near the disk entrance, at a mutual spacing which is slightly greater than the diameter of an 8-cm disk but smaller than the diameter of a 12-cm disk, so as to be able to discriminate between the sizes of the disk. In contrast, the remainder two photosensors PH6 and PH7 that are disposed on the inner side or the disk-outlet side of the loading roller 33 are arranged at a mutual spacing smaller than that between the photosensors PH4 and PH5, so as to detect completion of the disk loading operation and completion of disk ejection. Sensing operations performed by the photosensors PH4 to PH7 will be described below with specific reference to FIGS. 56 and 57.

Figure 56A:
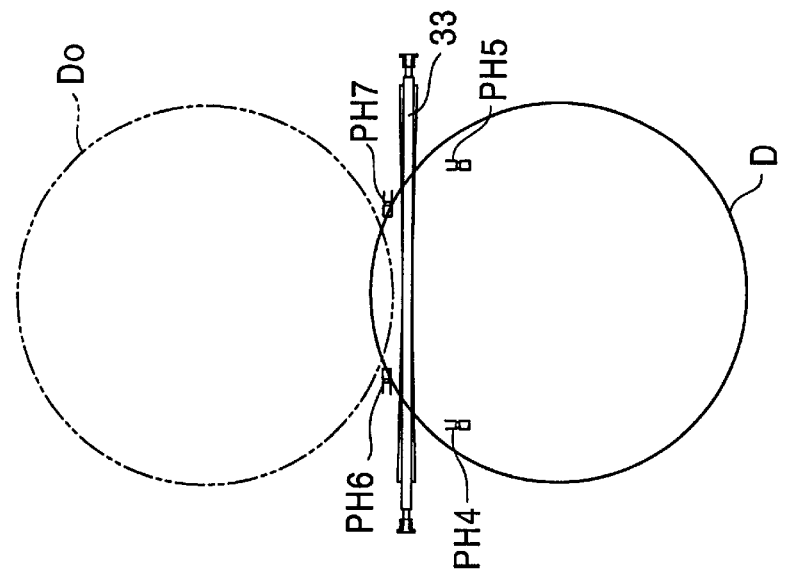
FIG. 56A is a plan view of a loading roller shown in FIG. 1, illustrative of a state in which the disk loading operation for a 12-cm disk is going to be started.
Figure 56B:
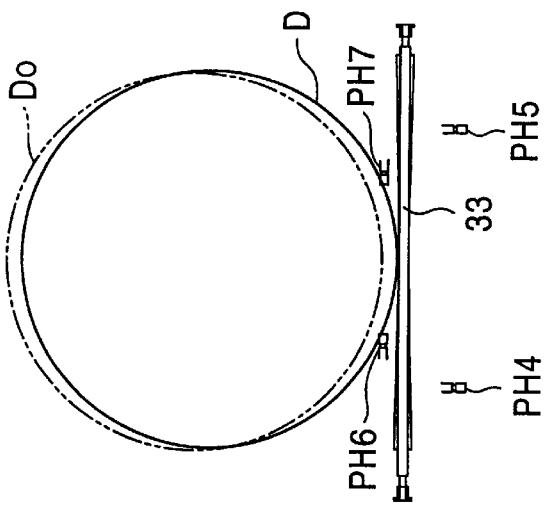
FIG. 56B is a plan view of the loading roller shown in FIG. 1, illustrative of a state in which the loading of the 12-cm disk has been completed.
Figure 56C:
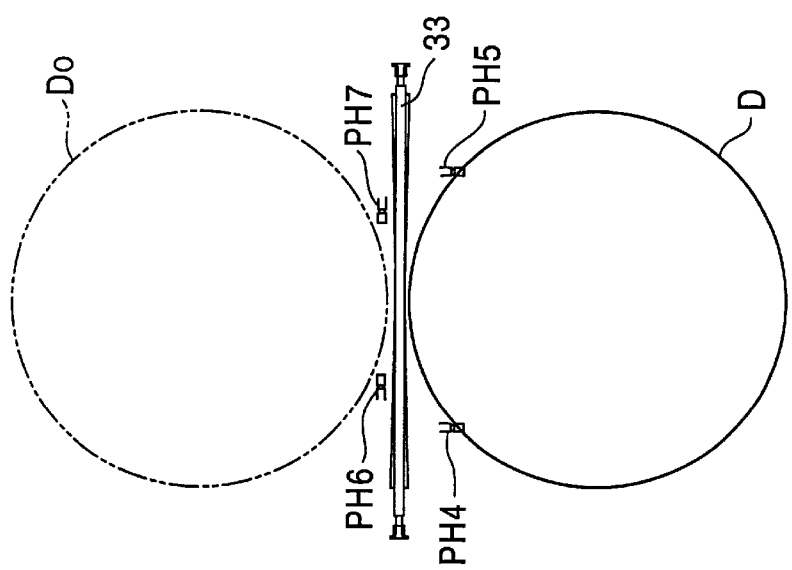
FIG. 56C is a plan view of the loading roller shown in FIG. 1, illustrative of a state in which the ejection of the 12-cm disk has been completed.
Figure 57A:
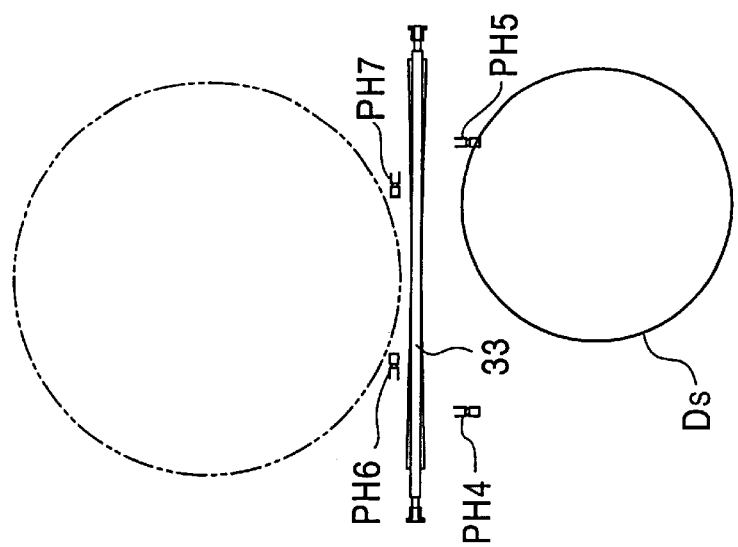
FIG. 57A is a plan view of the loading roller shown in FIG. 1, illustrative of an operation for detecting loading of an 8-cm disk that has been inserted through a central position.
Figure 57B:
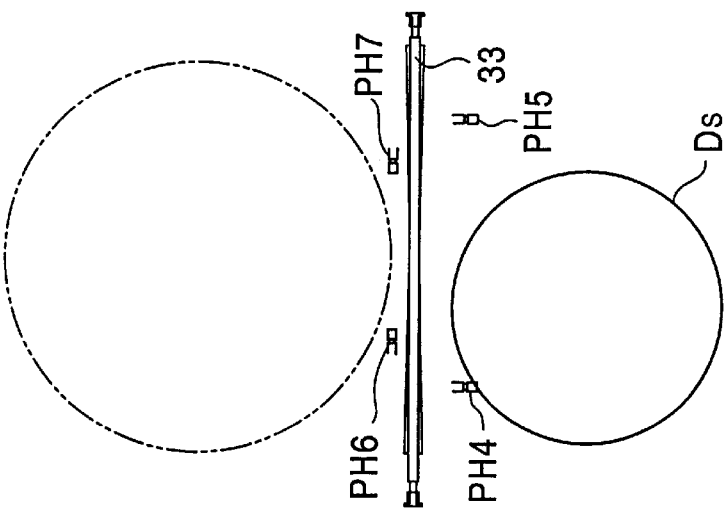
FIG. 57B is a plan view of the loading roller shown in FIG. 1, illustrative of an operation for detecting loading of an 8-cm disk that has been inserted through a leftward offset position.
Figure 57C:
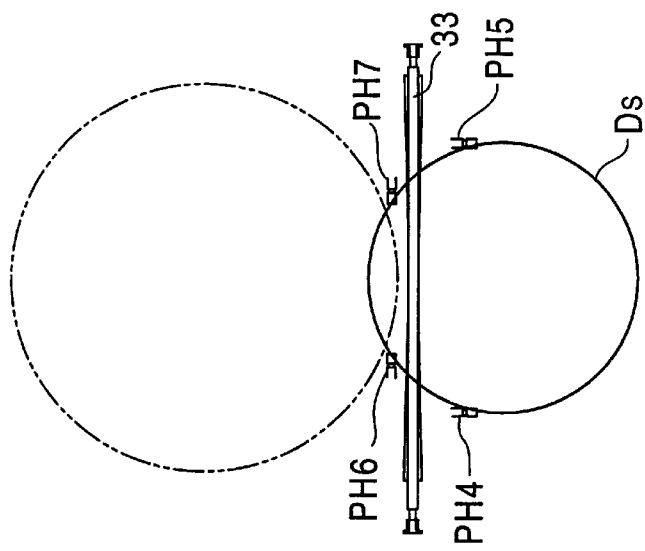
FIG. 57C is a plan view of the loading roller shown in FIG. 1, illustrative of an operation for detecting loading of an 8-cm disk that has been inserted through a rightward offset position.

FIG. 56A is an illustration of an operation for detecting start of the disk loading operation, FIG. 56B is an illustration of an operation for detecting completion of the disk loading operation, and FIG. 56C is an illustration of an operation for detecting completion of disk ejecting operation. FIG. 57A illustrates a detecting operation performed when an 8-cm disk Ds is inserted through a central region of the disk insertion slot, FIG. 57B illustrates a detecting operation performed when the 8-cm disk Ds is inserted through a leftward offset region of the disk insertion slot, and FIG. 57C illustrates a detecting operation performed when the 8-cm disk Ds is inserted through a rightward offset region of the disk insertion slot.

In the initial state of the operation in which the apparatus is waiting for disk insertion, all the four sensor elements 81 to 84 do not produce any detection signal. Insertion of a 12-cm disk is detected only when both the pair of photosensors PH4 and PH5 that are disposed at the disk inlet side simultaneously produce detection signals, as shown in FIG. 56A. Thus, the mechanism control circuit, when the above-described condition is met, determines that the 12-cm disk D has been inserted into the disk loading start detection position (see FIG. 26), and commences the disk loading operation by starting the rotation of the loading roller 33.

In the subsequent disk loading operation, the disk D is fed inward so that the inner two photosensors PH6 and PH7 are turned on to produce detection signals. As the disk D is further fed inward, the photosensors PH4 and PH5 disposed at the inlet side are again turned off to cease the production of the detection signals. Finally, as the disk D passes the position of the inner two photosensors PH6 and PH7, these two photosensors are again turned off, whereby completion of disk loading by the loading roller is detected.

When the above-described sequential conditions are met, the mechanism control circuit determines that the 12-cm disk D has reached the disk loading completion detection position, and operates to stop the rotation of the loading roller 33. The disk D, upon reaching the disk loading completion detection position, leaves the loading roller 33 and, at the same time, the stock arm 36 (see FIG. 27) starts to further feed the disk D inward. The disk D finally reaches the disk holding position D0 indicated by two-dot-and-dash line in FIG. 56B, and is held at this position.

Figure 58:
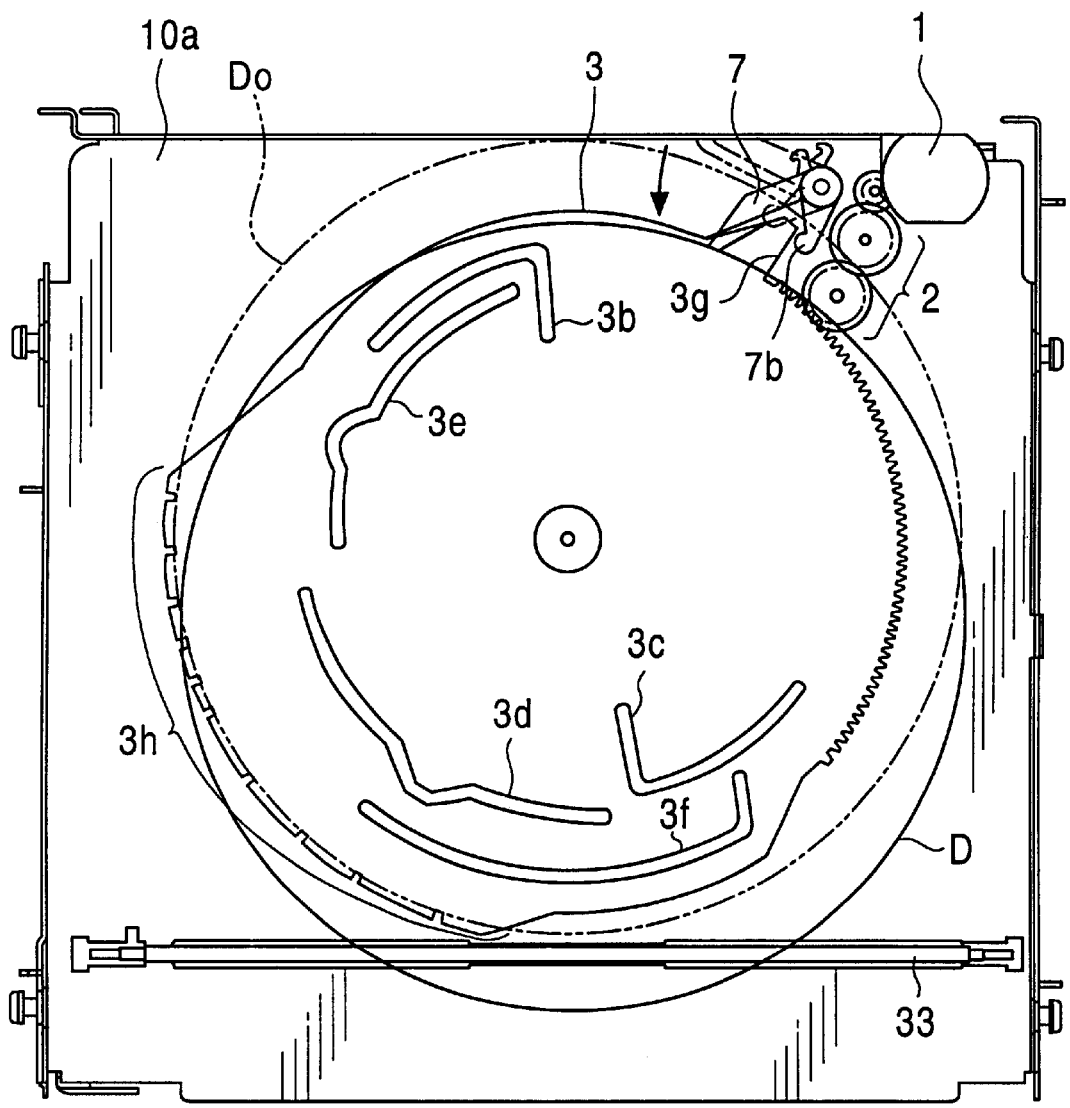
FIG. 58 is a plan view of the lower chassis unit shown in FIG. 1, illustrative of a disk ejecting operation of an eject arm.

When the disk D is held at the disk holding position, all the four photosensors PH4 to PH7 are inoperative, i.e., do not produce detection signal. When a disk ejecting instruction is received in this condition, the mechanism control circuit operates to cause the eject arm 7 to force the disk D out of the disk holding position as shown in FIG. 58, while commencing reversing of the loading roller 33, thereby starting the disk ejecting operation. As the disk D is moved backward towards the disk inlet, the inner two photosensors PH6 and PH7 are turned on to produce detection signals, and further backward movement of the disk D towards the inlet causes the outer two photosensors PH4 and PH5 to turn on. As the disk D is further moved backward, the inner two photosensors PH6 and PH7 are again turned off, whereby completion of disk ejection is detected.

Thus, the mechanism control circuit determines, when the above-described sequential conditions are met, that the 12-cm disk has been moved to a disk ejection completion detection position, and operates to stop the reverse driving of the loading roller 33.

The mechanism control circuit determines that a foreign member other than a 12-cm disk has been inserted, on condition that (1) at least one of the inner photosensors PH6 and PH7 has been turned on while the outer two photosensors PH4 and PH5 remain turned off, or that (2) at least one of the inner photosensors PH6 and PH7 has been turned on subsequent to turning on of only one of the outer photosensors PH4 and PH5.

More specifically, upon detecting the above-described sequential conditions of the photosensors PH4 to PH7, the mechanism control circuit determines that a foreign member such as an 8-cm disk Ds has been inserted past the region between two inlet photosensors PH4 and PH5 (see FIG. 57A), or that a foreign member such as an 8-cm disk Ds has been inserted past only one of the inlet two photosensors PH4 and PH5 (see FIG. 57B or 57C). In such a case, the mechanism control circuit operates to reverse the loading roller 33.

Thus, the four photosensors PH4 to PH7 on the stage unit discriminates the 12-cm disk from other members and allows the disk loading operation to continue only for the 12-cm disk, while preventing insertion of foreign members including a bare 8-cm disk, thereby avoiding any malfunction. Loading of an 8-cm disk requires that the disk be set on the 8-cm disk adapter explained before in connection with FIG. 9. The use of such an adapter provides the same conditions as that provided by a 12-cm disk, so that the 8-cm disk carried by the adapter can be detected and played back in the same way as the 12-cm disk.

(6) Pickup Detection Mechanism

Figure 59:
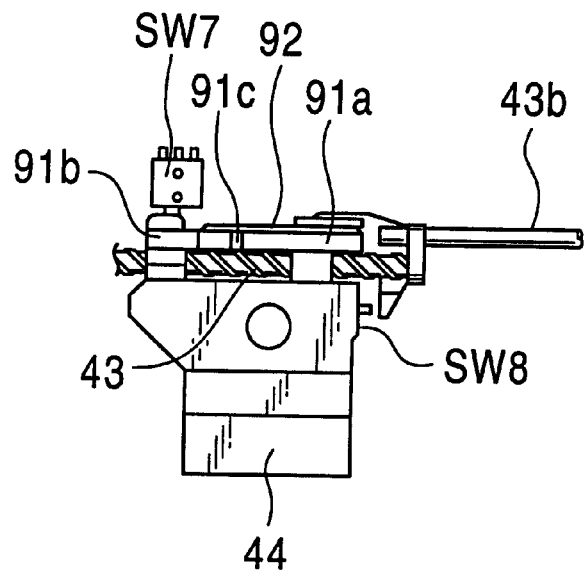
FIG. 59 is a plan view of the pickup unit shown in FIG. 40 in an initial position.

As shown in FIG. 40, a switch SW7 is disposed in the vicinity of the lead screw 43 on the drive base 40a. The switch SW7 is adapted to be pressed by a portion of the screw holder 91 so as to detect that the pickup unit 41 has been moved towards the turntable 45 from the initial position thereof. Further, a switch SW8 is incorporated in the side surface of the pickup unit 44 adjacent to the turntable 45. As shown in FIGS. 59 and 60, the switch SW8 is adapted to abut a supporting member in support of, for example, the lead screw 43, thereby detecting that the disk hooks 94 have been set to the releasing positions to release a disk.

D. Operation

Figure 61:
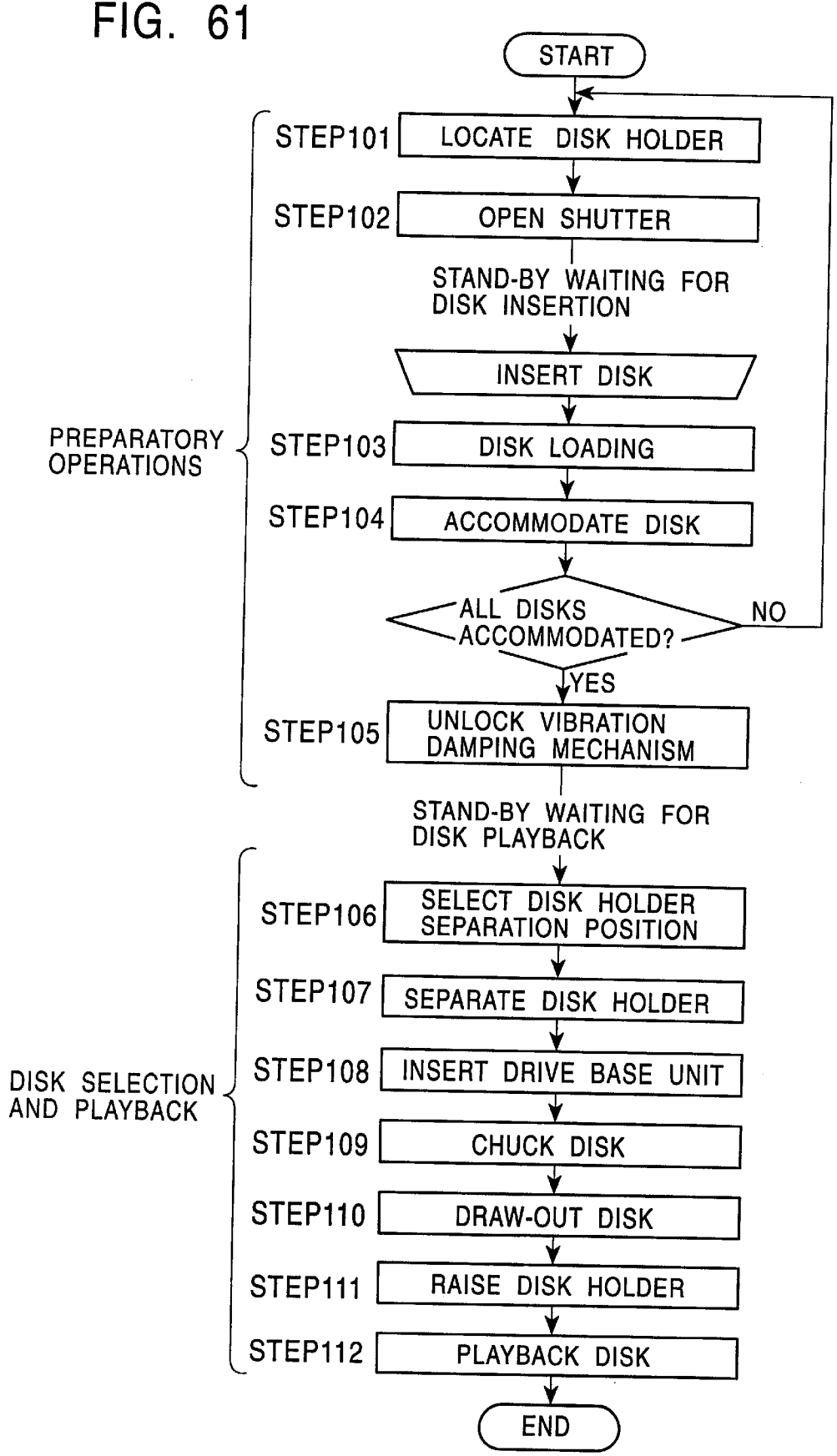
FIG. 61 is a flow chart showing steps of a process performed by the disk playback apparatus of the embodiment, for a series of operations including a preparatory operation, disk selection and playback of the disk.
Figure 62:
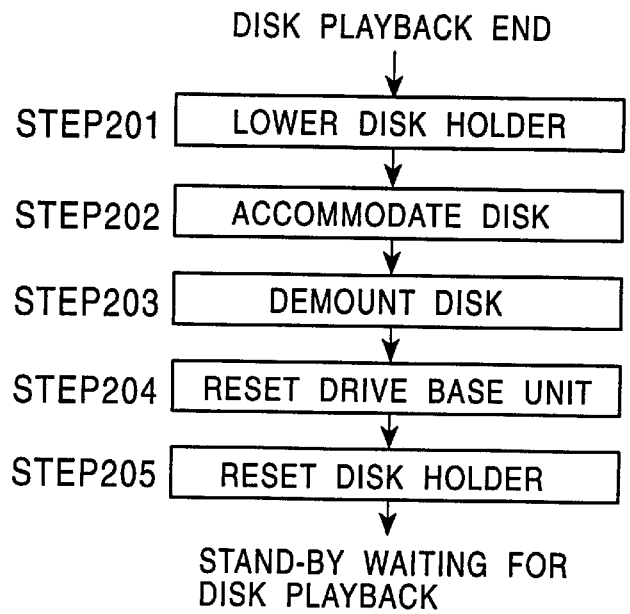
FIG. 62 is a flowchart showing steps of a process performed by the disk playback apparatus of the embodiment, from completion of the disk playback operation to a disk playback stand-by state.
Figure 63:
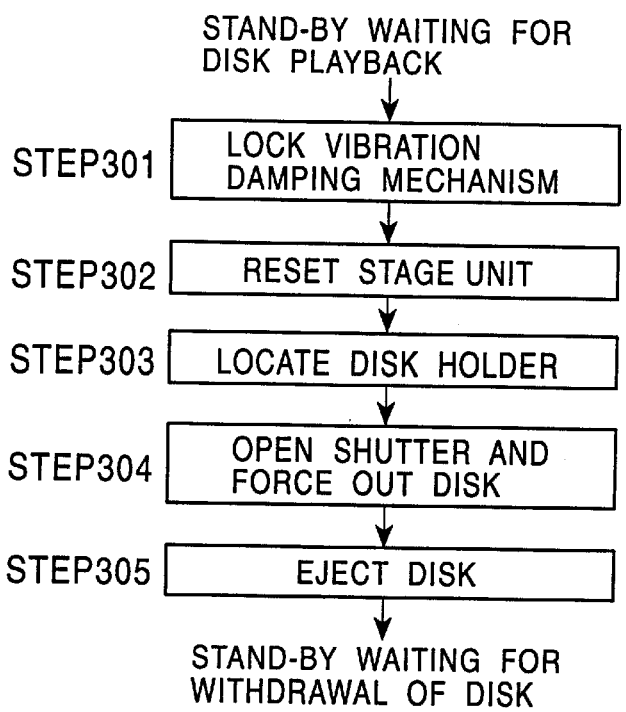
FIG. 63 is a flowchart showing steps of a process performed by the disk playback apparatus of the embodiment, from the disk playback stand-by state to disk-withdrawal stand-by state.

A description will now be given of a series of operations performed by the disk playback apparatus of the embodiment described heretofore, including the sequential operation from insertion to playback of a disk, resetting after playback of the disk, and ejection of the disk. The description will proceed while making reference to FIGS. 61, 62 and 63. FIG. 61 is a flow chart roughly showing steps of a process performed by the disk playback apparatus of the embodiment, for a series of operations including a preparatory operation from disk insertion to playback stand-by state, and operations from the playback stand-by state to playing back of the disk, inclusive of selection and playback of the disk. FIG. 62 is a flowchart roughly showing steps of a process performed by the disk playback apparatus of the embodiment, from completion of the disk playback operation to resetting of the apparatus to the disk playback stand-by state to prepare for playback of a next disk. FIG. 63 is a flowchart roughly showing steps of a process for ejecting a disk, performed when a disk eject instruction of received when the apparatus is in the playback stand-by state.

[1. Operations Down to Disk Playback]

Steps of the process down to the disk playback will be described first with reference to FIG. 61. For the purpose of enabling a disk to be inserted into an empty disk holder "#n", Step 101 of the process locates the disk holders 21 so that the empty disk holder "n#n" is set to the position for disk loading. Step 102 opens the shutter 52, thus preparing for insertion of the disk (disk insertion stand-by state). The disk is therefore inserted through the disk insertion slot 51. In the next step 103, the inserted disk is drawn into the playback apparatus by the loading roller 33 and, in the next step 104, the disk is set into the disk holder "#n" by the operation of the stock arm 36. When a plurality of disks are to be inserted, Steps 101 to 104 are repeated plurality of times corresponding to the number of the disks to be inserted. After the disk has been set in this manner, the vibration damping mechanism is unlocked so that the mechanism freed and suspended in the floating manner, thus preparing for playing back of the disk (disk playback stand-by state).

Subsequent to the above-described preparatory operation, or in response to a disk playback instruction or a selection instruction, Steps 106 to 112 are executed to select and playback a disk. More specifically, in Step 106, the stage unit 30 is moved up or down, so as to locate the side select plates 4, 5 to a separation position corresponding to the disk holder 21 holding the disk to be played back. Subsequently, in Step 107, disk holders above the separation position are raised, so that a space is formed on the disk holder 21 holding the disk to be played back. In the next step 108, the drive base unit 40 is moved into the space which has been formed as a result of the separation of the disk holders 21. Then, in Step 109, the disk is chucked on the turntable unit 45 by the combined effect produced by the operations of the disk hooks 94 and a slight descent of the disk holder 21.

In Step 110, the disk holder 21 is slightly raised and, thereafter, the drive base unit 40 is slightly moved forward, whereby the disk is extracted from the disk holder 21. Finally, the disk holder 21 is raised in Step 111, followed by Step 112 which plays back the disk.

Each of the steps 101 to 112 will now be descried in detail. Detection of the rotational position of the mode plate 3 is performed by the photosensor PH1 by means of the slits 3h formed in the mode plate 3, as well as by the switch SW1 which is pressed by the pressing portion 72c of the switch plate 72. This operation for detecting the rotational position of the mode plate is omitted from the following description.

[Step 101: Operation for Locating Disk Holder]

When the mode plate 3 is in its initial position P0 as shown in FIG. 1, the mechanism is so positioned that the space between the upper disk guide 37 and the lower disk guide 38 is aligned with the disk insertion slot 51.

Subsequently, the disk holder lifting mechanism is actuated by the power of the second motor 11, so as to move the stack of the disk holders 21 up or down, thereby locating a desired disk holder 21 to the position for receiving the disk. Namely, the stack of the disk holders 21 is moved up or down until the disk holder "n#n" of the n-th stage of the stack is brought into alignment with the disk insertion slot 51 of the shutter unit 50.

Figure 64:
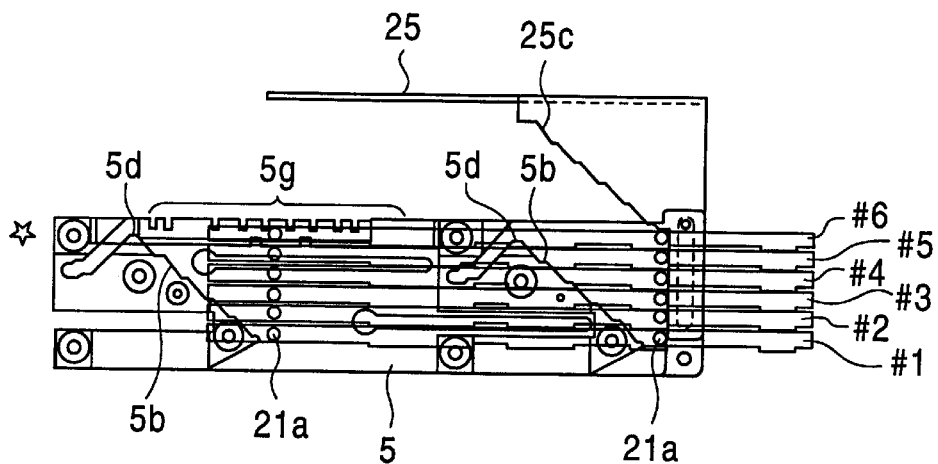
FIG. 64 is a perspective view of part of the apparatus showing a side select plate shown in FIG. 25 as viewed from the right side thereof.
Figure 65:
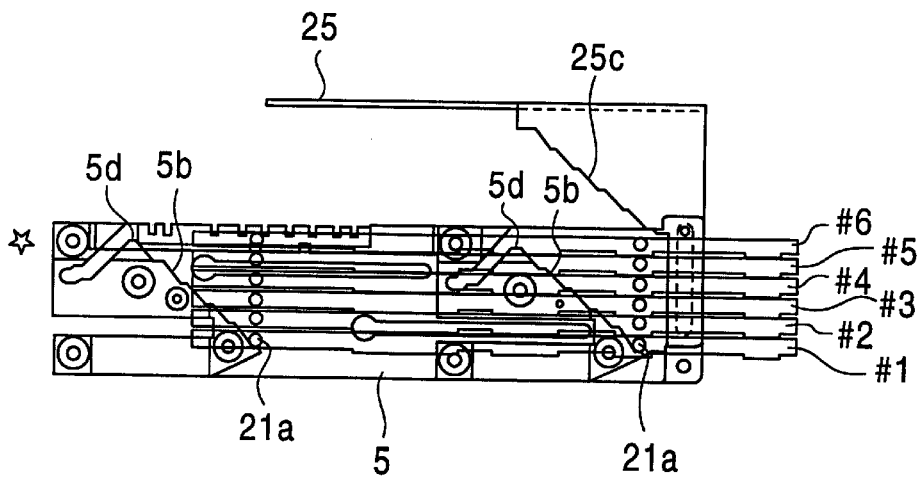
FIG. 65 is a transparent view of part of the apparatus showing the side select plate shown in FIG. 25 as viewed from the right side thereof, illustrative of a state in which the uppermost disk holder has been brought into alignment with the disk insertion position.
Figure 66:
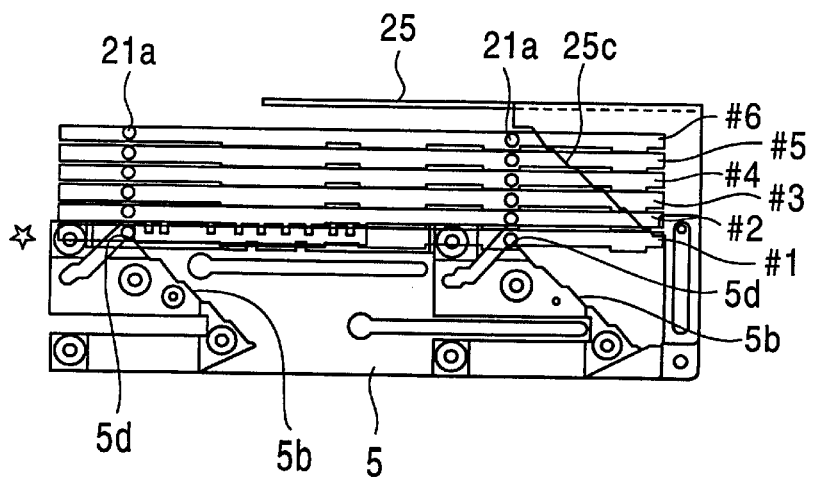
FIG. 66 is a transparent view of part of the apparatus showing the side select plate shown in FIG. 25 as viewed from the right side thereof, illustrative of a state in which the lowermost disk holder has been brought into alignment with the disk insertion position.

This operation will be described through illustrations of the motion of the side select plate 5 shown in FIGS. 64 to 66. Illustration will be omitted from the Figures in regard to the dividing cam groove 4b and the retraction horizontal portion 4b of the other side select plate 4, because the effects are the same as those of the side select plate 5. It is assumed here that a disk is to be loaded in the disk holder #6. To enable such disk loading, the side select plates 4, 5 are moved rearward, i.e., to the right as viewed in the Figures, from the initial position shown in FIG. 64, so that the projections 21a of the lowermost disk holder #1 come to rest on the lowermost steps of the dividing cam grooves 4b, 5b, as shown in FIG. 65.

In order to load a disk on the disk holder #1, the side select plates 4, 5 are further moved rearward, so that the projections 21a come to rest on the horizontal sections 4d, 5d of the uppermost steps of the dividing cm grooves 4b, 5b. As a result of the described movement of the disk holders 21, the desired one of the disk holders #1 to #6 is brought to a position which is indicated by a star mark in FIGS. 64 to 66 and which is aligned with the level of the disk insertion slot 51. The positions of the side select plates 4, 5 are detected by means of the photosensor PH2 which senses the slits 5g formed in the side select plate 5.

Upper cams 24c, 14c are provided above the dividing cam grooves 4b, 5b so as to oppose the cam grooves 4b, 5b across the projections 21e of the stack of disk holders 21. Therefore, when the stack of the disk holders 21 is raised, the projections 21a of the uppermost disk holder #6 are guided by the upper cams 24c, 25c, so that the upward movement of the disk holder #6 is performed in such a stable and smooth manner as can never be achieved when the movement is guided only by the dividing cam grooves 4b, 5b.

[Step 102: Shutter Opening Operation]

Subsequent to the positioning of the disk holders 21 which is performed in the above-described manner, the first motor 1 is activated to cause the mode plate 3 to rotate clockwise to the shutter open position Pa2 (see FIG. 49). Consequently, the door open link 6 is rotated to a shutter open position, thereby opening the shutter 52 of the shutter unit 50 which is fixed to the vehicle chassis (see FIG. 48). At this moment, the pressing portion 6d of the door open link 6 releases the switch SW2, thereby informing that the mechanism is in the disk-insertion stand-by state waiting for the insertion of the disk.

[Step 103: Disk Loading Operation]

When a disk is inserted through the disk insertion slot 51 while the mechanism is in the disk-insertion stand-by state as described, two photosensors PH4 and PH5 at the inlet side are turned on to produce detection signals indicating that the inserted 12-cm disk has been detected (see FIG. 56A). In response to the detection signals, the third motor 31 is activated to drive the loading roller 33, whereby the disk D is drawn deeper into the playback apparatus. Thus, the inner end of the disk D clears the loading roller 33 and reaches a predetermined position behind the mechanism, the remainder two photosensors PH6 and PH7 which are disposed at the inner side of the loading roller are turned on to produce detection signals (see FIG. 56B).

[Step 104: Setting of Disk]

The disk D is thus fed further into the playback apparatus by the rotating loading roller 33, beyond the disk loading completion detection position shown in FIG. 56B, thus leaving the loading roller 33. As a result, the inner two photosensors PH6 and PH7 are turned off, whereby the completion of the disk loading by the loading roller 33 is detected. In response to the detection of completion of the loading operation, the first motor 1 is activated to rotate the mode plate 3 counterclockwise as viewed in the Figure, from the shutter open position Pa2 to the disk force-in position Pa1 (FIG. 27). This causes the drive plate 35 to move forward through the action of the stage power link 9. Consequently, the stock arm 36 is rotated through the operations of the drive plate 35 and the pressing plate 35e, thereby forcing the disk D into the disk holding position D0.

To explain in more detail, when the mode plate 3 is rotated to the disk force-in position Pa1, the stage power link 9 is rotated to cause its pressing portion 9c to press a portion of the drive plate 35, thereby causing the drive plate 35 and, hence, the pressing plate 35e to move, as shown in FIG. 27. The pressing plate 35e then presses the stock arm 36 to rotate to the force-in position shown in FIG. 27, so that pressing portion 36b of the stock arm 36 forces the disk D into the disk holding position D0. As a consequence, the disk D is set in one of the disk holders, and is held therein by the effect of the disk hold spring 21d In the meantime, the described movement of the drive plate 35 brings the pin 32g of the idler plate 32f to the rear end of the groove cam 35c in the drive plate 35. This serves to disconnect the idler gear 32 to be disconnected from the gear train 32c on the guide shaft, so that the drive base unit 40 is not moved.

[Step 105: Unlocking of Vibration Damping Mechanism]

One or more disks are thus set in the disk holder or disk holders so as to fill up the stack of the disk holders 21, as a result of the execution of Steps 101 to 104 or by repetition of these Steps. Subsequently, the first motor 1 is activated to rotate the mode plate 3 counterclockwise as viewed in the Figure, from the initial position P0 to the floating lock dismissal position Pb1, whereby the slide plates 13, 14 are moved forward via the actions of the links 13d, 14d, thus unlocking the vibration damping mechanism.

This operation will be described in detail. As shown in FIGS. 50, 51, 53A and 53B, in the disk loading phase of the operation, the engaging portions 13c, 14c of the slide plates 13, 14 and the engaging portions 18c, 19c of the lock links 18, 19 respectively engage with corresponding locking portions 61a, 61b and 62a, 62b of the damper plates 61 and 62, so that the vibration damping mechanism is locked.

Figure 52:
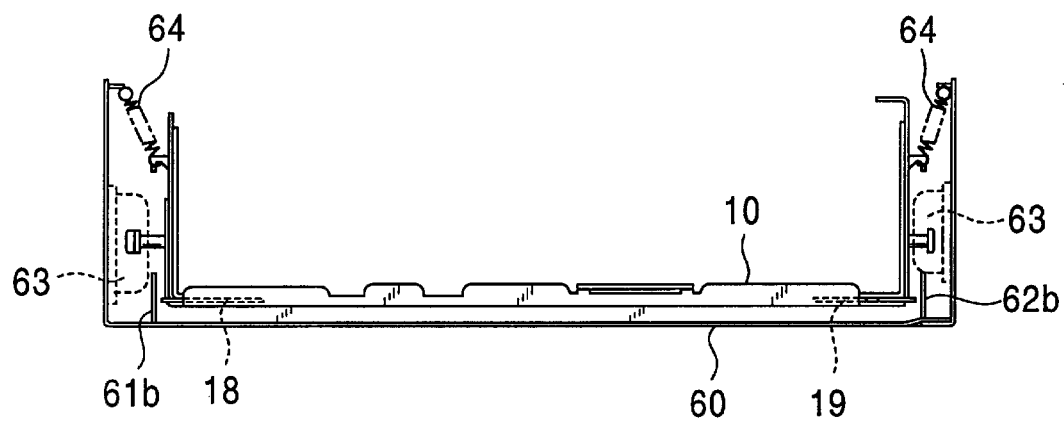
FIG. 52 is a front elevational view of the lower chassis unit of FIG. 50 in the floating unlocking position.

The mode plate 3 is rotated from this state as shown in FIG. 50, so that the slide plates 13, 14 are moved to the floating lock dismissal positions, i.e., to the positions where the pins 13e, 14e of the slide plates 13, 14 reach he straight portions of the groove cams 3b, 3c in the mode plate 3, the lock links 18, 19 also are rotated to the dismissal positions as shown in FIGS. 52, 54A and 54B, so that the engaging portions 13c, 14c of the slide plates 13, 14 and the engaging portions 18c, 19c of the lock links 18, 19 are disengaged from the damper unit 60, whereby the vibration damping mechanism is unlocked. Consequently, the mechanism is suspended in a floating manner on the vehicle chassis via the dampers 63 and the damper springs 64, thus set in the playback stand-by state ready for playing back a disk.

[Step 106: Selection of Disk Holder Separation Position]

In the disk playback stand-by state as described above, the stage unit 30 is positioned in relation to the disk to be played back. The disk to be played back may be selected automatically in accordance with a predetermined playback program or with playback instruction and selection instruction which are given manually.

More specifically, referring to FIG. 6, the first motor 1 is activated to rotate the mode plate 3 counterclockwise as viewed in the Figure, thereby causing the slide plates 13 and 14 to move, whereby the stage unit 30 is moved up or down to a disk playback position corresponding to the disk to be played back, i.e., to the disk playback position corresponding to the n-th disk holder "#n" which holds the disk to be played back.

Figure 67:
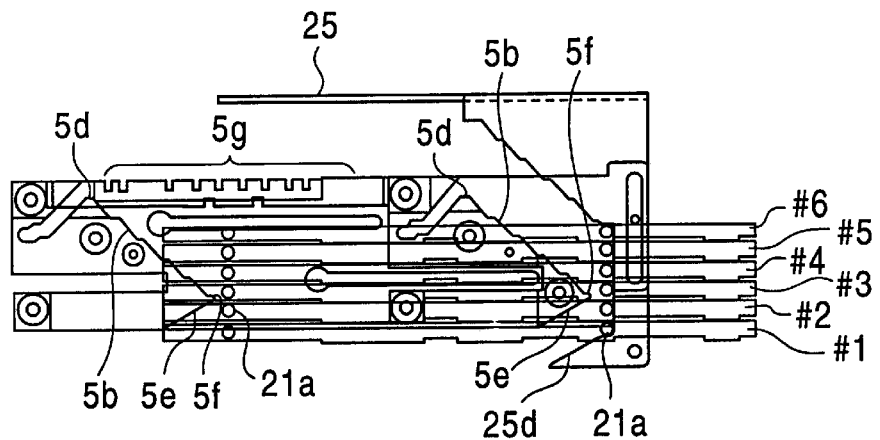
FIG. 67 is a transparent view of part of the apparatus showing the side select plate shown in FIG. 25 as viewed from the right side thereof, illustrative of a state in which a separation position where the disk holders are to be divided into two groups has been selected by the side select plate.

For instance, when the disk to be played back is held in the disk holder "#3" which is the third one as counted from the bottom of the stack, the mode plate 3 is rotated to move the slide plates 13, 14 through the actions of the pins 13e, 14e in the straight portions of the groove cams 3b, 3c, so as to move the stage unit 30 up or down to bring the acute portions 4f, 5f of the side select plates 4, 5 into alignment with the position of the gap between the third-stage disk holder "#3" and the second-stage disk holder "2", as will be seen from FIG. 67.

When the selection of the disk holder by the vertical movement of the stage unit 30 is executed, the stage power link 9 is moved to the stand-by position by the effect of the cam groove 3e of the mode plate 3, as shown in FIG. 26. Thus, the drive plate 35 is relieved from the pressing force that has been exerted thereon by the pressing portion 9c of the stage power link 9, whereby the drive plate 35 is moved backward by the urging force of the spring 35d. Consequently, the stock arm 36 is relieved from the pressing force that has been exerted by the pressing force 35e, so that it is rotated and reset to the initial position by the urging force of the torsion spring 36c.

In this state, the pin 32g of the idler plate 32f is positioned in a front portion of the groove cam 35c of the drive plate 35, so that the idler gear 32b engages with the gear train 32c on the guide shaft. Therefore, the stage gear 30c is coupled to the loading roller 33, whereby the stage gear 30c becomes ready for driving by the third motor 31.

[Step 107: Separation of Disk Holders]

Subsequent to the selection of the separation position performed as described above, the second motor 11 is activated to cause the upper select plates 24, 25 to move horizontally, thereby causing the side select plates 4, 5 to move. The positions of the side select plates 4, 5 is performed by means of the photosensor PH2 which sense the slits 5g formed in the edge of the side select plate 5.

As stated before, it has been assumed that the third-stage disk holder "#3" has been selected. As a result of the above-described movements of the side select plates 4, 5, the projections 21a of the disk holders #1 to #6 that are located above the acute portion 5f, are raised upward by the effect of the dividing cam groove 5b, whereas the projections 21a of the disk holders #1 and #2 that are below the acute portions 4f, 5f are urged downward by the effect of the upper slant portions 4e, 5e.

Consequently, the disk holders #3 to #6 are moved upward as a unit, while the disk holders #1 and #2 are moved to a lower portion of the side select plates 4, 5, whereby the stack of the disk holders 21 is divided into two grooves, and a space for receiving the drive base unit is formed beneath the selected disk holder #3.

Upper cams 24c, 25c are positioned above dividing cam grooves 4b, 5b to clamp therebetween the projections 21e of the upwardly moving disk holders 21. Similarly, lower slant portions 24d, 25d are positioned below the upper slant portions 4e, 5e to clamp therebetween the projections 21e of the downwardly moving disk holders 21. Therefore, during the separation of the groups of disk holders 21, the projections 21a of the uppermost disk holder #6 are guided by the upper cam 24c, while the projections 21a of the lowermost disk holder #1 are guided by the lower slant portions 24d, 25d.

[Step 108: Insertion of Drive Base Unit]

Then, the drive base unit 40 is moved into the space which is formed as a result of separation of the disk holders. More specifically, when the groups of the disk holders are separated, the stage gears 30c, 30d are coupled to the loading roller 33, so that these stage gears 30c, 30d are ready to be driven by the third motor 31., as stated before. Therefore, as the third motor 31 is started, the stage gears are driven to rotate as shown in FIGS. 33 to 37, whereby the drive base 40a is moved horizontally via the operation of the rack plate 47. This horizontal movement causes the drive base 40a to leave the switch plate 39 shown in FIG. 55, whereby the switch plate 39 is rotated by the urging force of the spring, with the result that the pressing portion 39a of the switch plate 39 to release the switch SW5.

As the drive base 40a is moved from the initial position (shown by solid line in FIG. 33) to the position shown by two-dot-and-dash line in FIG. 33, the switch SW6 is pressed by one end of the drive base 40a, thus detecting the arrival of the drive base 40a at the chucking position. In this state, the position spring 48 engages with the notch 86a of the position plate 86, whereby the drive base 40a is fixed at the chucking position. Consequently, the drive base unit 40 is moved into the space that has been formed as a result of the separation, i.e., the division of the stack of the disk holders, whereby the turntable unit 45 on the drive base unit 40 is held at a position where it overlaps the disk which is held by the disk holder 21.

[Step 109: Disk Chucking]

After the drive base unit 40 is inserted into the space mentioned above, the fourth motor 41 is activated so that the lead screw 43 is driven to rotate through the gear mechanism 42, whereby the pickup unit 44 is moved to activate the load dismissal mechanism of the disk hook 94, as shown in FIG. 40.

More specifically, in the initial state shown in FIG. 59, the pickup unit 44 is set in its initial position where the screw holder 91 presses the switch SW7, but is not in contact with the connecting shaft 43b of the load dismissal mechanism. Therefore, as shown in FIGS. 43 and 45, the first and second chucking arms 95 and 96 have been urged by the force of the spring 96e, such that their slant surface portions 95c, 96d are spaced apart from the tapered peripheral surface of the chucking sleeve 94d. Accordingly, the chucking sleeve 94d is held at the raised position by the urging force of the spring 94e, so that the disk hooks 94 is urged by the chucking sleeve 94d to keep their claws in the disk chucking positions.

Figure 60:
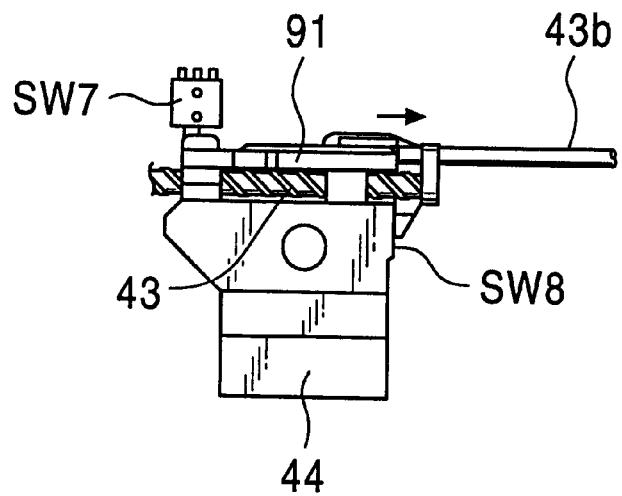
FIG. 60 is a plan view of the pickup unit shown in FIG. 40 in a chuck release position.

In this state, the fourth motor 41 is activated to cause the pickup unit 44 to further move towards the turn table unit 45, so that the switch SW8 of the pickup unit 44 is pressed by the supporting member of the lead screw 43 as shown in FIG. 60, with the result that an end of the pickup unit 44 presses the connecting shaft 43b. As a result, the pressing portion 42b of the connecting shaft 43b presses an end of the first chucking arm 95, so that the first chucking arm 95 and the second chucking arm 96 are rotated against the urging force of the spring 96e, with the result that their slant surface portions 95c, 96c are brought into contact with the tapered peripheral surface of the chucking sleeve 94d, as shown in FIGS. 44 and 46. Consequently, the chucking sleeve 94d is moved downward against the urging force of the spring 94e, to press the catching recesses 94b, whereby the disk hooks 94 are rotated to bring the claws 94a to the disk releasing positions, thus allowing the disk to be located on the turntable unit 45.

Figure 69:
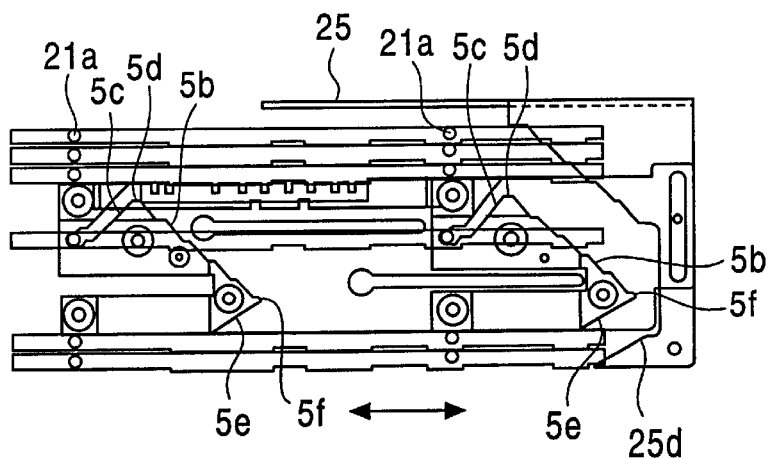
FIG. 69 is a transparent view of part of the apparatus as viewed from the right side thereof, illustrating a state in which a disk holder has been moved to a chucking position by the side selector plate shown in FIG. 25.

Subsequently to the dismissal of load on the disk hook, the second motor 11 is activated so that the side select plates 4, 5 are moved rearward as shown in FIG. 69, with the result that the projections 21a of the disk holder #3 are moved from the horizontal sections 4d, 5d into the chucking cam grooves 4c, 5c, whereby the disk holder #3 alone is lowered so as to locate the disk D in this disk holder with respect to the turntable unit 45, such that the claws 94a of the disk hooks 94 are caught in the inner bore of the disk D. The disk chucking cam grooves 4c, 5c extend downward to a level slightly below the level corresponding to the level of the turntable unit 45, so that the selected disk holder #3 is caused to resiliently deflect so as to press the disk D onto the turntable unit 45, thereby correctly locating the disk D.

Subsequently to the described disk locating operation, the fourth motor 41 is further activated to move the pickup unit 44 to the initial position as shown in FIG. 59, away from the connecting shaft 43b. Consequently, as shown in FIGS. 43 and 45, the first and second chucking arms 95, 96 are rotated by the urging force of the spring 96e, so that the slant surface portions 95c, 96d move away from the tapered peripheral surface of the chucking sleeve 94d. Therefore, the chucking sleeve 94d is moved upward by the force of the spring 94e, so that the disk hooks 94 are pivotally moved by the chucking sleeve 94d, whereby the claws 94a are moved to the disk chucking positions. Consequently, the claws 94 engage with the inner bore of the disk D, thereby securely holding the disk D on the turntable unit 45.

[Step 110: Draw-out of Disk]

Subsequent to the disk chucking operation performed as described above, the third motor 31 is activated to drive the stage gears 30c, 30d, thereby slightly moving the drive base unit 40 from the chucking position toward the initial position, thus locating the drive base unit at the play position. The positioning of the drive base unit 40 at the play position is detected by means of the photosensor PH3 shown in FIG. 39. When the drive base unit 40 is located at the play position, the position spring 48 of the drive base unit 40 engages with the central notch 86a of the position plate 86.

The described horizontal movement of the drive base unit 40 causes the disk D chucked on the turntable unit 45 to be drawn out of the disk holder #3, against the urging force of the disk hold spring 21b.

[Step 111: Disk Holder Raising Operation]

Figure 70:
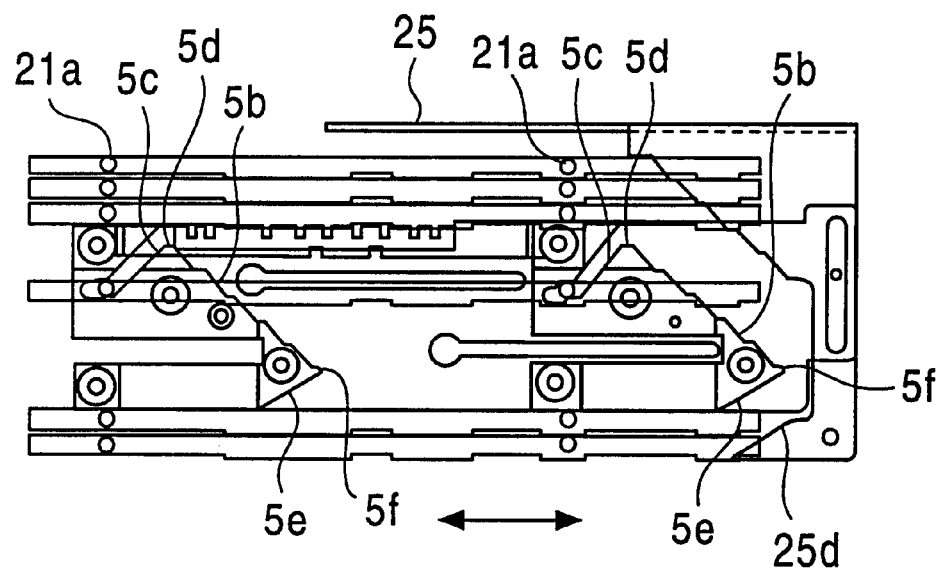
FIG. 70 is a transparent view of part of the apparatus as viewed from the right side thereof, illustrating a state in which the disk holder has been elevated from the chucking position by the side selector plate shown in FIG. 25.
Figure 71:
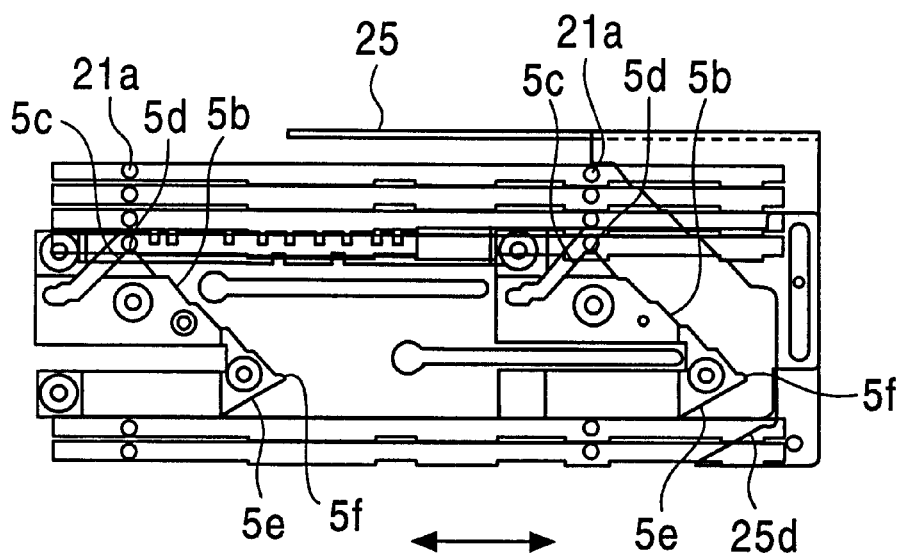
FIG. 71 is a transparent view of part of the apparatus as viewed from the right side thereof, illustrating a state in which the disk holder has been retracted by the side selector plate shown in FIG. 25.

When the disk chucking operation and the subsequent dusk draw-out operation are over, the second motor 11 is rotated to forwardly move the side select plates 4 and 5, so that the projections 21a of the disk holder #3 are moved from the chucking cam grooves 4c, 5c back into the horizontal sections 4d, 5d for retraction, followed by upward movement of the disk holder #3 again to the raised position where the disk holder #3 does not impede the playback operation, as shown in FIGS. 70 and 71.

[Step 112: Disk Playback Operation]

Normal disk playback operation is performed after completion of the above-described series of operations. The disk D is played back by a combination of rotational driving of the turntable unit 45 by means of the spindle motor 46 and a horizontal movement of the pickup unit 44 by means of the fourth motor 41.

[2. Resetting After Playback of the Disk]

A brief description will be given of a resetting operation that is performed subsequent to the playback of the disk, with reference to a flowchart shown in FIG. 62. In Step 201, the disk holder that has been set in the raised position is lowered. In Step 202, the drive base unit 40 is moved rearward, whereby the disk on the turntable unit 45 is accommodated in the disk holder 21. Then, in Step 203, the load on the disk hooks 94 is dismissed and the disk holder 21 is raised, thereby demounting the disk from the turntable unit 45. Then, in Step 204, the drive base unit 40 is returned to the initial position and, in the subsequent step 205, the disk holder 21 is lowered to the initial position.

After the completion of playback of a disk, when it is desired to playback another disk held in the mechanism, the series of steps 106 to 112 for selecting and playing back a disk are executed subsequent to the above-described resetting operation performed by steps 201 through 205.

Each of the steps 201 to 205 will be described in detail, on an assumption that the disk D is the disk that has been drawn out from the disk holder #3 as stated before and, hence, to be reset to the disk holder #3.

[Step 201: Lowering of Disk Holder]

The second motor 11 is activated to cause the side select plates 4, 5 to slide, whereby the projections of the disk holder are moved from the horizontal sections 4d, 5dinto the chucking cam grooves 4c, 5c, thereby lowering the disk holder to the level corresponding to the level of the played back disk D, as shown in FIGS. 70 and 69. Namely, the disk holder #3 bound to accommodate the disk D is lowered to the level corresponding to the level of the disk held on the turntable unit 45.

[Step 202: Accommodation of Disk]

When the playback of the disk is completed, the mode plate 3 is set at the selection playback position Pb where the disk holder #3 that has held the played back disk is selected, while the stage power link 9 is set in the stand-by position, as shown in FIG. 26. Therefore, as shown in FIG. 29, the pin 32g of the idler-plate 32f is positioned at the front end of the groove cam 35c of the drive plate 35, and the horizontal drive gear mechanism 32 drivingly interconnects the third motor 31 and the stage gears 30c, 30d.

Subsequent to the lowering of the disk holder, the third motor 31 is rotated so that the drive base unit 40 which has been set in the disk playback position is horizontally moved back to the chucking position as shown in FIG. 33. This horizontal movement of the drive base unit 40 causes the disk held on the turntable unit 45 to be inserted into the corresponding disk holder #3. More specifically, the disk D reaches the disk holding position in the disk holder while forcibly deflecting both disk holding springs 21b, and is held at this position by the effect of the disk holding springs 21b.

[Step 203: Demounting of Disk]

After the disk D is accommodated in the disk holder, the fourth motor 41 is activated to cause the lead screw 43 to rotate through the gear mechanism 42, thereby activating the load dismissal mechanism for relieving the disk hooks from the load, by utilizing the movement of the pickup unit 44.

More specifically, as in the case of the disk chucking operation, the fourth motor 41 is activated to move the pickup unit 44 from the initial position shown in FIG. 59 to the chuck-releasing position shown in FIG. 60, thereby pressing the connecting shaft 43b, whereby an end of the first chucking arm 95 is pressed by the pressing portion 43c of the connecting shaft 43b. As a result, the first chucking arm 95 and the second chucking arm 96 are rotated against the force of the spring 96e as shown in FIGS. 44 and 46, whereby the slant surface portions 95c, 96c are brought into contact with the tapered peripheral surface of the chucking sleeve 94d. Consequently, the chucking sleeve 94d is moved against the biasing force of the spring 94e to urge the catching recesses 94b, thereby causing the disk hooks 94 to pivot to move the claws 94a to the disk releasing positions, thus setting the mechanism to a state ready for the demounting of the disk D from the turntable unit 45.

Figure 68:
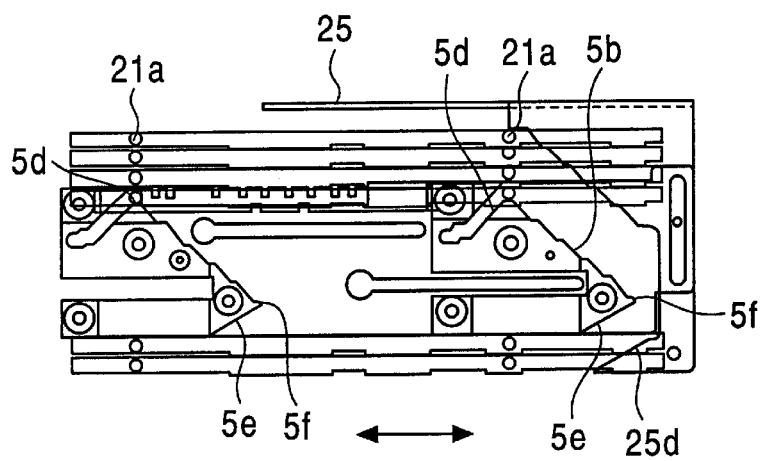
FIG. 68 is a transparent view of part of the apparatus showing the side select plate shown in FIG. 25 as viewed from the right side thereof, illustrative of a state in which the disk holders have been divided into two groups at the separation position by the side select plate.

Subsequent to the dismissal of the load on the disk hooks 94, the second motor 11 is activated to cause the side plates 4, 5 to slide, whereby the projections 21a of the disk holder #3 are moved from the disk chucking cam grooves 4c, 5c into the stocker retraction horizontal sections 4d, 5d, as shown in FIG. 68, whereby the disk holder #3 is raised to demount the disk D held in this disk holder #3 from the turntable unit 45.

Subsequent to the demounting of the disk D, the fourth motor 41 further operates to return the pickup unit 44 to the initial position as shown in FIG. 59, thereby releasing the connecting shaft 42a from the pressing force that has been exerted by the pickup unit 44. Then, as shown in FIGS. 43 and 45, the first and second chucking arms 95, 96 are rotated by the urging force of the spring 96e to bring the slant surface portions 95c, 96c away from the tapered peripheral surface of the chucking sleeve 94d. Therefore, the chucking sleeve 94d is moved upward by the urging force of the spring 94e, so that the disk hooks 94 urged by the chucking sleeve 94d are cause to pivot to reset the claws 94a to the disk holding positions, though the disk has been removed therefrom.

[Step 204: Resetting of Drive Base Unit]

Subsequent to the demounting of the disk, the third motor 31 is activated to bring the drive base unit 40 from the chucking position to the initial position which is indicated by solid lines in FIG. 33.

[Step 205: Resetting of Disk Holder]

Subsequent to the described operation for resetting the drive base unit 40, the second motor 11 is activated to cause the side select plates 4, 5 to slide, so that the projections 21a of the disk holder #3 are moved into the dividing cam grooves 4b, 5b. Consequently, the disk holders #3 to #6 are lowered and reset in the original positions as shown in FIG. 67. In the meantime, the projections 21a of the lower disk holders #1 and #2 are moved following the upper slant portions 4e, 5e beyond the acute portions 4f, 5f. Consequently, in each pantograph 22, the torsion spring 22c urges the plate 22a in the pantograph-closing direction, whereby the disk holders that have been divided into two groups are again consolidated into a single stack.

When the disk holder 21 is closed, the projections of the disk holder #6 are urged downward by the upper cam 24c, while the projections 21a of the disk holder #1 are urged upward by the lower slant portion 2. These urging forces add to the closing force produced by the torsion springs 22c of the pantographs 22, so that the compacting of the disk holders into the single stack can be performed with a greater force. Further, a moment is produced so as to decline the front end of the disk holder 21, by the weight of the disk holder 21 itself and the weight of the disk. This moment serves to ensure that the disk holders 21 are closed, i.e., compacted, to form the single stack even though the motions of the disk holders encounter with considerable sliding resistances.

The disk ejecting operation will be briefly described below, with reference to a flowchart shown in FIG. 63. In Step 301, the vibration damping mechanism of the mechanical part of the apparatus is locked to fix the mechanical part. In Step 302, the stage unit 30 is reset to the initial position. In Step 303, the disk holders 21 are moved in accordance with the position of the disk holder #n from which the disk is to be ejected, thus locating this disk holder at a position ready for the ejection. Then, in Step 304, the shutter 52 is opened and the disk is forced out of the disk holder #n by means of the eject arm 7. In the next step 305, the disk forced out of the disk holder #n is ejected by means of the loading roller 33 to a position where the disk can be taken out of the apparatus.

[3. Ejection of Disk]

When a disk eject instruction is received after completion of playback of a disk, the above-described series of steps 301 to 304 are executed following the above-described resetting operation, i.e., Steps 201 to 205.

Each of Steps 301 to 305 will be described in detail.

[Step 301: Locking of Vibration Damping Mechanism]

When the side select plates 4, 5 have been reset to the initial positions to compact the disk holders 21, the slide plates 13, 14 are set at the releasing positions as shown in FIGS. 50, 52 and 54, and are held away from the damper plates 61, 62, as are the cases of the lock links 18, 19. Thus, the vibration damping mechanism has been unlocked, so that the mechanism of the apparatus is held in a floating manner on the vehicle chassis. Starting from this state, the mode plate 3 is rotated clockwise to cause the slide plates 13, 14 to slide by an amount corresponding to the length of the lowermost stages of the stepped cams 13a, 14a, whereby the slide plates 13, 14 and the lock links 18, 19 are brought into engagement with the damper plates 61 and 62, respectively, thus locking the vibration damping mechanism. Consequently, the mechanical part of the apparatus is fixedly held, with the disk insertion slot 51 of the shutter unit 50 aligned with the disk passage 39 in the stage unit 30.

[Step 302: Resetting of Stage Unit]

As a result of the locking of the vibration damping mechanism, the slide plates 13, 14 are reset to the initial position P0 to bring the stage unit 30 to the lowermost position. Consequently, the mechanism is reset to the disk playback stand-by state which was described before.

[Step 303: Operation for Locating Disk Holder]

Subsequent to the locking of the vibration damping mechanism, the second motor 11 is activated so as to raise the disk holders 21 by the operation of the disk holder lifting mechanism 22, thereby bringing the aimed disk holder to the position that permits ejection of the disk therefrom. For instance, when the disk D to be ejected has been set in the disk holder #6 of the sixth stage or in the disk holder #1 of the first stage, the disk holders 21 as a unit are moved down or up to bring the disk holder #6 or #1 to the position where it is aligned with the disk insertion slot 51 of the shutter unit 50.

[Step 304: Operation for Opening Shutter and Forcing Out Disk]

Subsequent to the described operation for locating the disk holder 21, the first motor 1 further operates to rotate the mode plate 3 to the shutter open position Pa1 (see FIG. 49) which is an extreme end position, whereby the door open link 6 is moved to the shutter opening position to open the shutter 52 of the shutter unit 50 which is fixed to the vehicle chassis (see FIG. 48). The movement of the mode plate 3 to the shutter open position Pa1 causes the eject arm 7 to rotate from the:disk release position to the disk eject position, whereby the disk D is forced out of the disk holder #n and pressed onto the loading roller 33, as shown in FIG. 58.

[Step 305: Disk Eject]

The disk D is thus forced out of the disk holder #n. As a result, the inner two photosensors PH6, PH7 are turned on to produce detection signals, thereby starting the third motor 21. As a result, the loading roller 33 is driven to rotate to move the disk in the direction for ejection. This disk ejecting operation continues to further move the disk D, so that part of the disk D projects from the disk passage in the mechanical part. In this state, the outer two photosensors PH3 and PH4 are also turned on. The disk D finally reaches the disk ejection completion detection position as shown in FIG. 56C, where most part of the disk D has come out the disk passage. In this state, the inner two photosensors PH4 and PH5 are switched to non-detecting states, thus informing that the ejection of the disk by the loading roller 33 has been completed. The third motor 31 and, hence, the loading roller 33 are stopped in this state, so that the disk D is held by the loading roller 33 so as to be extractable through the disk insertion slot 51. Thus, the mechanism is set to the disk withdrawal stand-by state.

E. Advantages of the Embodiment

The described embodiment of the disk payback apparatus in accordance with the present invention offers the following advantages. In the illustrated embodiment of the disk playback apparatus, all the major components such as the side select plates 4, 5 for moving the disk holders 21 up and down, the loading roller 33 for loading and ejecting a disk, and the drive base unit 40 that plays back the disk are carried by the stage unit 30, so as to be moved up and down together with the stage unit 30, without changing the heightwise positional relationships between these components. Therefore, when the disk holders 21 are moved up and down or when the stack of the disk holders is divided into groups, it is easy to achieve alignment between the selected disk holder 21 and the loading roller 33 and the drive base unit 40, as well as synchronization of operation timings, thus offering high reliability of operation of the apparatus.

The vertical stroking of the side select plate 4, 5, the loading roller 33 and the drive base unit 40 can be achieved solely by the mechanism that effects the vertical motions of the stage unit 30. It is therefore possible to reduce the size of the driving and controlling mechanisms, while simplifying the structures of the same.

Further, the arrangement is such that the rotation of the eject arm 7, rotation of the stock arm 36 and the opening and closing actions of the shutter 52 are effected by a single motor, i.e., the first motor 1, which also produces force to move the stage unit 30 up and down, by virtue of the use of a single mode plate 3, thus contributing to the reduction in the number of the power units. The reduction in the number of the power units also is realized by the use of the horizontal driving mechanism 32 incorporating the third motor 31 which produces force both for the horizontal movement of the drive base unit 40 and the driving of the loading roller 33. In the illustrated embodiment of the invention, many components including the slide plates 13, 14, door open link 6, eject arm 7, stage power link 9 and so forth are controlled by means of the single mode plate 3 and, through the operations of these components, a variety-of operations are all controlled such as the vertical motion of the stage unit 30, selection of the separation position for dividing the stack of the disk holders 21, opening and closing of the shutter 52, setting ad ejection of the disk, and so forth. Thus, the single mode plate 3 permits an easy adjustment of the operation timings of the whole mechanism, thus realizing reduction in the number of the components. This feature, together with the aforesaid reduction in the number of the power units and the simplification of the driving arrangement, offers a further reduction in the size and weight of the apparatus, as well as the simplification of the structure of the same.

The opening and closing actions of the shutter are controlled also by the mode plate 3, through the action of the door open link 6. It is therefore possible to adequately control the actions of the shutter 52 in relation to the timings of operations of the internal mechanisms. This serves to exclude any wrong operation such as an attempt to insert the disk under such a state that the internal mechanisms are not ready for accepting the disk, thus improving the reliability of the operation. In the illustrated embodiment, the shutter 52 is opened only when a disk is being loaded or ejected, otherwise the shutter 52 is kept closed. This minimize the risk of invasion by foreign or undesirable matters such as water, dust and so forth.

The vertical stroking of the disk holders 21 is effected by the horizontal movements of the side select plates 4, 5. A large vertical stroke of the disk holders 21 can be achieved by a small horizontal movement of the side select plates 4, 5 by virtue of the use of an inclined dividing cam grooves 4b, 5b. In other words, the vertical stroking of the disk holders 21 can be effected without problem, even when the depthwise dimension of the apparatus is limited to afford only a small horizontal stroke of the side elect plates 4, 5. This also serves to reduce the overall dimensions of the apparatus. The dividing cam grooves 4b, 5b are stepped to have a plurality of stages or horizontal sections, thus enabling accurate positioning of the disk holders 21 in the vertical direction, offering a further improvement in the reliability of operation. To realize the vertical motions of the disk holders 21, each disk holder 21 is required only to have projections 21a. The disk holder 21 therefore also can have a small and simple structure.

Projections 21e of the disk holders 21 are guided both from the upper and lower sides thereof by the cooperation between the dividing cam grooves 4b, 5b and the upper cams 24c, 25c or by the cooperation between the upper slant portions 4e, 5e and the lower slant portions 24d, 25d, so that disk holders 21 are moved more stably and more smoothly than in the case where the disk holders 21 are guided only by the dividing cam grooves 4b, 5b and the upper slant portions 4e, 5e, thus achieving a further improvement in the reliability. In particular, when the disk holders 21 are moved in the compacting direction, i.e., in the direction for forming a single stack of the disk holders by eliminating the space formed at the separation position, the projections 21a of the disk holders 21 are urged downward and upward, respectively, by the upper cam 24c and the lower slant portion 2, so that a large compacting force is produced to compact the disk holders 21 without fail. It is thus possible to realize reduction in the size of the apparatus and saving of power, through reduction in the force to be exerted by the springs in the pantographs 22, as well as the reduction in the driving power required for the side select plates 4, 5, while ensuring safe separation and compacting of the disk holders 21.

When the disk D is forced by the stock arm 36 into the disk holding position, the force is regulated by the effects of the buffer plate 35f and the spring 35g, so that the disk can be forced into the disk holding position with a constant force regardless of any fluctuation in the diameter of the disk D or any variation of dimensions of the mechanical parts within tolerances. It is thus possible to improve both stability and reliability of the operation.

During the disk loading, as well as during the disk ejection, the disk holder 21 is supported at its four points, i.e., at the three projections 21e and the locating projection 21f. This serves to eliminate any unstable behavior of the disk holder 21, thus ensuring stable and smooth movement of the disk D during loading and ejection.

The pair f photosensors PH4 and PH5 disposed at the same side of the loading roller 33 as the disk insertion slot discriminates the diameters of the disks, so as to allow the loading roller 33 to operate only when the received disk is a 12 cm disk. It is therefore possible to avoid erroneous operation or other trouble which otherwise may be caused when a foreign member such as an 8-cm disk is wrongly inserted. This serves to improve the reliability of the operation.

During the loading and ejection of the disk, the disk D can be guided into the nip between the loading roller 33 and the lower roller 38c , by the effects of the upper disk guide 37, lower disk guide 38 and the side guide disks 37a, 37b. Therefore, the disk can be loaded and ejected without fail, despite any misalignment between the disk D and the loading roller 33. This also contributes to improvement in the reliability.

The switches SW7 and SW8 detects that the pickup unit 44 is set at the initial position and the chuck-releasing position, respectively. In the event or an unexpected trouble such as a control failure, the position of the pickup unit 44 is known accurately upon recovery of the control function, thus enabling the subsequent operation to be performed smoothly and accurately.

The movement of the drive base 40a is effected by the pair of stage gears 30c, 30d which are spaced by a distance slightly smaller than the length of the rack portion 47a of the rack plate 47. It is therefore not necessary that the rack portion 47a has a length corresponding to the stroke of movement of the drive base 40a. This appreciably shortens the length of the rack plate 47, contributing to the reduction in the size of the apparatus.

Further, the partition plate 21a of the disk holder 21 has an inside diameter large enough to be cleared by radial protrusions 97a of the 8-cm disk adapter 97. This eliminates the necessity for any increase in the distance between the partition plates 21a for the purpose of accommodating the protrusions 97a. This enables the height of the stack of the disk holders 21, thus enabling further reduction in the size of the apparatus.

F. Other Embodiments/modifications

Although the invention has been described through its specific form, it is to be understood that the described embodiment is only illustrative, and various changes and modifications may be imparted thereto without departing from the scope of the present invention. Thus, the structures of the respective units may suitably be selected and determined, and the structures and arrangements of various parts controlled by the mode plate may also be selected and determined.

For instance, the numbers of the parts such as the disk holders, motors, sensors, switches, gears, dampers and so forth employed in the illustrated embodiment are only illustrative and may be increased or decreased when the apparatus is designed. It is also possible to use a plurality of mode pates 3 so that these mode plates 3 suitably share the operations for driving the slide select plates 13, 14, door open link 6, eject arm 7, and the stage power link 9. In such a case, the members which engage with the sole mode plate in the illustrated embodiment can be shared to the plurality of mode plates. In such a case, each mode plate can have a size smaller than that used in the described embodiment, and the arrangement for the engagement can be correspondingly simplified. The use of the single mode plate as in the described embodiment, however, is preferred from the view point of ease of control of operation timings of the whole mechanism, as well as reduction in the number of the parts.

Although a series of operations performed by a disk playback apparatus has been described by way of example, it is to be understood that the operations may be varied or modified in accordance with the structure of the disk playback apparatus. It is also possible to apply a variety of operation programs to apparatuses having similar structures. It is also to be appreciated that the present invention may be incorporated not only in an apparatus designed exclusively for the playback of disks but also in apparatuses that are designed both for recording and playback.

Advantages of the Invention

As will be understood from the foregoing description, the present invention provides a disk playback apparatus having a small and simplified structure, despite the use of the disk holder stacking/separation system. The disk playback apparatus can perform various operations at adequate timings such as the selection of the separating position and execution of the separating operation in accordance with the position of the disk to be played back, adjustment of the level of the drive base unit, insertion of the drive base unit into the space formed as a result of the separation, chucking of the disk, and so on. Thus, the disk playback apparatus of the invention has improved reliability and operability. In particular, the disk playback apparatus of the present invention is suited to use on vehicles, because of its reduced size and simplified structure.

Various other changes and modifications are possible without departing from the spirit and scope of the invention which are limited solely by the appended claims.

What is claimed is:

1. A disk playback apparatus, comprising:
   a disk insertion section through which disks are inserted and ejected;
   a plurality of disk holders each holding one of the disks to be inserted and ejected;
   a drive base unit for playing back a disk from one of the plurality of disk holders;
   disk holder lifting means for selecting the disk holder holding the disk and for lifting or lowering all or part of the disk holders so as to form a space for accommodating said drive base unit;
   drive conveyance means for moving the drive base unit between the space formed as a result of the lifting or lowering of the disk holders and a space adjacent to said disk insertion section, to insert the drive base unit within the space to chuck the disk on the drive base unit from a disk holder and to move with the chucked disk to a playback position;
   disk loading/ejection means for pulling inward the disk that has been inserted through said disk insertion section to enable said disk to be held by said disk holder, and for receiving the disk from said disk holder and ejecting the received disk to said disk insertion section;
   a stage unit for supporting the disk holder lifting means and said drive base unit; and
   stage lifting means for lifting and lowering said stage unit in accordance with the position of the selected disk holder including a lower chassis with movable side plates, each side plate having a stepped inclined cam surface for driving the stage unit;
   wherein said stage unit including a cam member having an inclined cam surface, said cam member being carried by said stage unit for movement in the direction for loading and ejecting said disk, each said disk holder having a cam follower contacting with said cam surface of said cam member and urged in at least one of upward and downward directions in accordance with the movement of the cam member.

2. A disk playback apparatus according to claim 1, wherein said disk loading/ejection means are provided on a portion of said drive base unit adjacent the disk insertion section.

3. A disk playback apparatus according to claim 2, wherein said disk holder lifting means includes a cam member having an inclined cam surface, said cam member being carried by said drive base unit for movement in the directions for loading and ejecting said disk, each said disk holder having a cam follower contacting with said cam surface of said cam member and urged in at least one of upward and downward directions in accordance with the movement of the cam member.

4. A disk playback apparatus according to claim 1 wherein said disk holder lifting means includes a motor unit and a cam member having an inclined cam surface, said cam member being carried by said drive base unit for movement in the directions for loading and ejecting said disk, each said disk holder having a cam follower contacting with said cam surface of said cam member and urged in at least one of upward and downward directions in accordance with the movement of the cam member, the stage unit is driven from an output force provided by the motor unit.

5. A disk playback apparatus according to claim 4, wherein said cam surface of said cam member is stepped to provide stages corresponding to the positions of said disk holders which are lifted and lowered.

6. A disk playback apparatus according to claim 4, wherein said cam member has a guide cam continuing from said cam surface, said guide cam serving to guide said cam follower of said disk holder until the disk held by said disk holder is brought to a position where the disk is played back by said drive base unit.

7. A disk playback apparatus according to claim 4, wherein said cam member has a slant portion which is parallel to said cam surface and which opposes said cam surface across the cam follower of said disk holder.

8. A disk playback apparatus according to claim 1, further comprising a pair of disk detectors disposed at the side of said disk loading/ejection means adjacent to said disk insertion section, said disk detectors being spaced a distance greater than the diameter of said 8-cm disk but smaller than the diameter of a 12-cm disk.

9. A disk playback apparatus according to claim 1, wherein said disk loading/ejection means includes a loading roller and an idle roller which cooperate in nipping said disk therebetween from the upper and lower sides of said disk, said disk playback apparatus further comprising an upper disk guide and a lower disk guide which are disposed near said loading roller at the side thereof adjacent to said disk insertion section, said idle roller being movable into and out of contact with said loading roller and urged by resilient members into contact with said loading roller, said upper disk guide or said lower disk guide being engaged and supported at its one end by the shaft portions of said idle roller.

10. A disk playback apparatus according to claim 1, further comprising a side disk guide arranged at the side of said disk loading/ejection means and operative to guide the moving disk from the left and right sides of said disk.

11. A disk playback apparatus according to claim 1, wherein said drive base unit includes:

a turntable unit for carrying-the disk to be played back; a spindle motor for rotationally driving said turntable unit;

chucking means for chucking said disk to fix said disk on said turntable unit;

a pickup unit movable in the radial direction of said disk to detect signals recorded in said disk;

chuck-releasing means for dismissing the chucking of said disk by said chucking means in accordance with the movement of said pickup unit towards said turntable unit; and position detecting means for detecting that said pickup unit is set at an initial position or at the chuck-releasing position.

12. A disk playback apparatus according to claim 1, wherein said drive base has a rack, and said drive conveyance means includes at least two drive gears for selectively engaging with said rack to cause the movement of said drive base unit, said gears being spaced from each other by a distance smaller than the length of said rack.

13. A disk playback apparatus according to claim 1, wherein said disk holder has a partition plate that covers part of the upper surface of the disk, said partition plate having an arcuate inner edge which is notched to clear protrusions formed on an adapter for setting an 8-cm disk.

14. A disk playback apparatus according to claim 1 wherein the disk holder lifting means includes an upper chassis with a motor unit operatively connected to the stage unit, the motor unit effects selective lifting and lowering of the disk holders, and a chucking means, on the drive base unit, having a chucking cam groove to lower a disk holder to resiliently deflect during a chucking operation.

15. The disk playback apparatus according to claim 1 further including a first motor unit supported on the lower chassis; a vibration isolation mechanism; and a rotatable mode plate; wherein the first motor unit provides a lifting/lowering of the stage unit, an open/close operation of the disk insertion section, a loading/ejection of a disk onto each disk holder, a locking/unlocking of the vibration isolation mechanism and a switching of driving power transmission to the drive base unit.

16. A disk playback apparatus according to claim 15, further comprising a stock arm rotatably disposed on a position on said stage unit adjacent to said disk loading/ejection means, said stock arm having a pressing portion which when said stock arm is rotated forces the disk inserted through said disk insertion section deeper into said disk holder, said stage unit having urging means for rotationally urging said stock arm in the disk force-in direction, said urging means being movable in the disk insertion/ejection directions and having a resilient member for adjusting the urging force.

17. A disk playback apparatus according to claim 16, wherein said disk holder has a locating member, and wherein a locating support portion is provided in the vicinity of said disk holder for supporting the locating member of said disk holder when said disk holder has been selected for disk loading or ejection.

18. A disk playback apparatus according to claim 1 where the lower chassis supports a mode plate for driving the movable side plates.

* * * * *